(12) United States Patent
Summersett et al.

(10) Patent No.: US 12,156,560 B2
(45) Date of Patent: Dec. 3, 2024

(54) SAFETY HEADWEAR SYSTEMS AND ACCESSORIES

(71) Applicant: Milwaukee Electric Tool Corporation, Brookfield, WI (US)

(72) Inventors: Nicole Z. Summersett, Milwaukee, WI (US); Samuel L. Lombardi, Milwaukee, WI (US); Christian R. Braun, Milwaukee, WI (US); Todd Andrew Zeilinger, Wauwatosa, WI (US); Benjamin T. Jones, St. Francis, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 167 days.

(21) Appl. No.: 17/710,263

(22) Filed: Mar. 31, 2022

(65) Prior Publication Data

US 2022/0287403 A1    Sep. 15, 2022

Related U.S. Application Data

(63) Continuation of application No. PCT/US2022/019340, filed on Mar. 8, 2022.

(60) Provisional application No. 63/168,775, filed on Mar. 31, 2021, provisional application No. 63/160,111, filed on Mar. 12, 2021.

(51) Int. Cl.
*A42B 3/04*    (2006.01)

(52) U.S. Cl.
CPC .......... *A42B 3/042* (2013.01); *A42B 3/0406* (2013.01); *A42B 3/0433* (2013.01); *A42B 3/044* (2013.01)

(58) Field of Classification Search
CPC .............................. A42B 3/042; A42B 3/0406
See application file for complete search history.

(56) References Cited

U.S. PATENT DOCUMENTS

| | | |
|---|---|---|
| 1,587,681 A | 6/1926 | Schumacher |
| 1,860,690 A | 5/1932 | Rateau |
| 2,728,913 A | 1/1956 | Connor |
| 2,798,222 A | 7/1957 | Evans et al. |
| 2,801,420 A | 8/1957 | Evans et al. |
| 2,934,767 A | 5/1960 | Schoener |
| 3,046,560 A | 7/1962 | De Grazia |
| 3,100,896 A | 8/1963 | Khanbegian |

(Continued)

FOREIGN PATENT DOCUMENTS

| | | |
|---|---|---|
| CN | 101516221 | 1/2013 |
| CN | 203341067 | 12/2013 |

(Continued)

OTHER PUBLICATIONS

Stihl Hard Hat Advance X-Vent Helmet, Date first available Apr. 10, 2019, [online] retrieved Mar. 29, 2022, available from https://www.amazon.com/gp/product/B07PNDZ137/ref=ppx_od_dt_b_asin_title_s00?ie=UTF8&psc=1 (Year: 2019).

(Continued)

*Primary Examiner* — Khaled Annis
(74) *Attorney, Agent, or Firm* — Reinhart Boerner Van Deuren s.c.

(57) ABSTRACT

One or more devices for coupling lighting elements to safety headwear are described. The devices include an element that emits light, a unit that provides power, and a coupling element to couple the device to safety headwear.

20 Claims, 61 Drawing Sheets

(56) References Cited

U.S. PATENT DOCUMENTS

| | | | |
|---|---|---|---|
| 3,419,907 A | 1/1969 | Werk | |
| 3,551,910 A | 1/1971 | Raschke | |
| 3,685,054 A | 8/1972 | Raschke | |
| 3,829,900 A | 8/1974 | Marangoni | |
| 3,877,076 A | 4/1975 | Summers et al. | |
| 4,002,895 A * | 1/1977 | Ketler | F21L 14/026 |
| | | | 362/106 |
| 4,028,743 A | 6/1977 | Christensen | |
| 4,133,055 A | 1/1979 | Zebuhr | |
| 4,214,318 A | 7/1980 | Gomez | |
| 4,222,123 A | 9/1980 | Hellberg | |
| 4,307,471 A | 12/1981 | Lovell | |
| 4,316,289 A | 2/1982 | Hild | |
| 4,395,781 A | 8/1983 | Myers | |
| 4,422,184 A | 12/1983 | Myers | |
| 4,521,831 A | 6/1985 | Thayer | |
| 4,547,908 A | 10/1985 | Palmaer et al. | |
| 4,726,074 A | 2/1988 | Baclit et al. | |
| 4,793,007 A | 12/1988 | Barnett | |
| 4,831,665 A | 5/1989 | Palmaer | |
| 4,985,933 A | 1/1991 | Lemoine | |
| 4,993,081 A | 2/1991 | Fulghum | |
| 4,996,724 A | 3/1991 | Dextrase | |
| 5,146,622 A | 9/1992 | Blutstein | |
| 5,181,279 A | 1/1993 | Ross | |
| 5,226,189 A | 7/1993 | Blutstein | |
| 5,249,307 A | 10/1993 | Lemoine | |
| 5,329,637 A * | 7/1994 | Walker | A42B 3/044 |
| | | | 455/100 |
| 5,357,635 A | 10/1994 | Lemoine | |
| 5,493,734 A | 2/1996 | Nieves-Rivera | |
| D379,679 S | 6/1997 | Poole | |
| 5,683,831 A * | 11/1997 | Baril | G02B 27/0176 |
| | | | 429/96 |
| 5,727,250 A | 3/1998 | Black | |
| 5,752,280 A | 5/1998 | Hill | |
| 5,890,232 A | 4/1999 | Park | |
| 6,009,555 A | 1/2000 | Siprut | |
| 6,260,212 B1 | 7/2001 | Orotelli et al. | |
| 6,425,141 B1 | 7/2002 | Ewing et al. | |
| 6,457,838 B1 | 10/2002 | Dugmore et al. | |
| 6,497,493 B1 | 12/2002 | Theisen | |
| 6,536,044 B2 | 3/2003 | Watley | |
| 6,662,375 B2 | 12/2003 | Lewis | |
| 6,766,534 B2 | 7/2004 | Lewis et al. | |
| 6,782,556 B2 | 8/2004 | Grilliot et al. | |
| 6,826,781 B2 | 12/2004 | Lewis | |
| 6,832,393 B2 | 12/2004 | Folkesson | |
| 6,892,393 B1 | 5/2005 | Provost et al. | |
| 6,959,989 B2 | 11/2005 | Holm | |
| 7,007,306 B2 | 3/2006 | Howard et al. | |
| 7,028,344 B2 | 4/2006 | Toth | |
| 7,120,939 B1 | 10/2006 | Howard et al. | |
| 7,343,630 B2 | 3/2008 | Lee | |
| 7,406,721 B2 | 8/2008 | Husbands et al. | |
| D617,539 S | 6/2010 | Boles | |
| 7,802,320 B2 | 9/2010 | Morgan | |
| D627,521 S | 11/2010 | Lofton | |
| D627,933 S | 11/2010 | Lofton | |
| 7,904,971 B2 | 3/2011 | Doria et al. | |
| 7,908,668 B2 | 3/2011 | Folkesson | |
| D643,157 S | 8/2011 | Grijalva | |
| 8,015,626 B2 | 9/2011 | Grassl et al. | |
| 8,117,677 B2 | 2/2012 | Toth | |
| D659,292 S | 5/2012 | Bryan et al. | |
| 8,225,419 B2 | 7/2012 | Hersick et al. | |
| 8,225,421 B1 | 7/2012 | Froissard | |
| D666,366 S | 8/2012 | Votel | |
| 8,286,269 B2 | 10/2012 | Springer et al. | |
| 8,286,270 B2 | 10/2012 | Higgins | |
| D672,096 S | 12/2012 | Bryan et al. | |
| 8,337,036 B2 * | 12/2012 | Soto | H01M 50/213 |
| | | | 362/105 |
| 8,566,968 B2 | 1/2013 | Marzec et al. | |
| 8,375,473 B2 | 2/2013 | Celona et al. | |
| 8,434,167 B2 | 5/2013 | Gleason et al. | |
| 8,533,869 B1 | 9/2013 | Capuano | |
| 8,539,613 B2 | 9/2013 | Hersick et al. | |
| 8,555,424 B2 | 10/2013 | Higgins | |
| 8,613,114 B1 | 12/2013 | Olivares | |
| 8,631,518 B1 | 1/2014 | Jennings | |
| 8,661,570 B1 | 3/2014 | Huh | |
| 8,667,617 B2 | 3/2014 | Glezerman et al. | |
| 8,701,212 B2 | 4/2014 | Daniels et al. | |
| 8,763,166 B1 | 7/2014 | Olivares | |
| 8,826,463 B2 | 9/2014 | Teetzel et al. | |
| 8,844,066 B1 | 9/2014 | Whitcomb | |
| D720,502 S | 12/2014 | Schrock | |
| 8,898,818 B1 | 12/2014 | Whitcomb | |
| 8,899,867 B2 | 12/2014 | Tatomir | |
| 8,955,169 B2 | 2/2015 | Weber et al. | |
| 8,966,672 B2 | 3/2015 | Smith | |
| RE45,459 E | 4/2015 | Hersick et al. | |
| 8,997,265 B2 | 4/2015 | Olivares | |
| 9,004,801 B2 | 4/2015 | Tatomir | |
| D732,243 S | 6/2015 | Votel et al. | |
| 9,049,896 B2 | 6/2015 | Huh | |
| 9,131,743 B2 | 9/2015 | Marzec et al. | |
| 9,149,085 B2 | 10/2015 | Bryan | |
| 9,173,445 B1 | 11/2015 | Whitcomb | |
| 9,226,538 B2 | 1/2016 | Kim | |
| 9,370,214 B1 | 6/2016 | Whitcomb | |
| 9,370,216 B2 | 6/2016 | Brantley | |
| 9,380,822 B2 | 7/2016 | Foster | |
| 9,380,823 B2 | 7/2016 | Johnson | |
| 9,408,429 B2 | 8/2016 | Tatomir | |
| 9,408,430 B2 | 8/2016 | Guay et al. | |
| 9,456,649 B2 | 10/2016 | Basson | |
| 9,474,318 B2 | 10/2016 | Wesson et al. | |
| 9,480,294 B2 | 11/2016 | Occhipinti | |
| 9,498,015 B2 | 11/2016 | Kim | |
| 9,751,484 B2 | 1/2017 | Johnson | |
| 9,572,391 B2 | 2/2017 | McInnis et al. | |
| 9,578,916 B2 | 2/2017 | Daniels et al. | |
| 9,578,918 B2 | 2/2017 | Bryan et al. | |
| 9,629,407 B2 | 4/2017 | Foster | |
| 9,681,698 B2 | 6/2017 | Tatomir | |
| 9,702,534 B1 * | 7/2017 | Brion | A42B 3/044 |
| 9,713,355 B2 | 7/2017 | Daoust | |
| 9,717,297 B2 | 8/2017 | Harris | |
| 9,795,178 B2 | 10/2017 | Suddaby | |
| 9,795,180 B2 | 10/2017 | Lowe et al. | |
| 9,820,524 B1 | 11/2017 | Whitcomb | |
| 9,820,525 B2 | 11/2017 | Weber | |
| 9,872,531 B2 | 1/2018 | Wert et al. | |
| 9,885,471 B2 | 2/2018 | Dirsa et al. | |
| 9,975,032 B2 | 5/2018 | Frey | |
| 9,980,531 B2 | 5/2018 | Suddaby | |
| 10,105,584 B1 | 10/2018 | Whitcomb | |
| 10,154,704 B1 | 12/2018 | Caito, III | |
| 10,165,818 B2 | 1/2019 | Suddaby | |
| 10,165,819 B2 | 1/2019 | Klotz et al. | |
| 10,219,572 B1 | 3/2019 | Whitcomb | |
| 10,219,579 B2 | 3/2019 | Gotti | |
| 10,278,445 B1 | 5/2019 | Whitcomb | |
| 10,363,477 B1 | 7/2019 | Whitcomb | |
| 10,405,598 B2 | 9/2019 | Gotti | |
| 10,463,099 B2 | 11/2019 | Allen et al. | |
| 10,463,100 B2 | 11/2019 | Gotti | |
| 10,492,558 B2 | 12/2019 | Pfanner et al. | |
| 10,506,839 B1 | 12/2019 | Hanson et al. | |
| 10,512,295 B2 | 12/2019 | Hanson et al. | |
| 10,645,987 B2 | 5/2020 | Maldonado et al. | |
| 10,743,599 B2 | 8/2020 | Silva et al. | |
| 10,772,374 B2 | 9/2020 | Shida | |
| 10,779,603 B2 | 9/2020 | Persson et al. | |
| 10,912,344 B2 | 2/2021 | Bohn et al. | |
| 11,019,870 B2 | 6/2021 | Hyma | |
| 11,452,327 B2 * | 9/2022 | Deshpande | A42B 3/0446 |
| 2002/0004946 A1 | 1/2002 | Nelson | |
| 2006/0109420 A1 | 5/2006 | Holm | |
| 2006/0174396 A1 | 8/2006 | Rosas | |
| 2006/0253957 A1 | 11/2006 | Orozco | |
| 2009/0031485 A1 | 2/2009 | Prusinski et al. | |

(56) References Cited

U.S. PATENT DOCUMENTS

| | | |
|---|---|---|
| 2009/0038056 A1 | 2/2009 | Bobbin et al. |
| 2009/0313745 A1 | 12/2009 | Kang et al. |
| 2010/0011488 A1 | 1/2010 | Sutton |
| 2010/0299813 A1 | 12/2010 | Morgan |
| 2010/0306905 A1 | 12/2010 | Cornell |
| 2011/0094013 A1 | 4/2011 | Zumwalt et al. |
| 2011/0179557 A1 | 7/2011 | Rabie |
| 2011/0203038 A1 | 8/2011 | Jones, Jr. |
| 2011/0209272 A1 | 9/2011 | Drake |
| 2012/0005795 A1 | 1/2012 | Tilley |
| 2012/0054936 A1 | 3/2012 | Cornell |
| 2012/0060251 A1 | 3/2012 | Schimpf |
| 2012/0073034 A1 | 3/2012 | Gafforio et al. |
| 2012/0210498 A1 | 8/2012 | Mack |
| 2012/0272435 A1 | 11/2012 | Glezerman et al. |
| 2013/0047323 A1 | 2/2013 | Ireland |
| 2013/0086722 A1* | 4/2013 | Teetzel .................... A42B 3/04 2/2.5 |
| 2013/0232668 A1 | 9/2013 | Suddaby |
| 2013/0322053 A1* | 12/2013 | Kim ................... F21V 33/0068 362/33 |
| 2014/0007323 A1 | 1/2014 | Capuano |
| 2014/0033402 A1 | 2/2014 | Donnadieu et al. |
| 2014/0123367 A1 | 5/2014 | Prenatt |
| 2014/0130240 A1 | 5/2014 | Olivares Velasco |
| 2014/0143931 A1 | 5/2014 | Olivares Velasco |
| 2014/0143938 A1 | 5/2014 | Olivares Velasco |
| 2014/0143939 A1 | 5/2014 | Olivares Velasco |
| 2014/0173811 A1 | 6/2014 | Finiel |
| 2014/0189938 A1* | 7/2014 | Redpath .................... F41H 1/04 2/422 |
| 2014/0189942 A1 | 7/2014 | Coombs |
| 2014/0338107 A1 | 11/2014 | Mcgahey |
| 2014/0345036 A1 | 11/2014 | Sargenti et al. |
| 2014/0352038 A1 | 12/2014 | Harris |
| 2015/0020295 A1 | 1/2015 | Olivares Velasco |
| 2015/0057621 A1 | 2/2015 | Coombs |
| 2015/0143617 A1 | 5/2015 | Suddaby |
| 2015/0173432 A1 | 6/2015 | McCoy |
| 2015/0201696 A1 | 7/2015 | Pfanner |
| 2015/0264229 A1* | 9/2015 | Teetzel .................... H04N 23/56 348/376 |
| 2016/0183621 A1 | 6/2016 | Reeves |
| 2016/0219964 A1 | 8/2016 | Pisano |
| 2016/0278467 A1 | 9/2016 | Irwin |
| 2016/0316847 A1 | 11/2016 | Weber et al. |
| 2016/0331059 A1 | 11/2016 | Basson et al. |
| 2016/0360820 A1 | 12/2016 | Sommers |
| 2017/0042274 A1 | 2/2017 | Tatomir |
| 2017/0049176 A1 | 2/2017 | Giroux Bernier et al. |
| 2017/0112224 A1 | 4/2017 | Gotti |
| 2017/0127745 A1 | 5/2017 | Daniels et al. |
| 2017/0135434 A1 | 5/2017 | Bryan et al. |
| 2017/0164677 A1 | 6/2017 | Olivares Velasco |
| 2017/0224030 A1 | 8/2017 | Olivares Velasco |
| 2017/0231311 A1 | 8/2017 | Chen et al. |
| 2017/0251744 A1 | 9/2017 | Suddaby |
| 2017/0251748 A1 | 9/2017 | Imppola |
| 2017/0303619 A1* | 10/2017 | Silva ...................... A42B 3/04 |
| 2017/0367433 A1 | 12/2017 | Frett |
| 2018/0027911 A1 | 2/2018 | Weiler et al. |
| 2018/0070667 A1 | 3/2018 | Weber et al. |
| 2018/0098594 A1 | 4/2018 | Marcus |
| 2018/0153244 A1 | 6/2018 | Kirshon |
| 2018/0160760 A1 | 6/2018 | Suddaby |
| 2018/0180894 A1* | 6/2018 | Pombo .............. G02B 27/0176 |
| 2018/0242677 A1 | 8/2018 | Pilenga |
| 2018/0242678 A1 | 8/2018 | Sommers |
| 2018/0303072 A1 | 10/2018 | Grebennikov |
| 2018/0303190 A1 | 10/2018 | Calilung et al. |
| 2019/0001214 A1 | 1/2019 | Burke |
| 2019/0075882 A1 | 3/2019 | Caito, III |
| 2019/0082765 A1 | 3/2019 | Manning et al. |
| 2019/0082766 A1 | 3/2019 | Suddaby |
| 2019/0104800 A1 | 4/2019 | Schuster et al. |
| 2019/0208854 A1* | 7/2019 | Teetzel .................. A42B 3/0433 |
| 2019/0223537 A1 | 7/2019 | Pfanner |
| 2019/0231016 A1 | 8/2019 | Deshpande |
| 2019/0297985 A1 | 10/2019 | Weber et al. |
| 2019/0350291 A1 | 11/2019 | Maldonado et al. |
| 2019/0387827 A1 | 12/2019 | Hylton |
| 2020/0154811 A1 | 5/2020 | Hyma |
| 2020/0329805 A1* | 10/2020 | Wong ..................... A42B 3/283 |
| 2020/0329806 A1 | 10/2020 | Wong |
| 2020/0383417 A1 | 12/2020 | Bohn et al. |
| 2021/0000211 A1 | 1/2021 | Persson et al. |
| 2021/0106089 A1* | 4/2021 | Hyma .................. A42B 3/0446 |
| 2021/0145104 A1* | 5/2021 | Jones ..................... A42B 3/04 |
| 2021/0219646 A1* | 7/2021 | Samuel, Jr. ............. A42B 3/12 |
| 2022/0047030 A1* | 2/2022 | Summersett ............. A42B 3/22 |
| 2022/0071336 A1* | 3/2022 | Franzino ................ A42B 3/30 |
| 2022/0287403 A1* | 9/2022 | Summersett ......... A42B 3/0446 |
| 2023/0157398 A1* | 5/2023 | Lombardi ............ A42B 3/0406 2/422 |
| 2023/0221792 A1* | 7/2023 | Tecchia .................. G06F 3/012 345/156 |

FOREIGN PATENT DOCUMENTS

| | | |
|---|---|---|
| CN | 206724092 | 12/2017 |
| CN | 108730931 | 11/2018 |
| CN | 208354713 | 1/2019 |
| CN | 111084458 | 5/2020 |
| DE | 2030546 | 12/1971 |
| EP | 0668029 | 8/1995 |
| EP | 2292112 | 11/2011 |
| EP | 2484318 | 5/2014 |
| WO | WO8603656 | 7/1986 |
| WO | WO9730606 | 8/1997 |
| WO | WO0070978 | 11/2000 |
| WO | WO07067133 | 6/2007 |
| WO | WO12006653 | 1/2012 |
| WO | WO13110675 | 8/2013 |
| WO | WO14016264 | 1/2014 |
| WO | WO14052009 | 4/2014 |
| WO | WO2016/023063 | 2/2016 |
| WO | WO17009752 | 1/2017 |
| WO | WO17167689 | 10/2017 |
| WO | WO18154507 | 8/2018 |
| WO | WO19040988 | 3/2019 |
| WO | WO19175084 | 9/2019 |

OTHER PUBLICATIONS

450 Lumens LED Spot/Flood Headlamp with Hardhat, [online] retrieved Mar. 29, 2022, available from https://www.homedepot.com/p/Milwaukee-450-Lumens-LED-Spot-Flood-Headlamp-with-Hardhat-2104HH/313609279, available at least as early as Oct. 7, 2020.

Redlithium USB Charger and Portable Power Source, [online] retrieved Mar. 29, 2022, available from https://www.homedepot.com/p/Milwaukee-REDLITHIUM-USB-Charger-and-Portable-Power-Source-48-59-2012/311412734?g_store=&source=shoppingads&locale=en-US&&mtc=Shopping-BF-F_D25H-G-D25H-025_005_SEC_SAFETY-NA-NA-NA-SMART-NA-NA-SafetySecurity_Smart&cm_mmc=Shopping-BF-F_D25H-G-D25H-025_005_SEC_SAFETY-NA-NA-NA-SMART-NA-NA-SafetySecurity_Smart-71700000081377594-58700006924599096-92700064312898326&gclid=EAIaIQobChMImKa43sq39gIVe3NvBB0zbQ17EAQYAyABEgLGbfD_BwE&gclsrc=aw.ds, available at least as early as Oct. 31, 2019.

600 Lumens Led Redlithium USB Low-Profile Hard Hat Headlamp, [online] retrieved Mar. 29, 2022, available from https://www.homedepot.com/p/Milwaukee-600-Lumens-LED-REDLITHIUM-USB-Low-Profile-Hard-Hat-Headlamp-2115-21/309838628?source=shoppingads&locale=en-US&&mtc=Shopping-BF-F_D25H-G-D25H-025_005_SEC_SAFETY-NA-NA-NA-SMART-NA-NA-SafetySecurity_Smart&cm_mmc=Shopping-BF-F_D25H-G-D25H-025_005_SEC_SAFETY-NA-NA-NA-SMART-NA-NA-SafetySecurity_Smart-71700000081377594-58700006924599096-

(56) References Cited

OTHER PUBLICATIONS

92700064312898326&gclid=EAIaIQobChMIwPe80cu39gIVkxXUAROOQg5LEAQYASABEgKT1PD_BwE&gclsrc=aw.ds, available at least as early as Dec. 5, 2019.

Petzl IKO Core Headlamp, [online] retrieved Mar. 29, 2022, available from https://www.rei.com/product/178736/petzl-iko-core-headlamp available at least as early as Jul. 2, 2020, per Wayback Machine.

"Kask Zenith Collection—The Full Optional Helmet," https://www.youtube.com/watch?v=Y8uOne6HU6c, believed to be available at least as early as Nov. 21, 2019.

Kask Super Plasma Work Helmet, Yellow, [online] retrieved Mar. 29, 2022, available from https://www.amazon.com/Kask-Super-Plasma-Helmet-Yellow/dp/B07BB2VGZ4/ref=sr_1_9?gclid=EAIaIQobChMI-ZqbmYPf9gIVApSGCh1Z1Av_EAAYASAAEgI7A_D_BwE&hvadid=580689344836&hvdev=c&hvlocphy=9018827&hvnetw=g&hvqmt=e&hvrand=9008402216610053942&hvtargid=kwd-931648854203&hydadcr=7680_13500496&keywords=kask+super+plasma+hd&qid=1648134437&sr=8-9, available at least as early as Mar. 8, 2018.

Kask SC3 Orange Ear Defenders (fits Super Plasma & Zenith Helmets), [online] retrieved Mar. 29, 2022, available from https://www.amazon.com/Kask-Orange-Defenders-Plasma-Helmets/dp/B01DO7HBG6/ref=sr_1_14?gclid=EAIaIQobChMI-ZqbmYPf9gIVApSGCh1Z1Av_EAAYASAAEgI7A_D_BwE&hvadid=580689344836&hvdev=c&hvlocphy=9018827&hvnetw=g&hvqmt=e&hvrand=9008402216610053942&hvtargid=kwd-931648854203&hydadcr=7680_13500496&keywords=kask+super+plasma+hd&qid=1648134437&sr=8-14, available at least as early as Dec. 4, 2018.

Kask V2 Plus Visor for Super Plasma Helmets—Silver Mirror, [online] retrieved Mar. 29, 2022, available from https://www.amazon.com/Kask-Visor-Super-Plasma-Helmets/dp/B07YDSVQTH/ref=sr_1_11?gclid=EAIaIQobChMI-ZqbmYPf9gIVApSGCh1Z1Av_EAAYASAAEgI7A_D_BwE&hvadid=580689344836&hvdev=c&hvlocphy=9018827&hvnetw=g&hvqmt=e&hvrand=9008402216610053942&hvtargid=kwd-931648854203&hydadcr=7680_13500496&keywords=kask+super+plasma+hd&qid=1648134688&sr=8-11, available at least as early as Jul. 1, 2020.

Kask Zenith Hi-Vis Dielectric Helmet, [online] retrieved Mar. 29, 2022, available from https://www.amazon.com/Kask-Zenith-Hi-Vis-Dielectric-Helmet/dp/B07YXD8XKB/ref=sr_1_10?crid=2ZMRECQSYSG3U&keywords=kask+zenith&qid=1648135937&sprefix=kask+zenith+%2Caps%2C76&sr=8-10, available at least as early as Oct. 9, 2019.

International Search Report and Written Opinion for International Application No. PCT/US2022/019340, dated Jun. 22, 2022, 9 pages.

VCG Construction, "Milwaukee Tools New Safety Equipment Can Save Your A**** ", video published on YouTube on Jan. 13, 2020, Accessed from https://www.youtube.com/watch?v=HqmGM4MYCQQ (Year: 2020).

\* cited by examiner

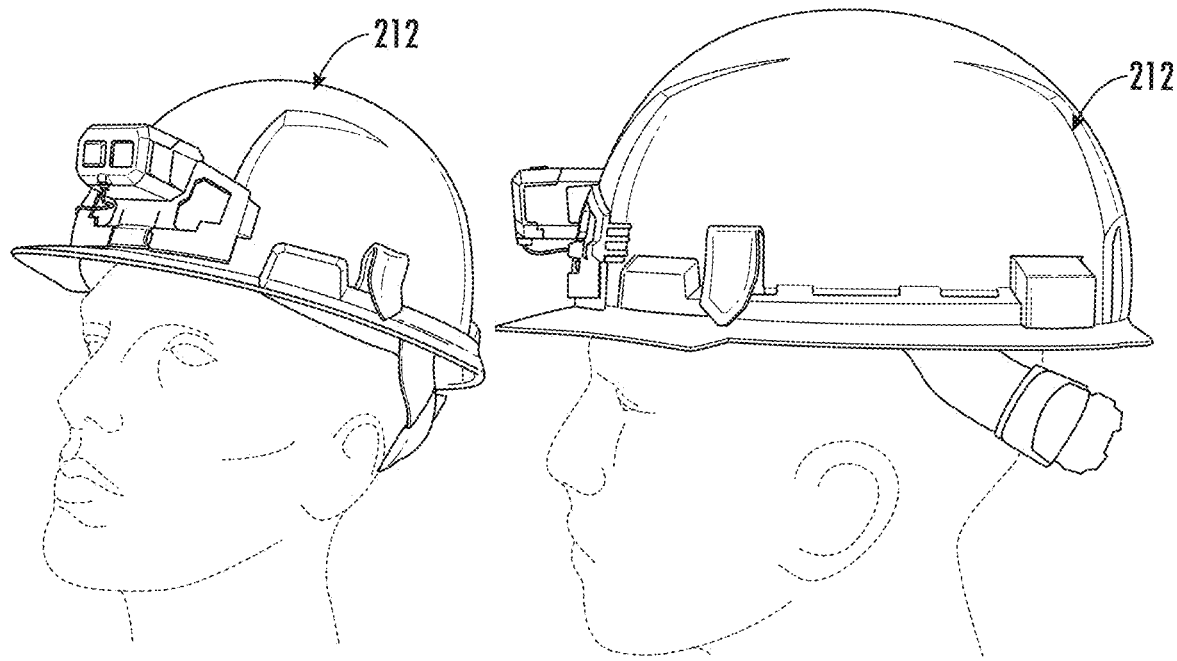
FIG. 34
FIG. 35
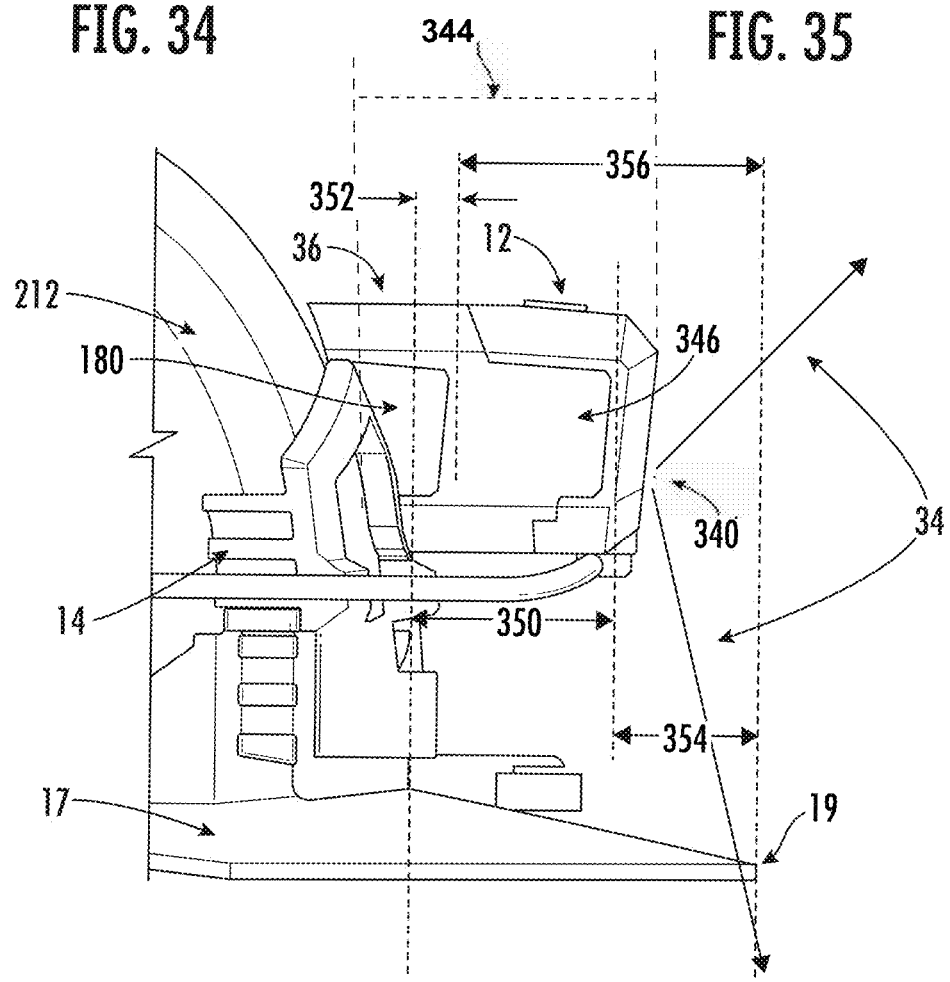
FIG. 36

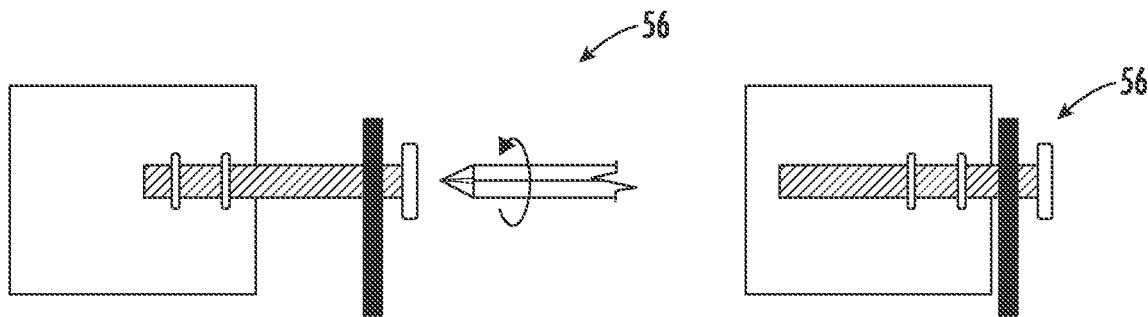
FIG. 55
FIG. 56
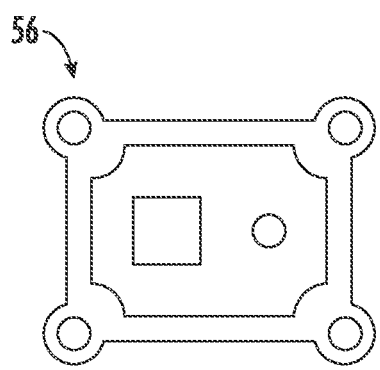
FIG. 57
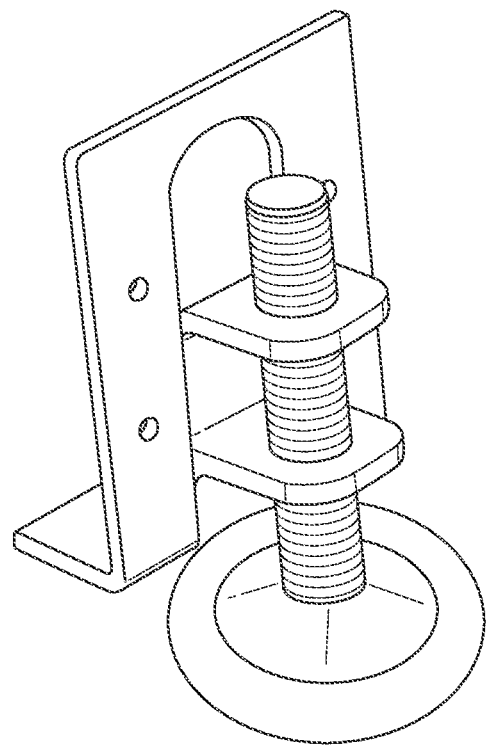
FIG. 58

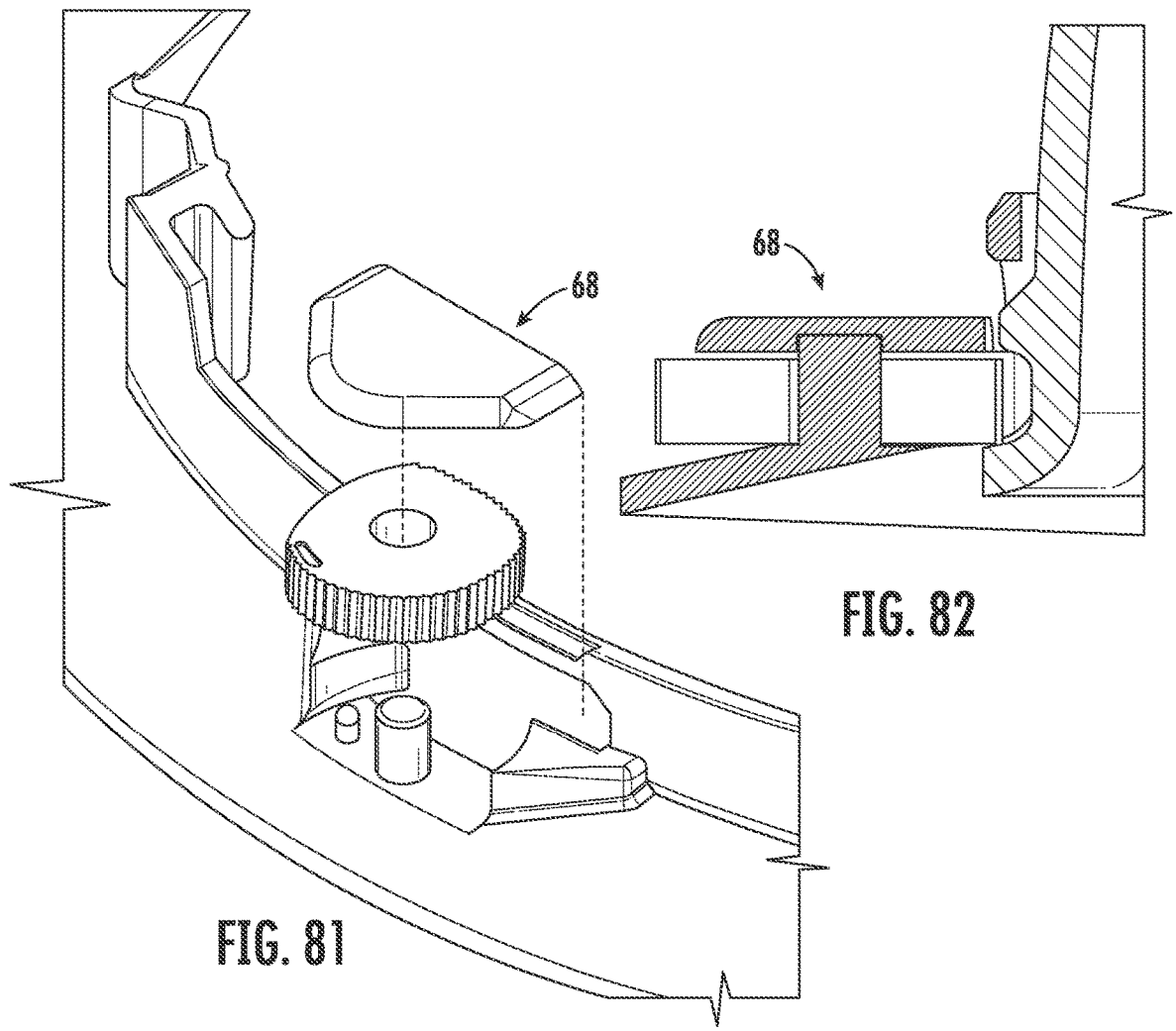
FIG. 81
FIG. 82
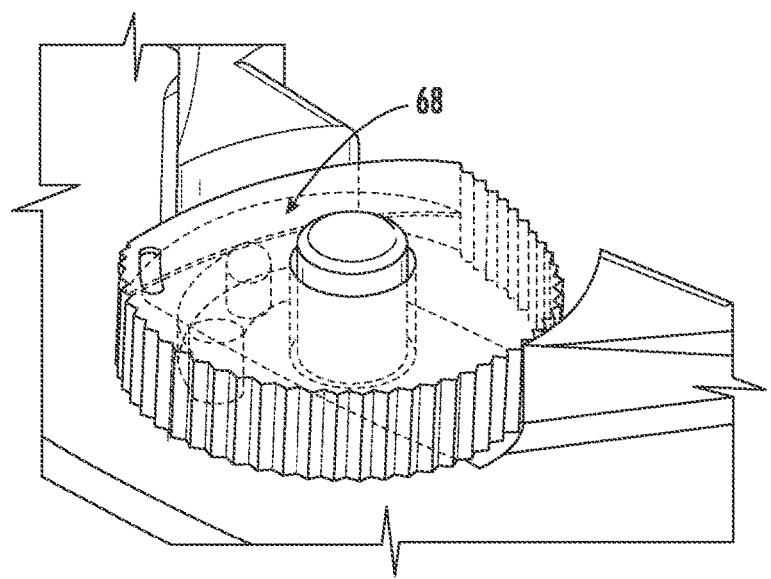
FIG. 83

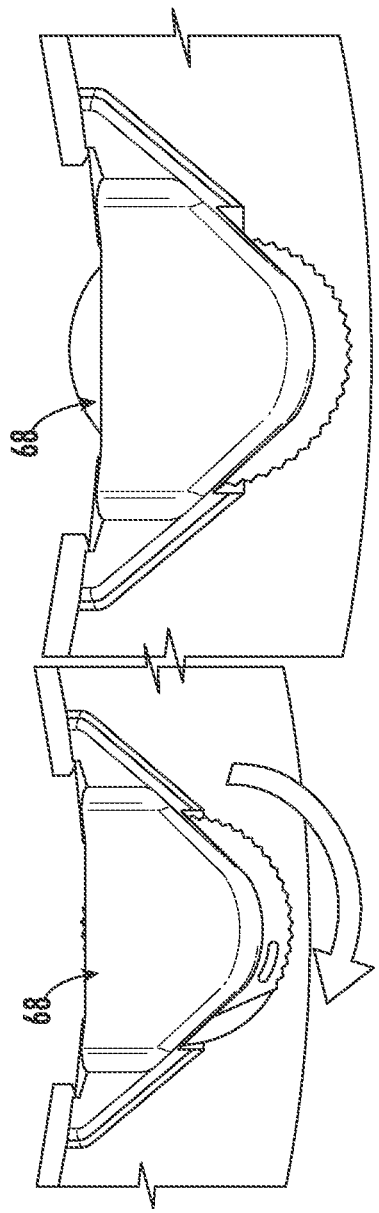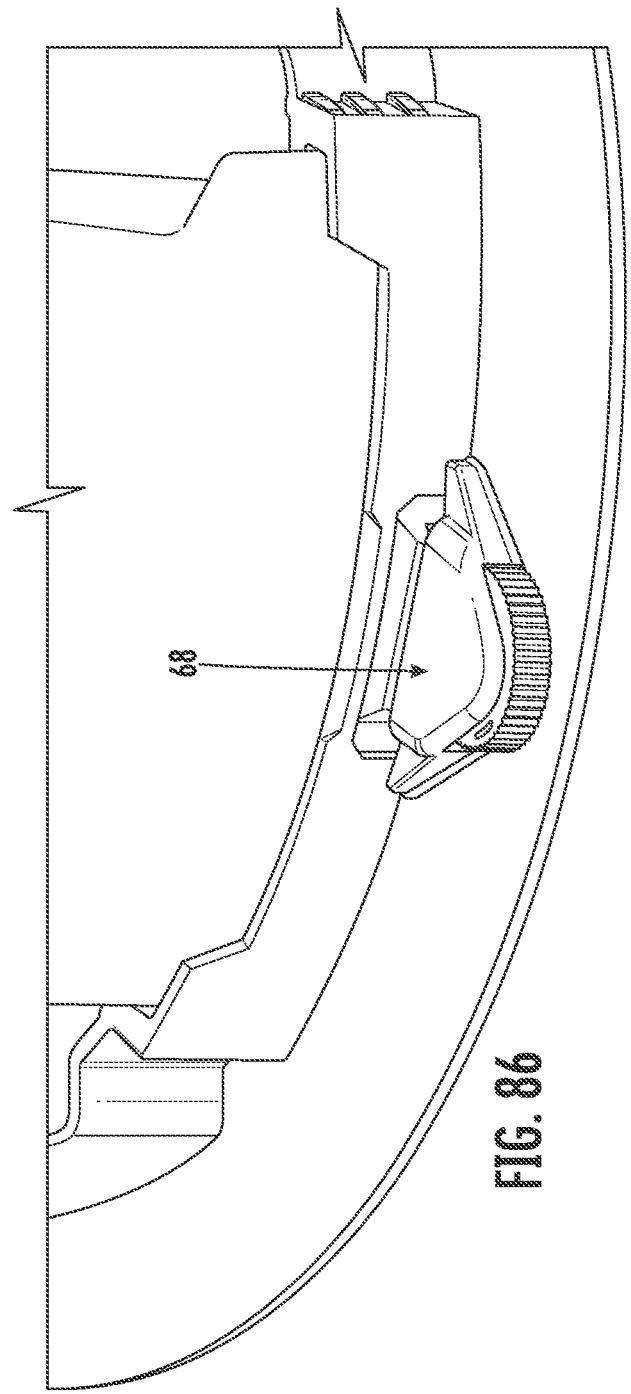

SAFETY HEADWEAR SYSTEMS AND ACCESSORIES

CROSS-REFERENCE TO RELATED PATENT APPLICATIONS

The present application is a continuation of International Application No. PCT/US2022/019340, filed Mar. 8, 2022, which claims the benefit of and priority to U.S. Provisional Application No. 63/168,775, filed on Mar. 31, 2021, and U.S. Provisional Application No. 63/160,111, filed on Mar. 12, 2021, each of which is incorporated herein by reference in its entirety.

BACKGROUND OF THE INVENTION

The present disclosure is directed generally to the field of hard hats. The present disclosure relates specifically to a hard hat lighting system. Hard hats are often used in poorly illuminated areas. Hard hat use in high-risk environments may provide added protection for head injury. A lighting system may assist with vision in poorly lit or low visibility environments.

SUMMARY OF THE INVENTION

One embodiment of the invention relates to a hard system including a hard hat, a bracket coupled to the hard hat, and a headlamp. The hard hat includes a shell formed from a rigid material. The shell defines an external surface and an opposing internal surface that defines a cavity sized to receive the head of a wearer. The bracket includes a first arm and a second arm, each of which extend forward from the hard hat. The headlamp includes a housing and a lighting element. The housing includes a first lateral wall and an opposing second lateral wall. The first lateral wall is detachably engaged with the first arm and the second lateral wall is detachably engaged with the second arm. The lighting element is within the housing and is configured to emit light outside the housing.

Another embodiment of the invention relates to a hard hat system including a hard hat, a mounting bracket, and a power source coupled to the mounting bracket, the power source being configured to supply electrical power to an accessory coupled to the hard hat. The hard hat includes a shell formed from a rigid material. The shell defines an external surface and an opposing internal surface that defines a cavity sized to receive the head of a wearer. The hard hat includes a rear mounting element extending from a rear of the hard hat. The mounting bracket is coupled to the rear mounting element. The rear mounting element includes opposing ridges that extend circumferentially around the shell and away from each other. The mounting bracket includes opposing arms that engage between the shell and the opposing ridges.

Another embodiment of the invention relates to a hard hat system including a hard hat, a bracket coupled to the hard hat, an extender coupled to the bracket, and a headlamp. The hard hat includes a shell formed from a rigid material. The shell defines an external surface and an opposing internal surface that defines a cavity sized to receive the head of a wearer. The headlamp is configured to be directly coupled to the bracket in a first position with respect to the hard hat such that a front-most surface of the headlamp defines a first distance in front of the hard hat. The headlamp is also configured to be coupled to the extender in a second position with respect to the hard hat such that the front-most surface of the headlamp defines a second distance in front of the hard hat, and the second distance is greater than the first distance.

Another embodiment of the invention relates to a coupling system to couple a lighting system, such as a headlamp, to safety headwear, such as a hard hat.

Another embodiment of the invention includes a safety headwear with a bracket coupled to a front of the safety headwear and a headlamp detachably coupled to the bracket. In a specific embodiment, the headlamp is angled downward to emit light at an angle of 15 degrees below horizontal when the safety headwear is level. In a specific embodiment, the headlamp is coupled to the bracket via an extender that positions the headlamp further forward relative to the safety headwear compared to when the headlamp is directly coupled to the bracket. In a specific embodiment, the bracket is coupled to a brim guard that is coupled to the safety headwear. The brim guard extends above a brim of the safety headwear.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which:

FIG. 34 is a perspective view of the lighting assembly of FIG. 1 coupled to safety headwear, according to an exemplary embodiment.

FIG. 35 is a side view of the lighting assembly of FIG. 34 coupled to the safety headwear of FIG. 34, according to an exemplary embodiment.

FIG. 36 is a detailed side view of the lighting assembly of FIG. 34 coupled to the safety headwear of FIG. 34, according to an exemplary embodiment.

FIG. 55 is a side view of a coupling mechanism, according to an exemplary embodiment.

FIG. 56 is a side view of the coupling mechanism of FIG. 55, according to an exemplary embodiment.

FIG. 57 is a view of the coupling mechanism of FIG. 55, according to an exemplary embodiment.

FIG. 58 is a perspective view of a portion of the coupling mechanism of FIG. 55, according to an exemplary embodiment.

FIG. 81 is an exploded perspective view of the brim guard of FIG. 78, according to an exemplary embodiment.

FIG. 82 is a cross-section view of the brim guard of FIG. 78, according to an exemplary embodiment.

FIG. 83 is a silhouette perspective view of the brim guard of FIG. 78, according to an exemplary embodiment.

FIG. 84 is a top view of the brim guard of FIG. 78, according to an exemplary embodiment.

FIG. 85 is a top view of the brim guard of FIG. 78, according to an exemplary embodiment.

FIG. 86 is a detailed perspective view of the brim guard of FIG. 78, according to an exemplary embodiment.

FIG. 119 is a perspective view of a portion of the coupling assembly of FIG. 116, according to an exemplary embodiment.

FIG. 120 is a perspective view of a coupling assembly, according to an exemplary embodiment.

FIG. 121 is a schematic view of a portion of the coupling assembly of FIG. 120, according to an exemplary embodiment.

FIG. 122 is a view of a portion of the coupling assembly of FIG. 120, according to an exemplary embodiment.

FIG. 123 is a schematic view of a portion of the coupling assembly of FIG. 120, according to an exemplary embodiment.

FIG. 124 is a perspective view of a portion of the coupling assembly of FIG. 120, according to an exemplary embodiment.

FIG. 125 is a perspective view of a portion of the coupling assembly of FIG. 120, according to an exemplary embodiment.

FIG. 126 is an exploded perspective view of a coupling assembly, according to an exemplary embodiment.

FIG. 127 is a perspective view of a portion of the coupling assembly of FIG. 126, according to an exemplary embodiment.

FIG. 128 is an exploded perspective view of a coupling assembly, according to an exemplary embodiment.

FIG. 129 is a perspective view of a portion of the coupling assembly of FIG. 128, according to an exemplary embodiment.

FIG. 130 is an exploded perspective view of a portion of the coupling assembly of FIG. 128, according to an exemplary embodiment.

Figure 1:
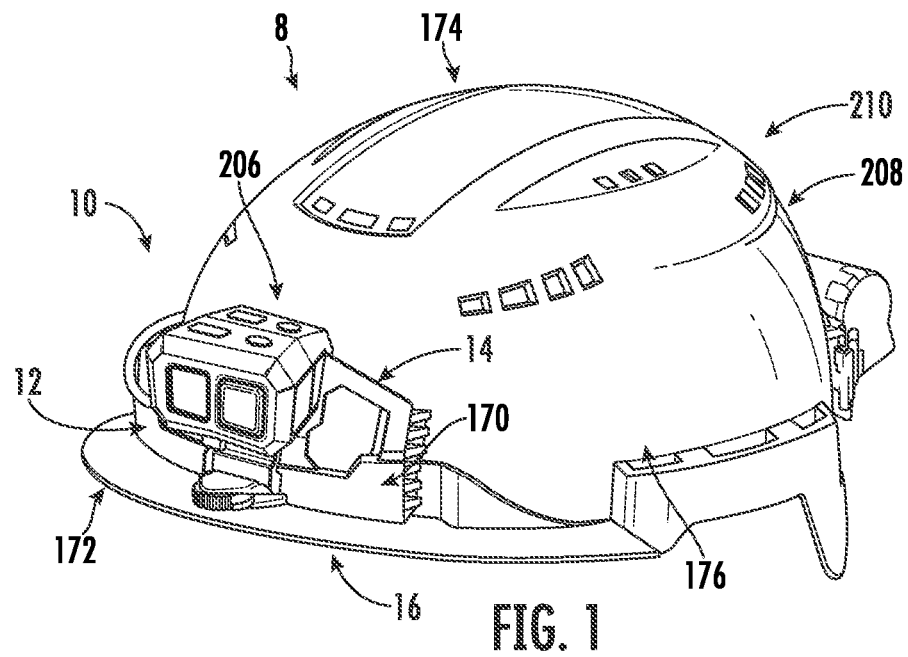
FIG. 1 is a perspective view of a lighting assembly coupled to safety headwear, according to an exemplary embodiment.
Figure 2:
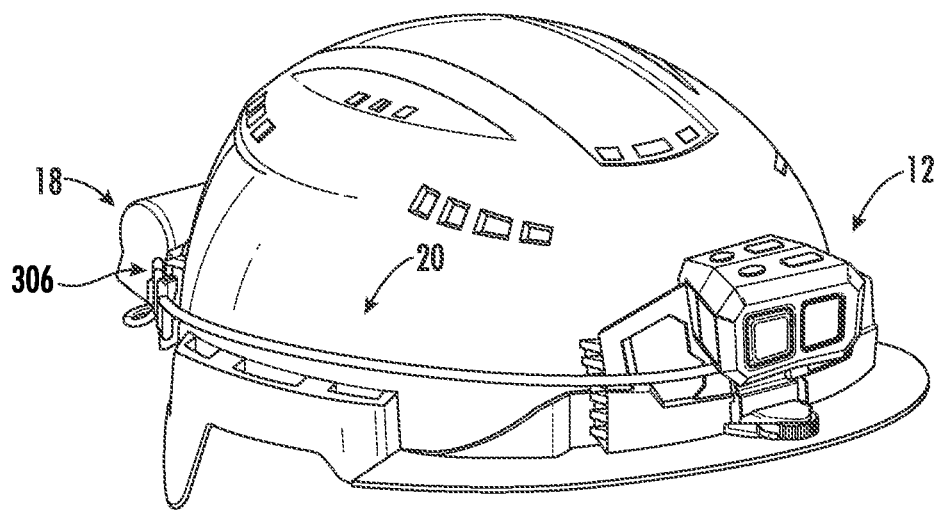
FIG. 2 is a perspective view of the lighting assembly of FIG. 1 coupled to safety headwear, according to an exemplary embodiment.
Figure 3:
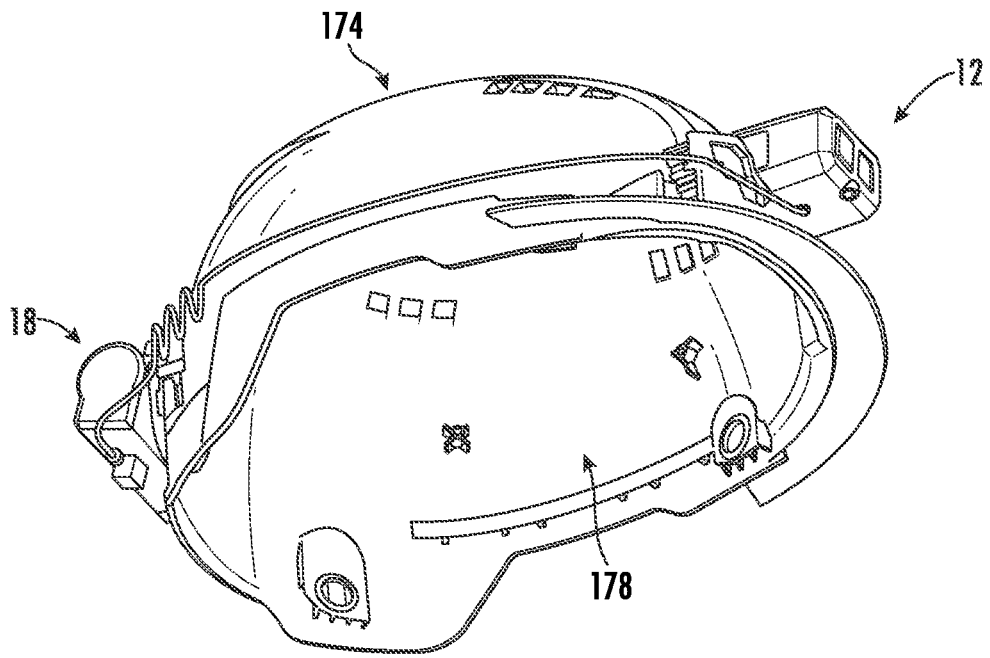
FIG. 3 is a perspective view from below of the lighting assembly of FIG. 1 coupled to safety headwear, according to an exemplary embodiment.
Figure 4:
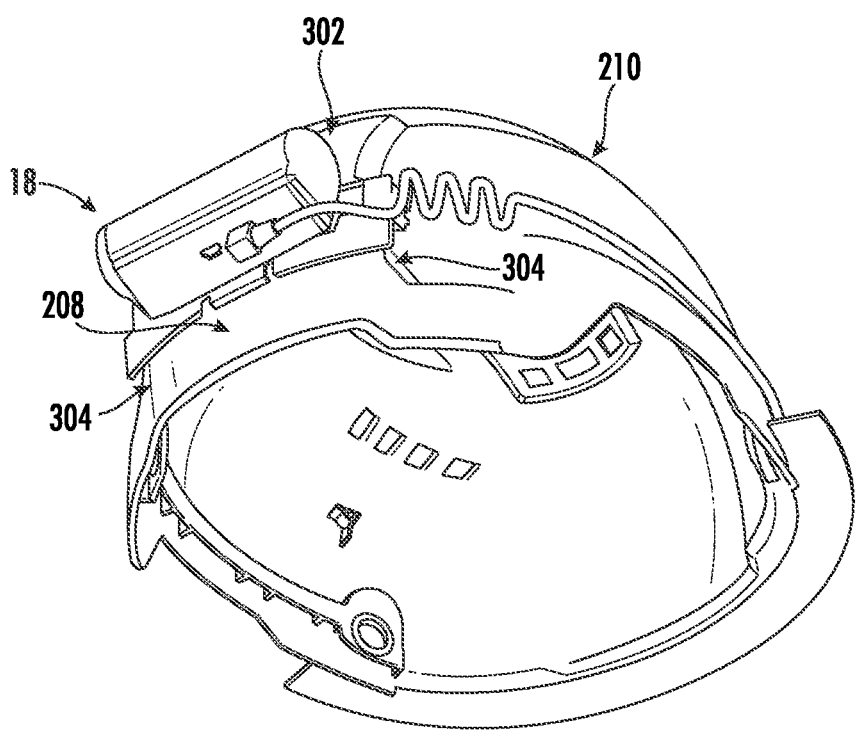
FIG. 4 is a perspective view from below of the lighting assembly of FIG. 1 coupled to safety headwear, according to an exemplary embodiment.
Figure 5:
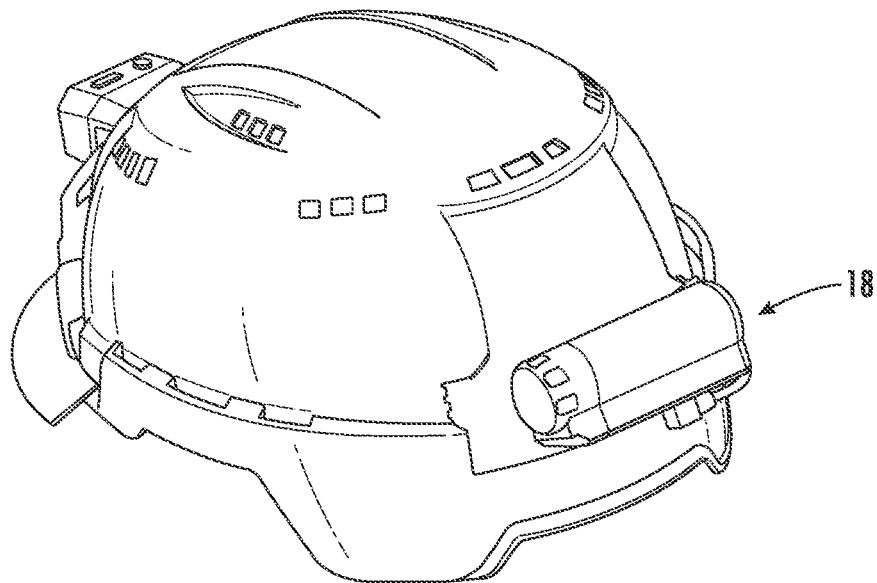
FIG. 5 is a perspective view from above and behind of the lighting assembly of FIG. 1 coupled to safety headwear, according to an exemplary embodiment.
Figure 6:
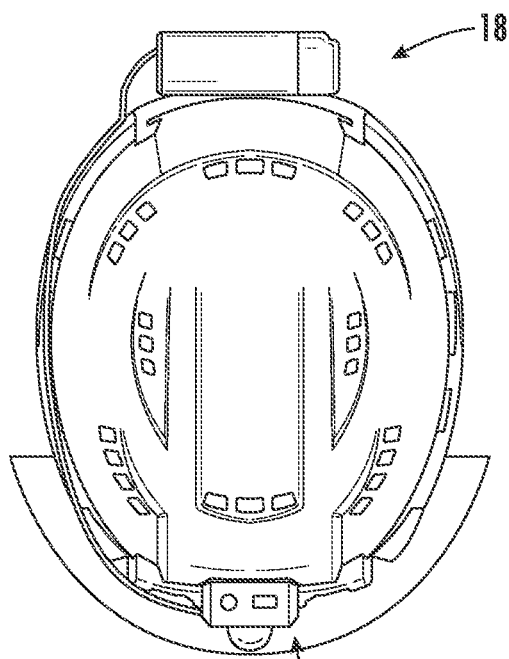
FIG. 6 is a top view of the lighting assembly of FIG. 1 coupled to safety headwear, according to an exemplary embodiment.
Figure 131:
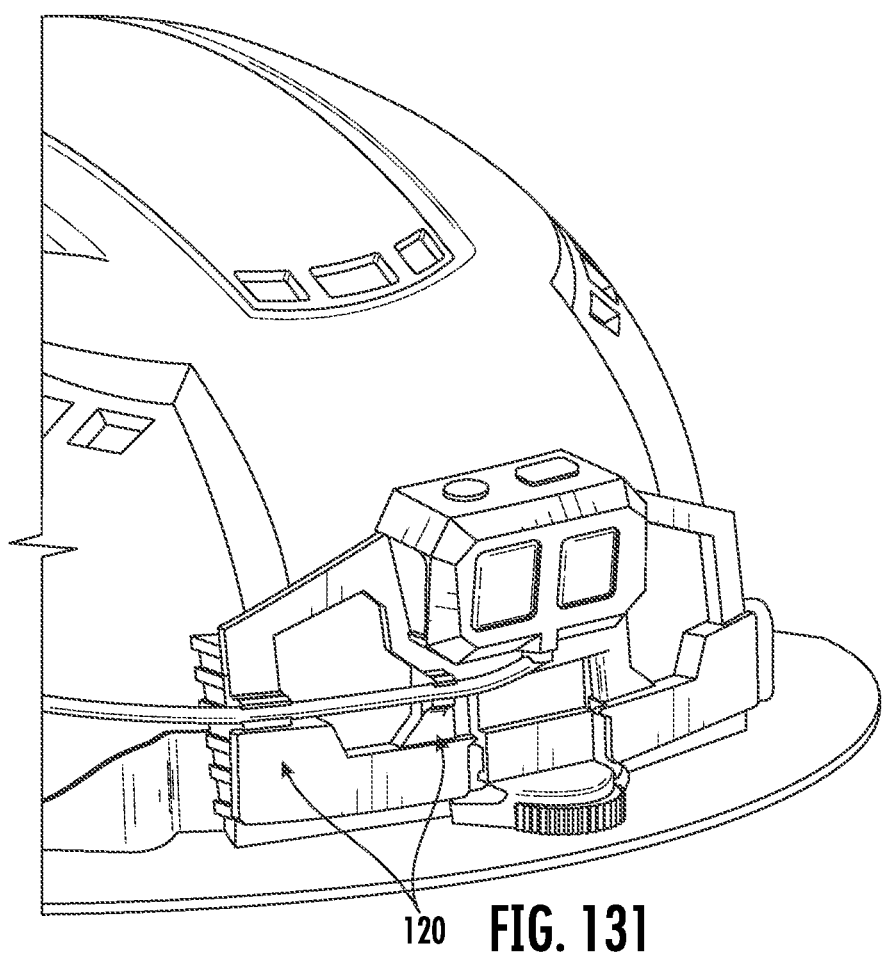

FIG. 131 is a perspective view of a portion of the lighting assembly of FIG. 1, according to an exemplary embodiment.

Figure 132:
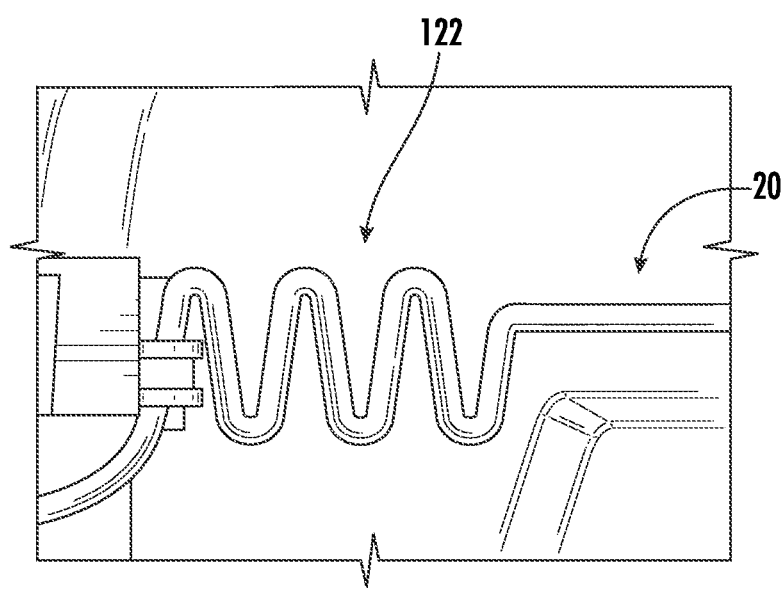

FIG. 132 is a detailed side view of a portion of the lighting assembly of FIG. 1, according to an exemplary embodiment.

Figure 133:
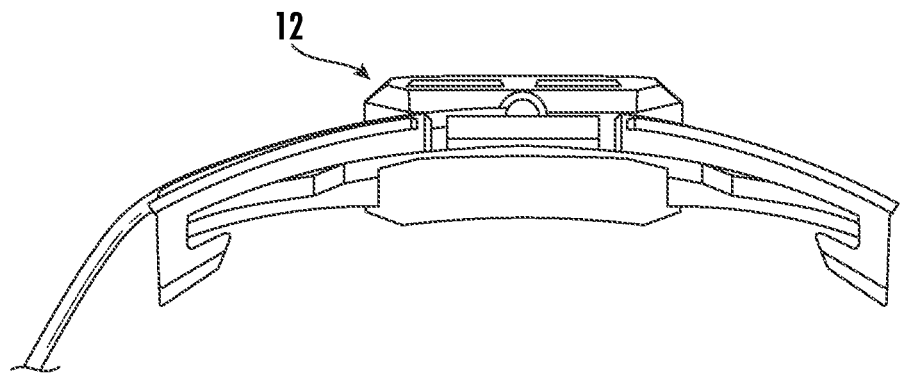

FIG. 133 is a top view of a portion of the lighting assembly of FIG. 1, according to an exemplary embodiment.

Figure 134:
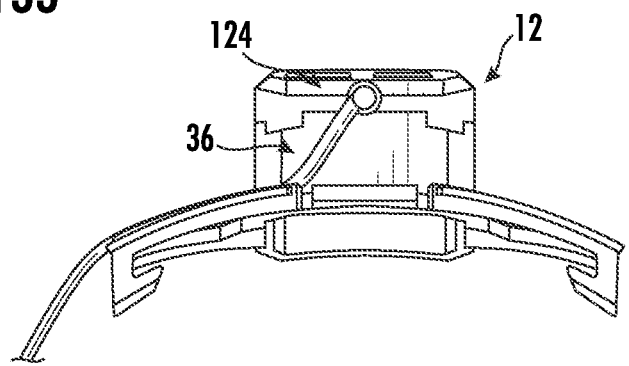

FIG. 134 is a top view of a portion of the lighting assembly of FIG. 1, according to an exemplary embodiment.

Figure 135:
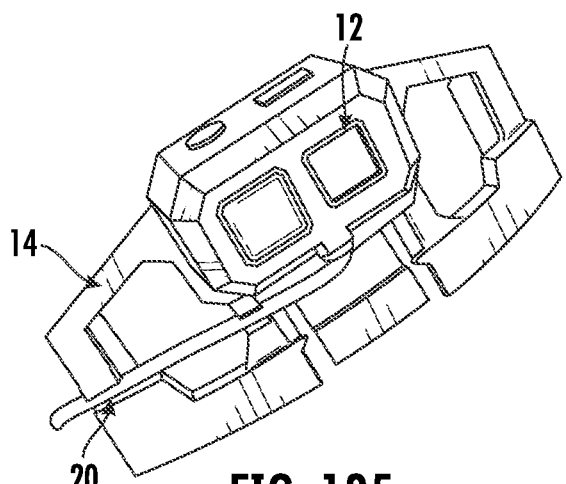

FIG. 135 is a perspective view of a portion of the lighting assembly of FIG. 1, according to an exemplary embodiment.

Figure 136:
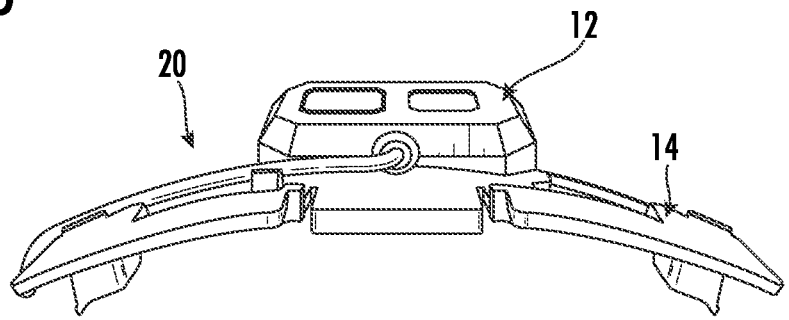

FIG. 136 is a perspective view of a portion of the lighting assembly of FIG. 1, according to an exemplary embodiment.

Figure 137:
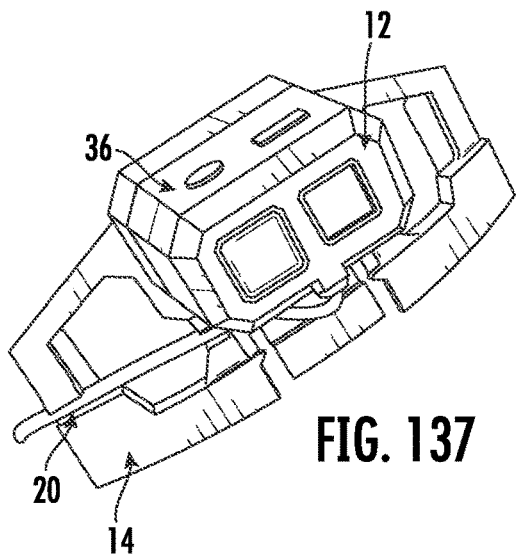

FIG. 137 is a perspective view of a portion of the lighting assembly of FIG. 1, according to an exemplary embodiment.

Figure 138:
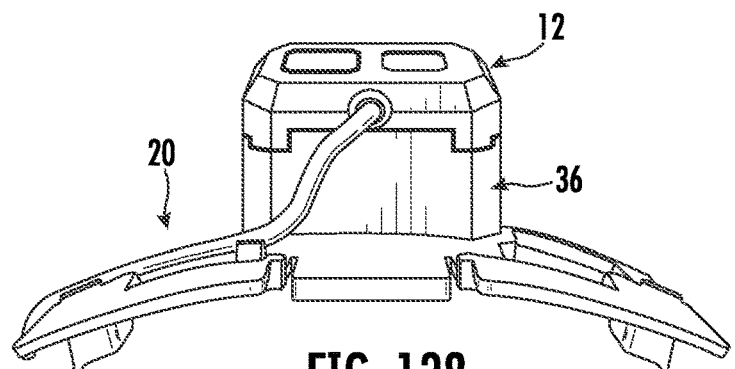

FIG. 138 is a perspective view of a portion of the lighting assembly of FIG. 1, according to an exemplary embodiment.

Figure 139:
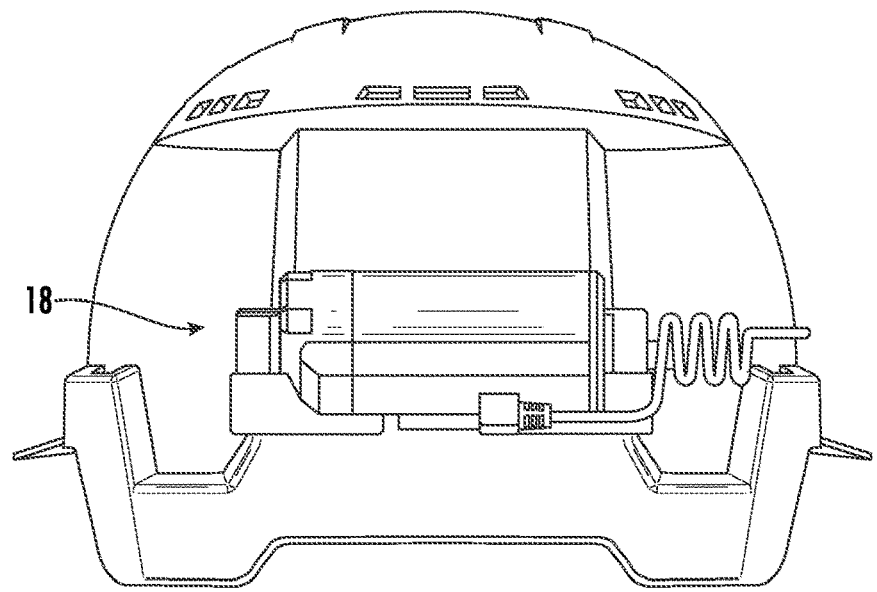

FIG. 139 is a rear view of the lighting assembly of FIG. 1, according to an exemplary embodiment.

Figure 140:
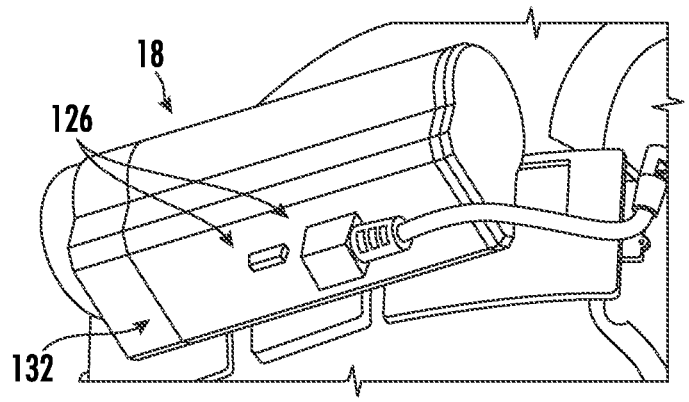

FIG. 140 is a detailed perspective view of a portion of the lighting assembly of FIG. 1, according to an exemplary embodiment.

Figure 141:
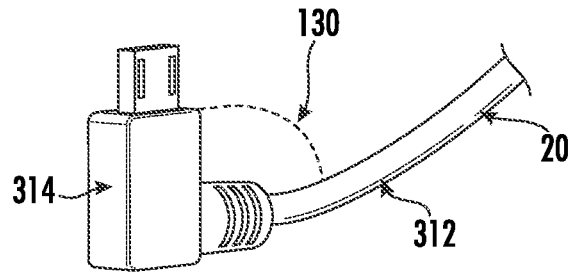

FIG. 141 is a detailed perspective view of a portion of the lighting assembly of FIG. 1, according to an exemplary embodiment.

Figure 142:
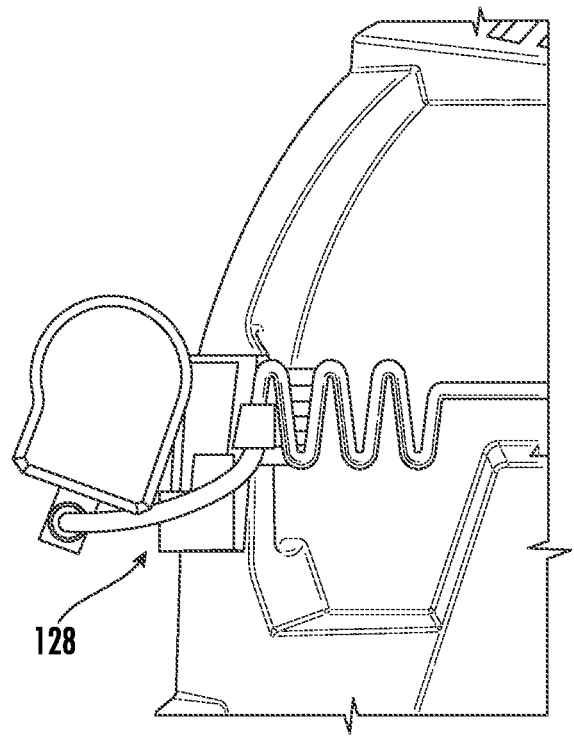

FIG. 142 is a detailed perspective view of a portion of the lighting assembly of FIG. 1, according to an exemplary embodiment.

Figure 143:
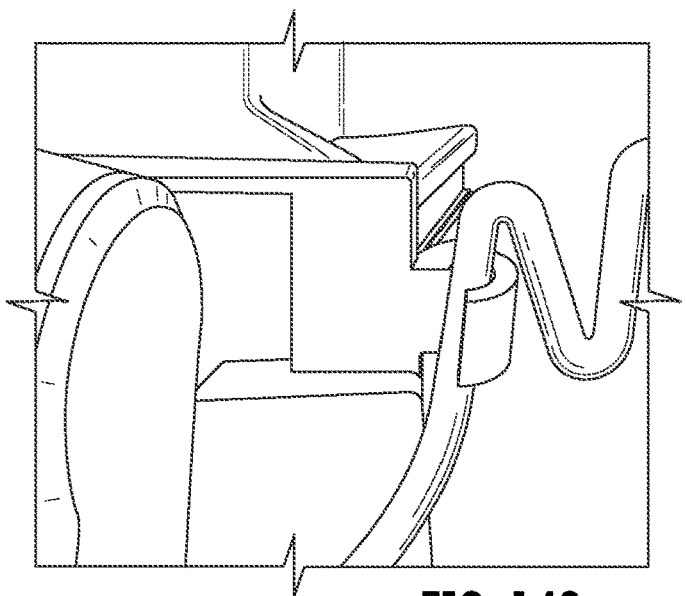

FIG. 143 is a detailed perspective view of a portion of the lighting assembly of FIG. 1, according to an exemplary embodiment.

Figure 144:
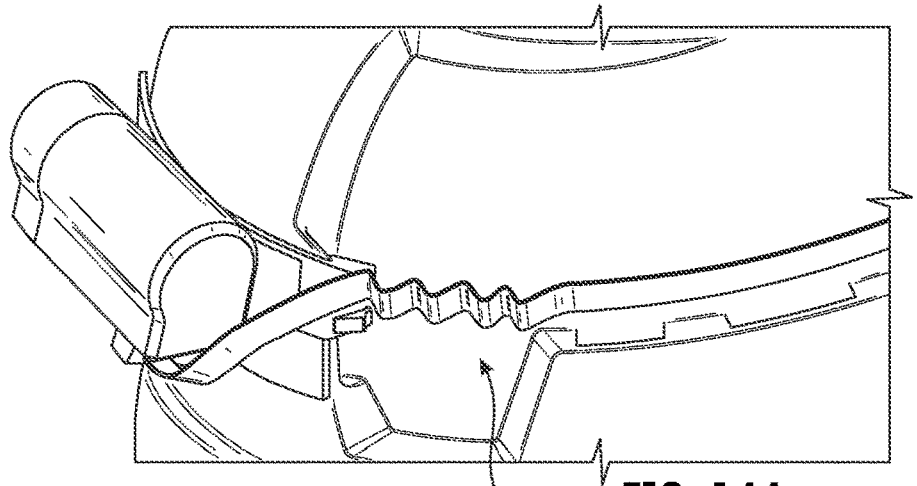
Figure 145:
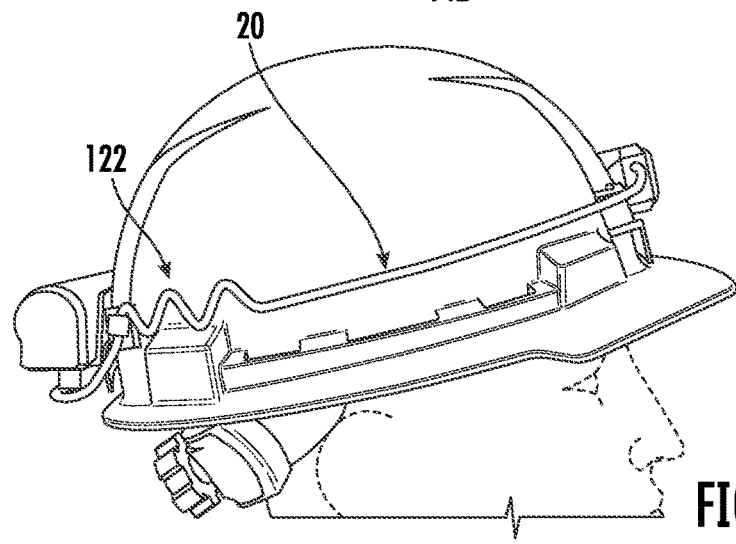
Figure 146:
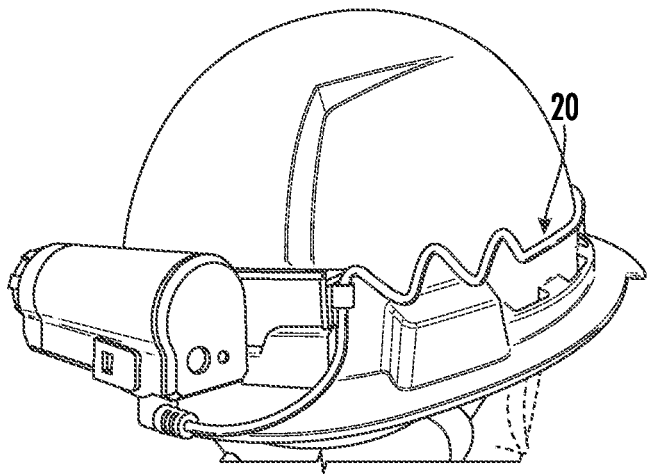
Figure 147:
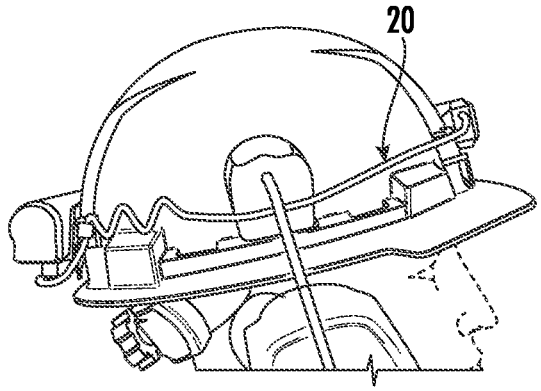
Figure 148:
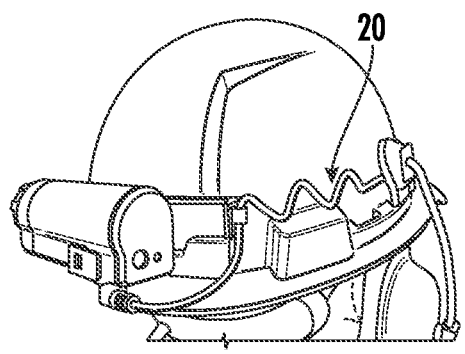
Figure 149:
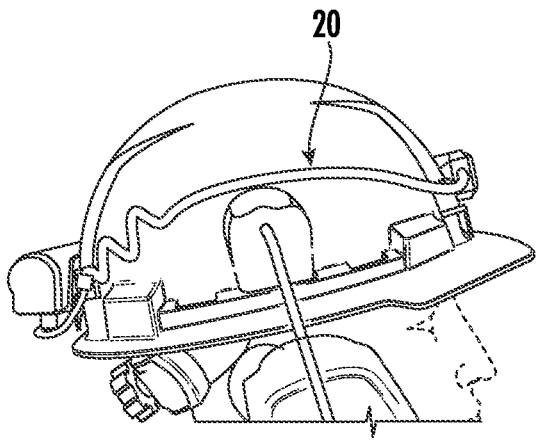
Figure 150:
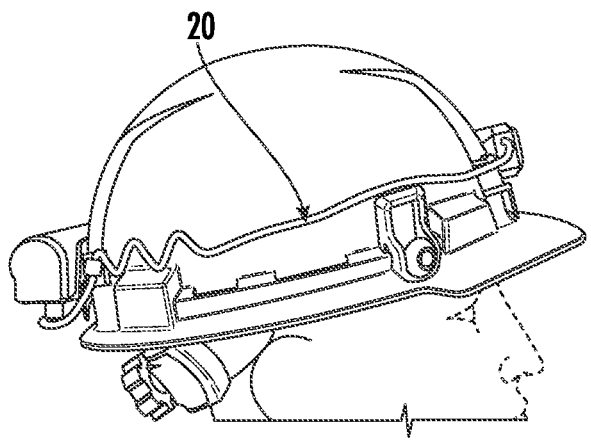
Figure 151:
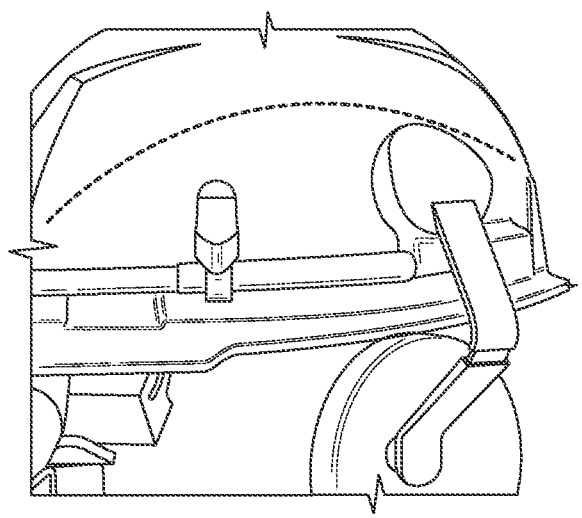
Figure 152:
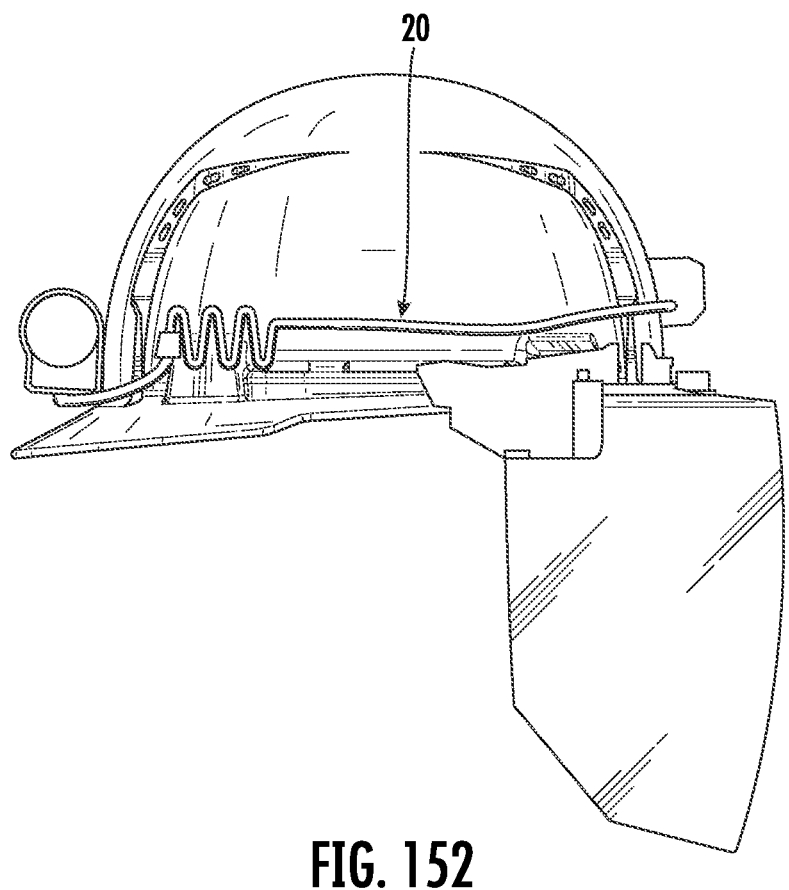

FIG. 144 is a detailed perspective view of a portion of the lighting assembly of FIG. 1, according to an exemplary embodiment.

FIGS. 145-153 are various views of portions of the lighting assembly of FIG. 1, according to an exemplary embodiment.

Figure 154:
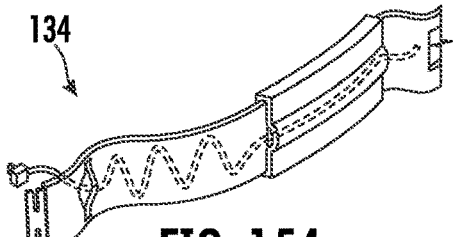

FIG. 154 is a schematic view of a power cord, according to an exemplary embodiment.

Figure 155:
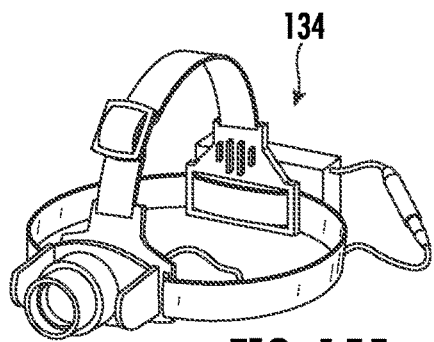

FIG. 155 is a perspective view of the power cord of FIG. 154, according to an exemplary embodiment.

Figure 156:
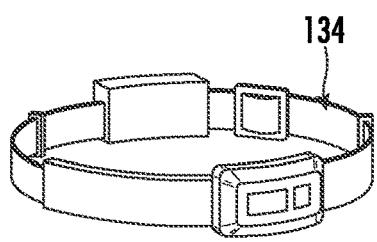

FIG. 156 is a perspective view of the power cord of FIG. 154, according to an exemplary embodiment.

Figure 157:
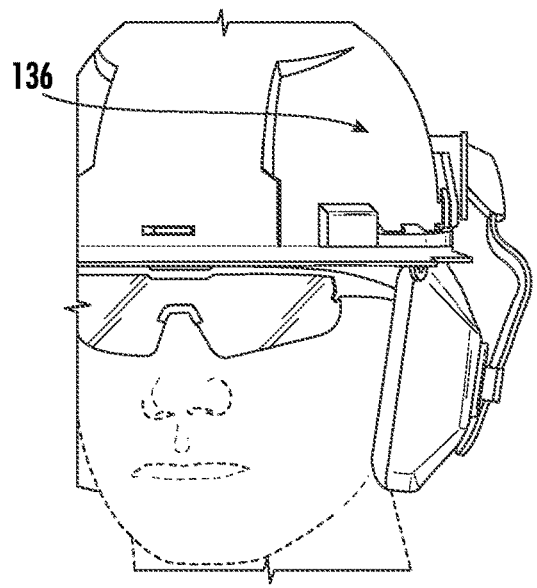

FIG. 157 is a front view of a power cord, according to an exemplary embodiment.

Figure 158:
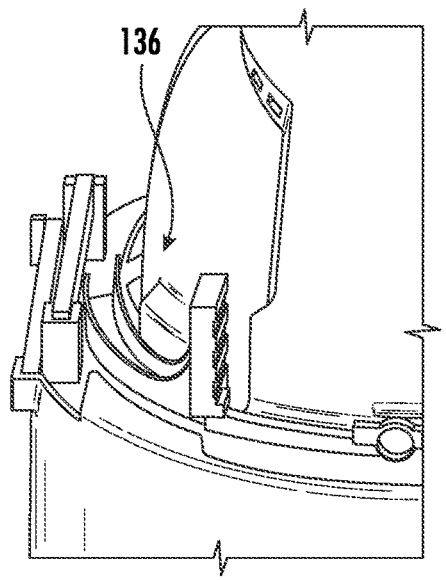

FIG. 158 is a perspective view of a portion of the power cord of FIG. 157, according to an exemplary embodiment.

Figure 159:
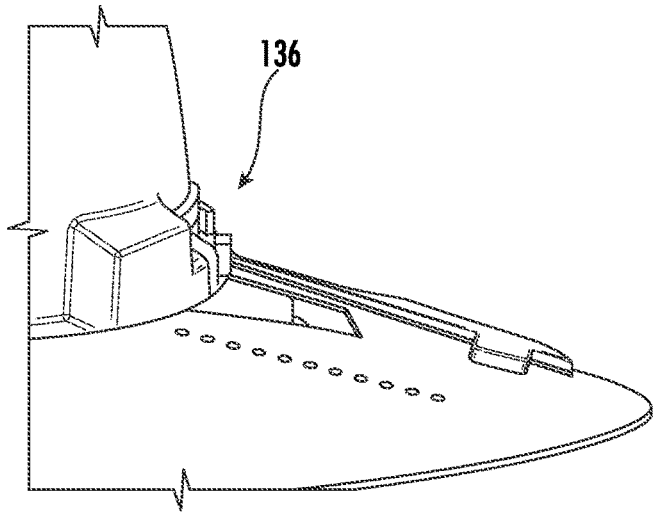

FIG. 159 is a perspective view of the power cord of FIG. 157, according to an exemplary embodiment.

Figure 160:
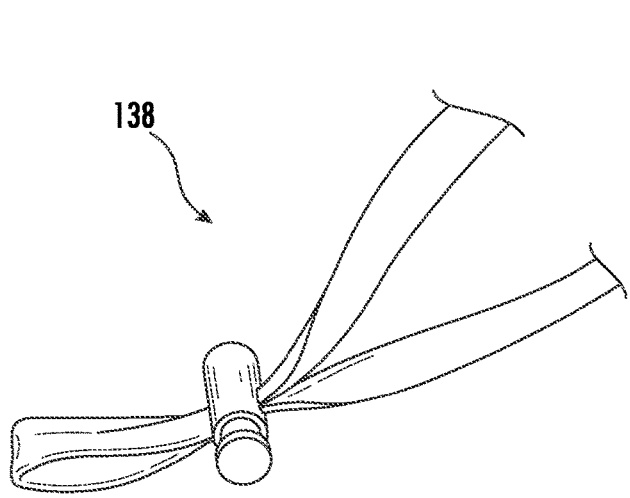

FIG. 160 is a perspective view of a power cord, according to an exemplary embodiment.

Figure 161:
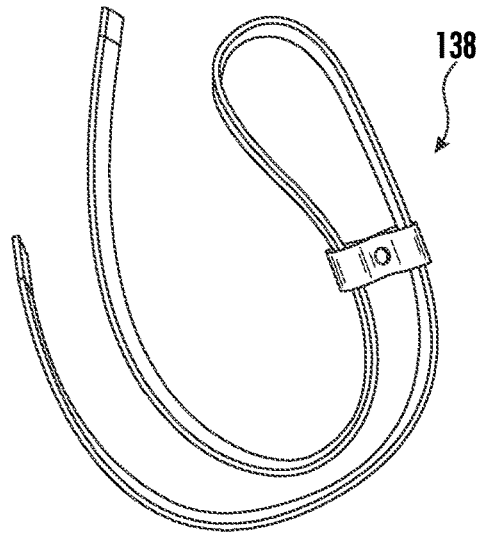

FIG. 161 is a top view of a portion of the power cord of FIG. 160, according to an exemplary embodiment.

Figure 162:
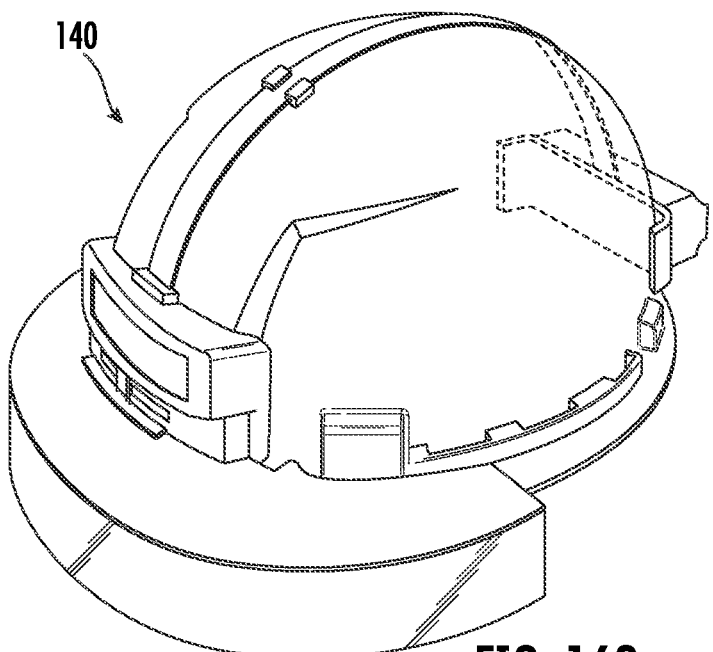

FIG. 162 is a perspective view of a power cord, according to an exemplary embodiment.

Figure 163:
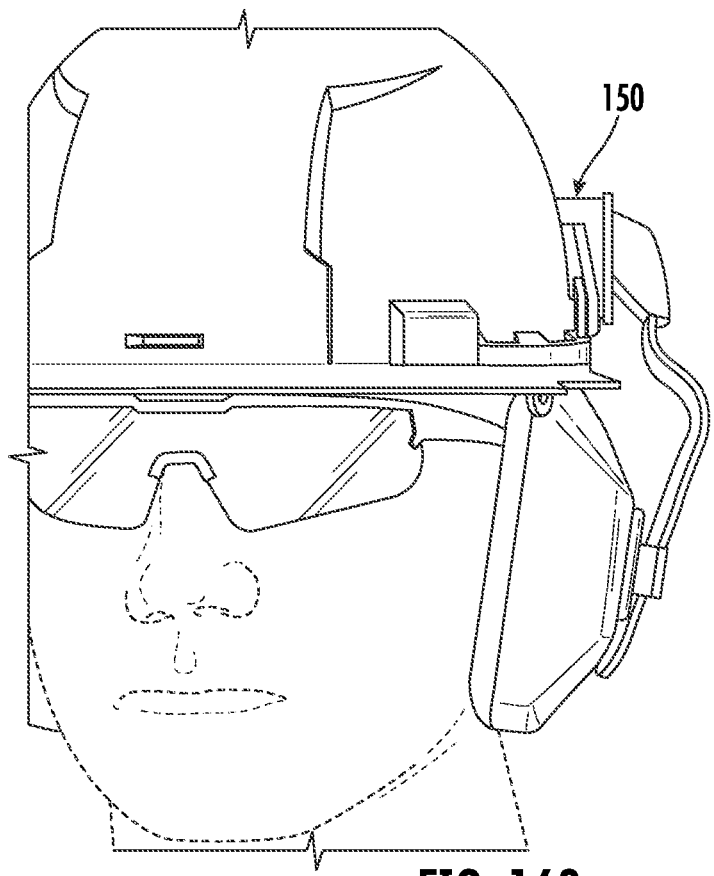

FIG. 163 is a front view of a power cord, according to an exemplary embodiment.

Figure 164:
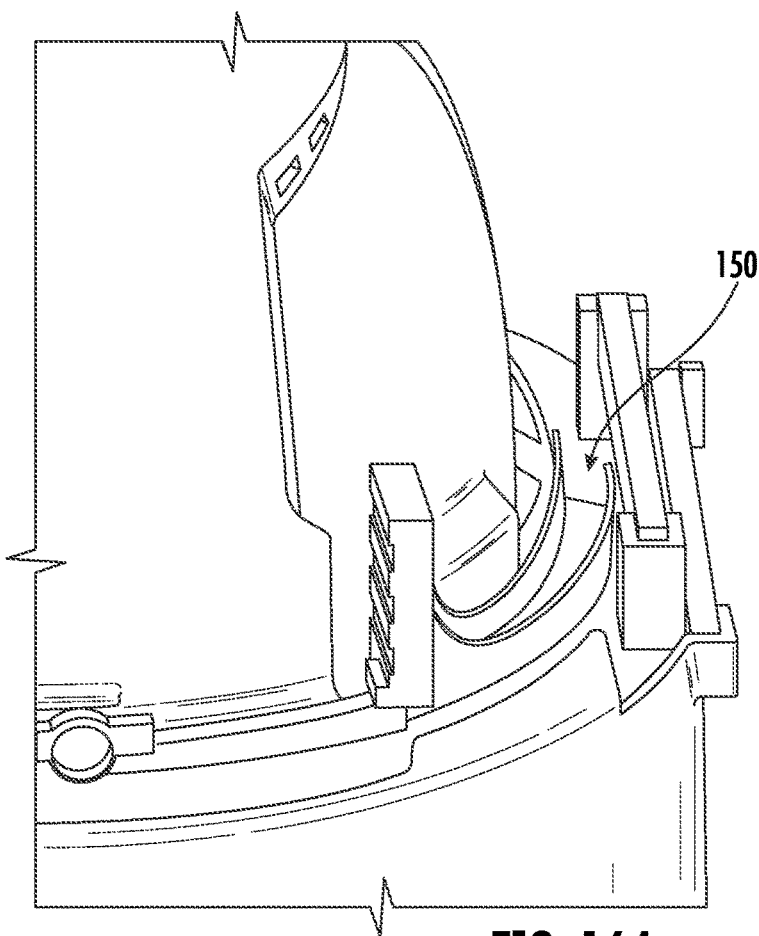

FIG. 164 is a perspective view of a portion of the power cord of FIG. 163, according to an exemplary embodiment.

Figure 165:
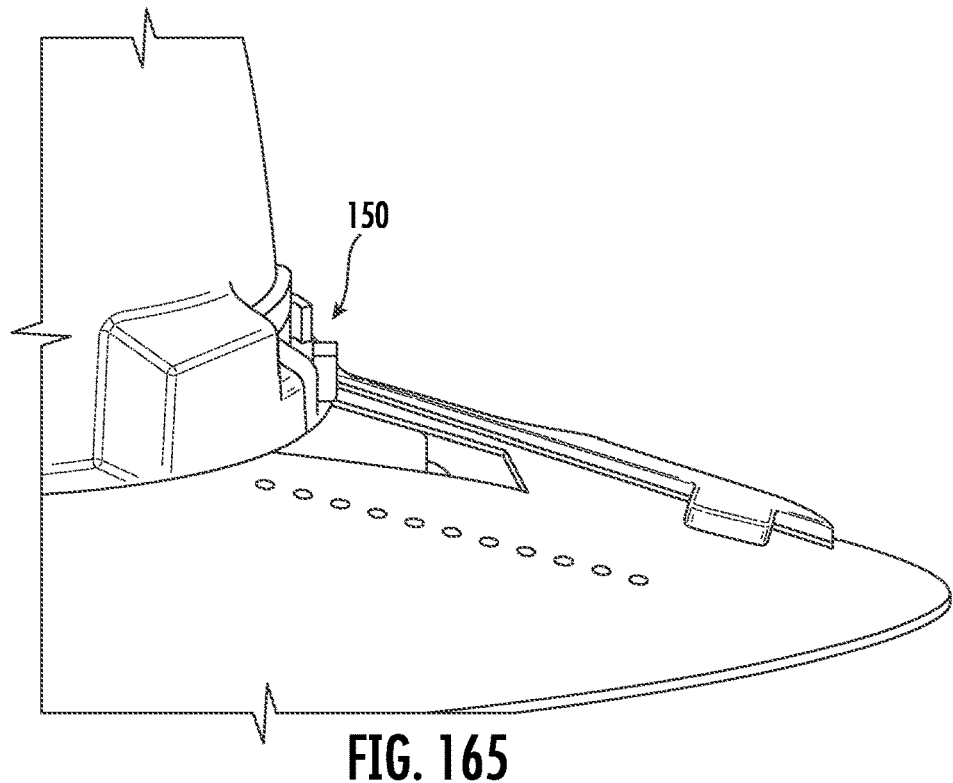

FIG. 165 is a perspective view of a portion of the power cord of FIG. 163, according to an exemplary embodiment.

Figure 166:
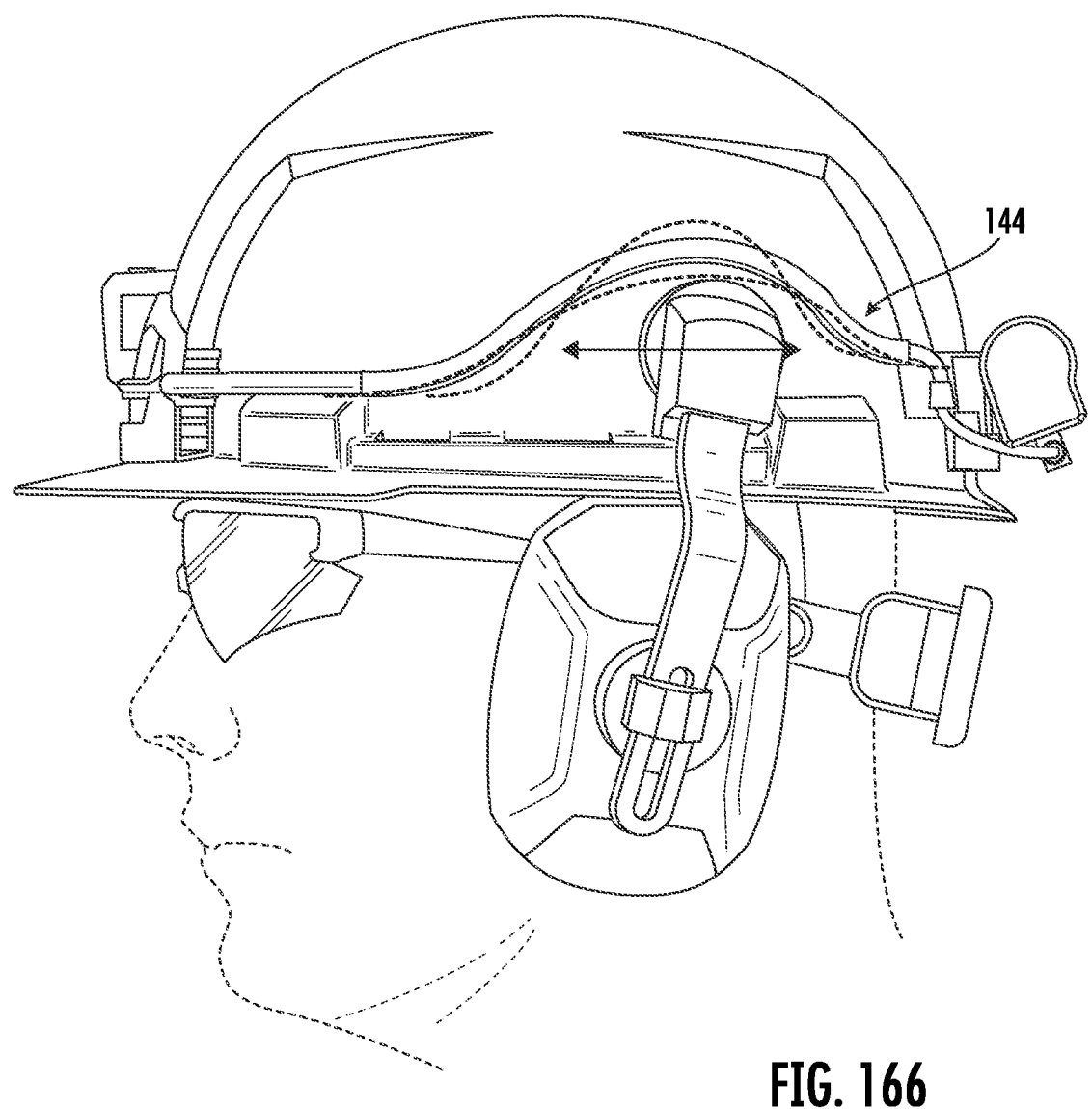

FIG. 166 is a side view of a power cord, according to an exemplary embodiment.

Figure 167:
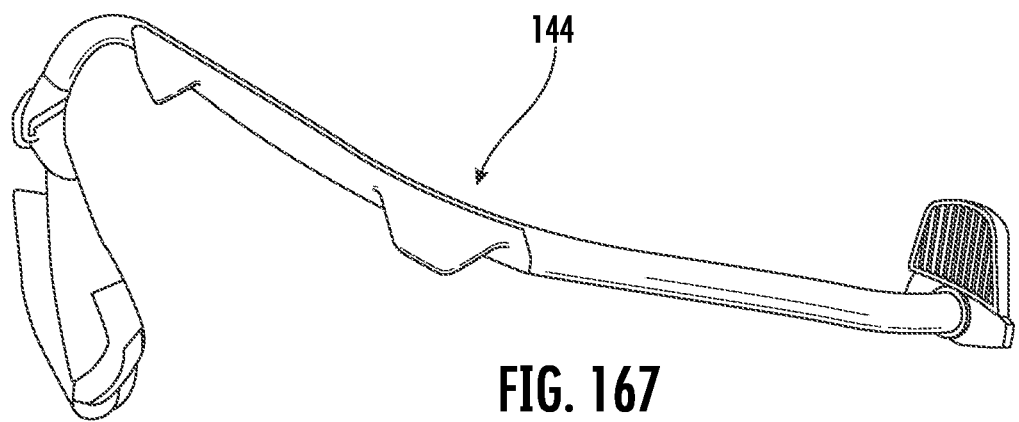
Figure 168:
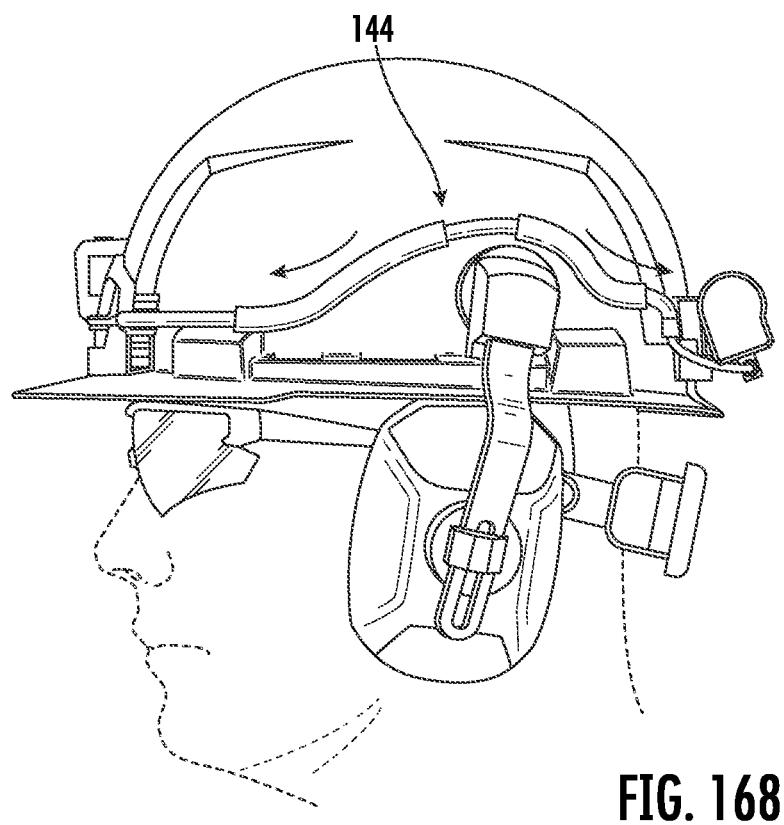
Figure 169:
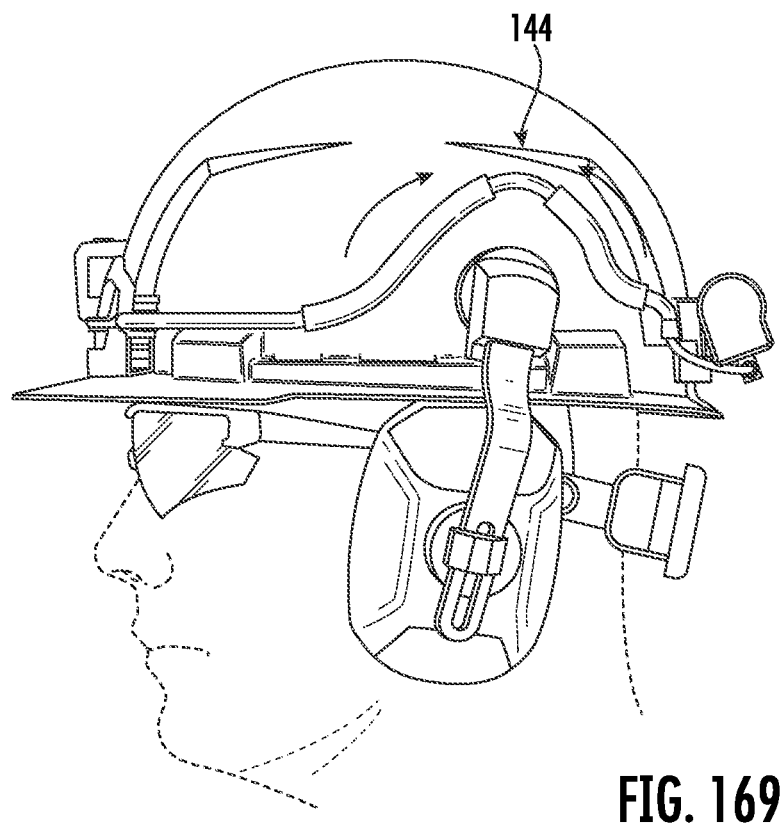
Figure 170:
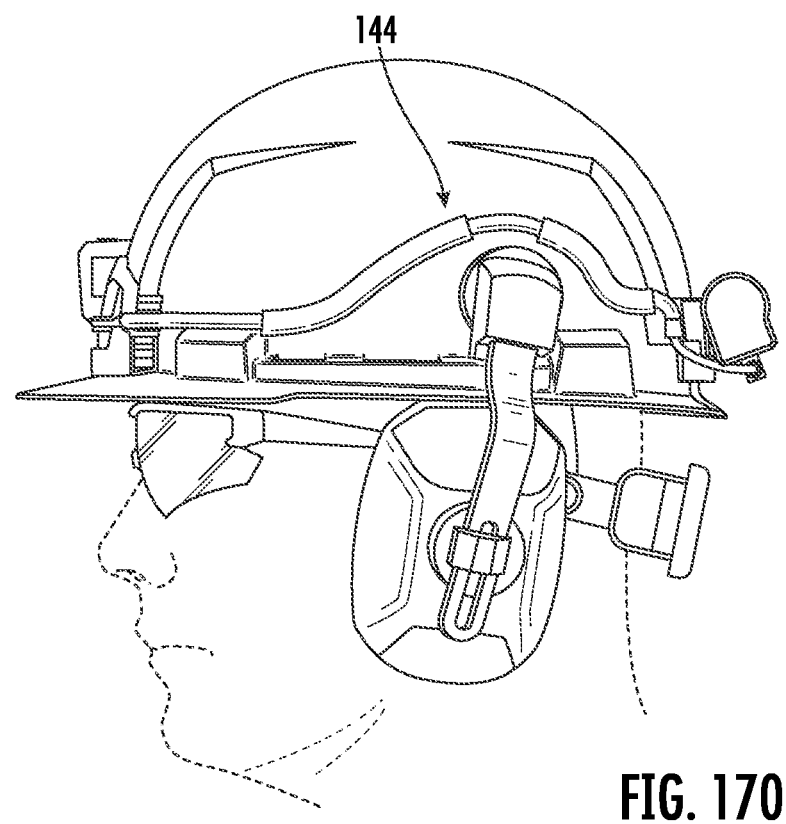
Figure 171:
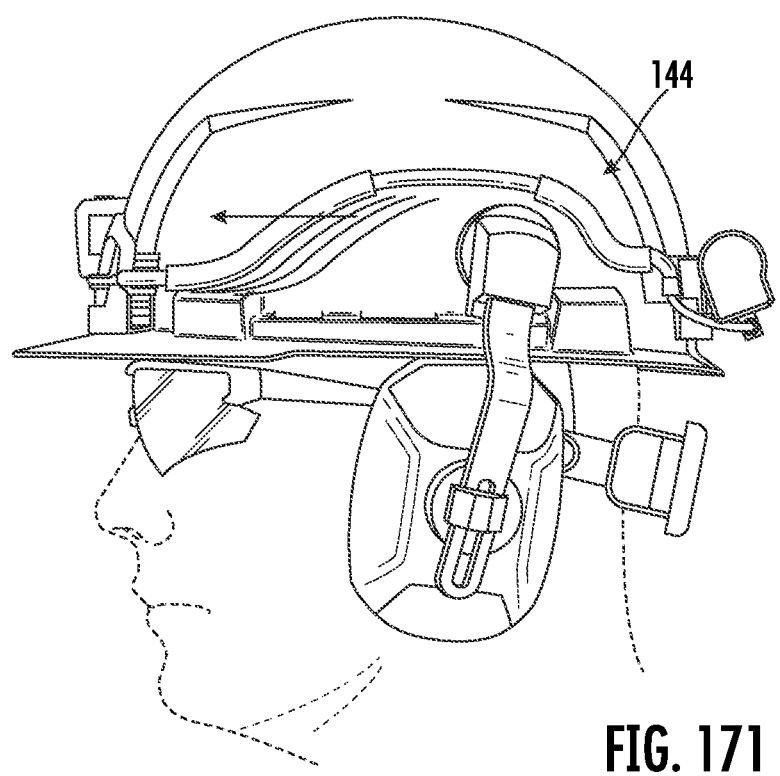
Figure 172:
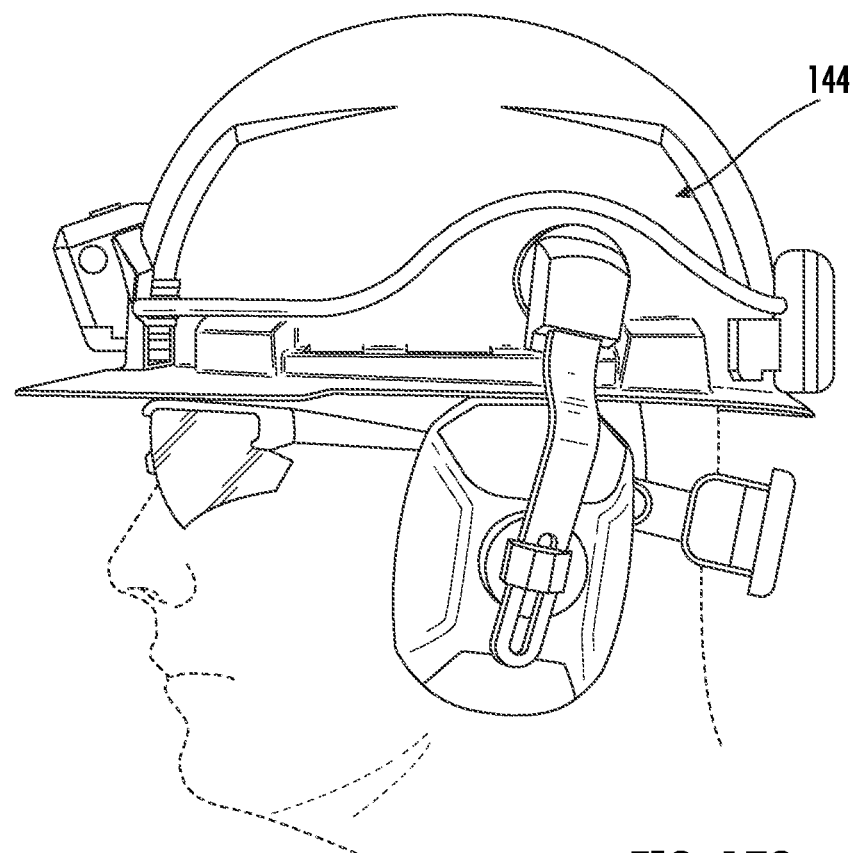
Figure 173:
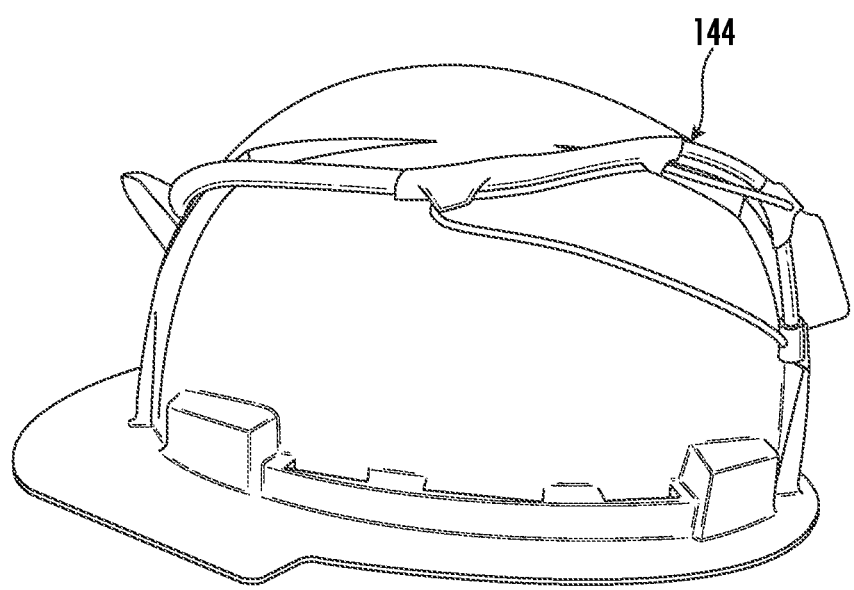
Figure 174:
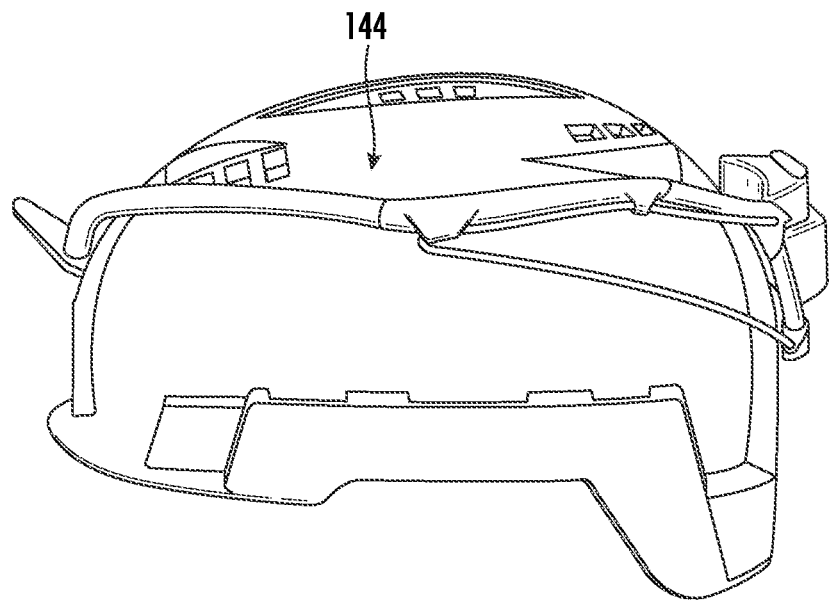

FIG. 167 is a perspective view of a portion of the power cord of FIG. 166, according to an exemplary embodiment.

FIGS. 168-174 are side views of a portion of the power cord of FIG. 166, according to an exemplary embodiment.

Figure 175:
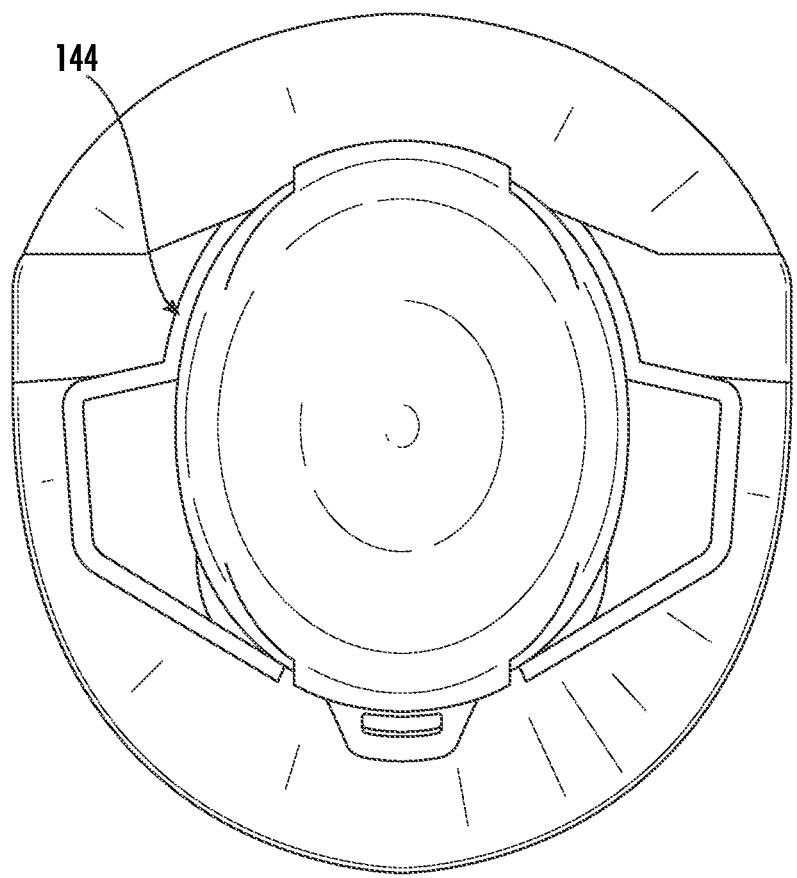

FIG. 175 is a top view of a portion of the power cord of FIG. 166, according to an exemplary embodiment.

Figure 176:
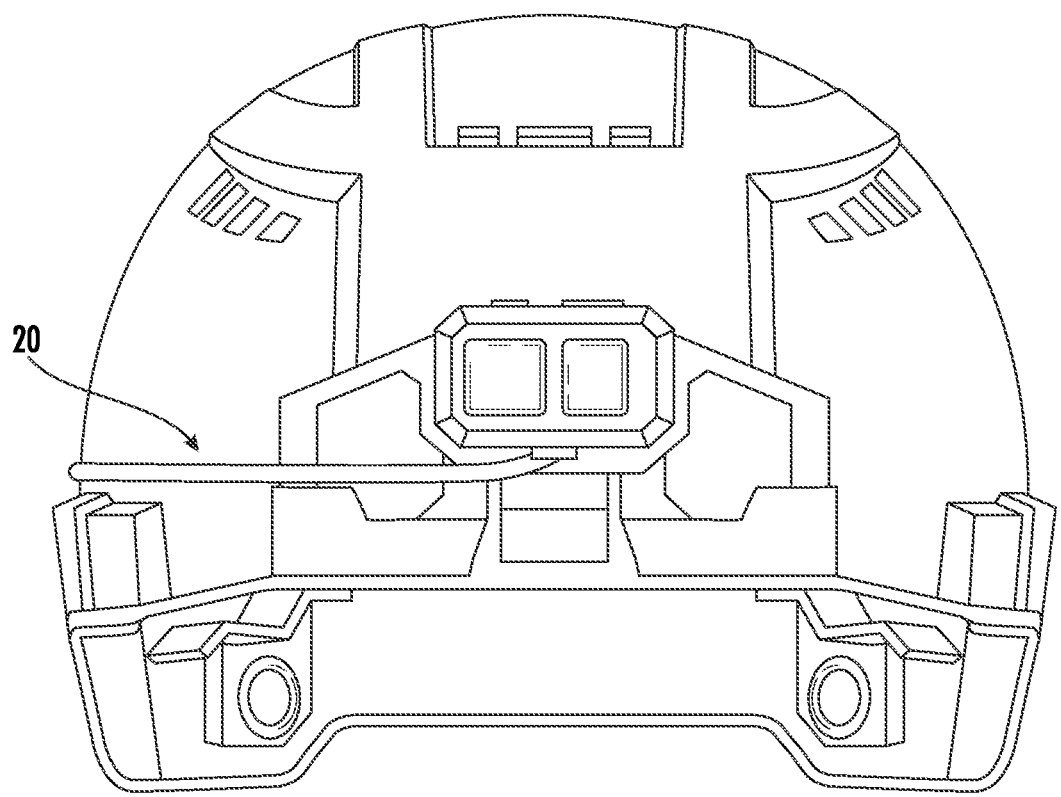

FIG. 176 is a front view of the lighting assembly of FIG. 1, according to an exemplary embodiment.

Figure 177:
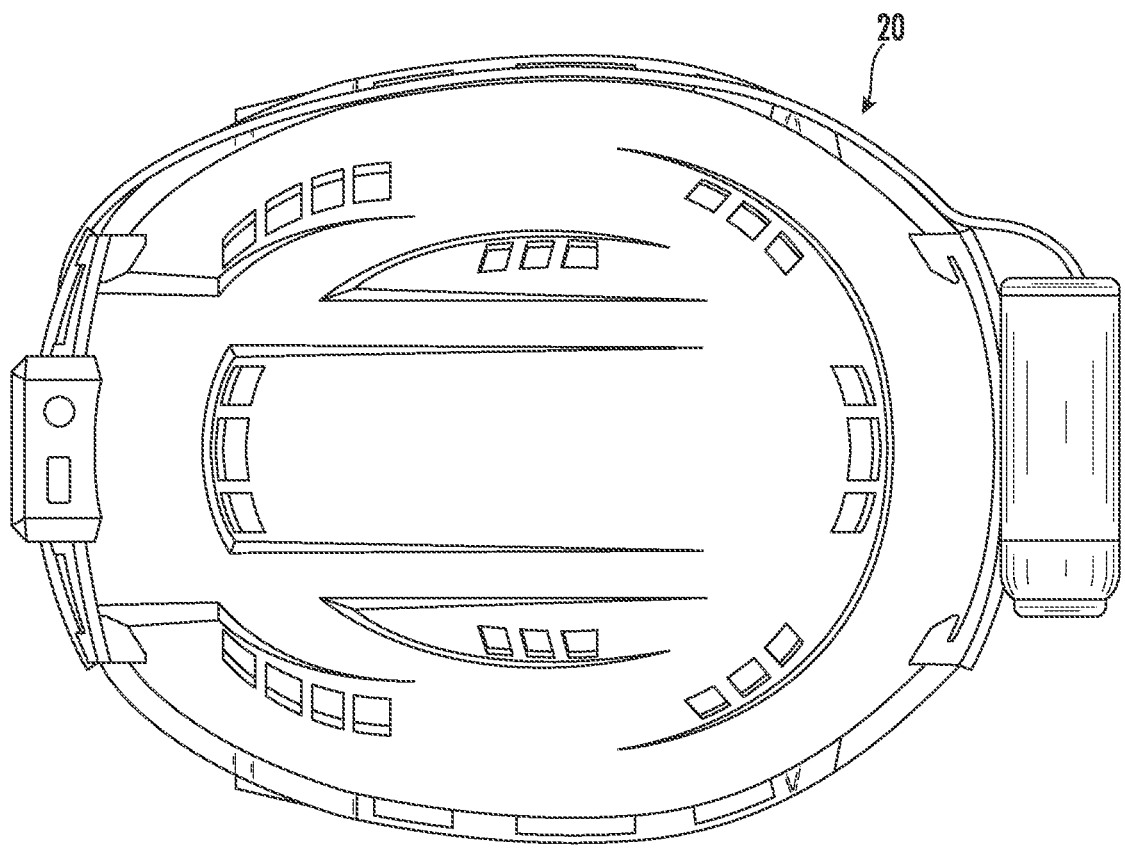

FIG. 177 is a top view of the lighting assembly of FIG. 1, according to an exemplary embodiment.

Figure 178:
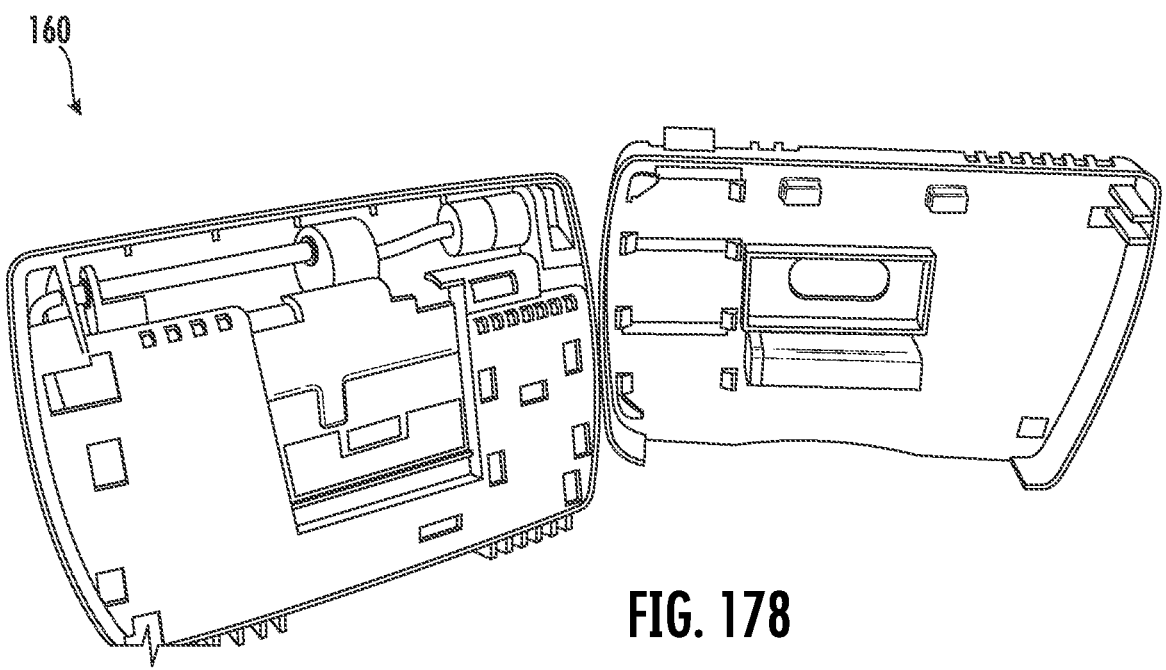

FIG. 178 is a perspective view of electronics, according to an exemplary embodiment.

Figure 179:
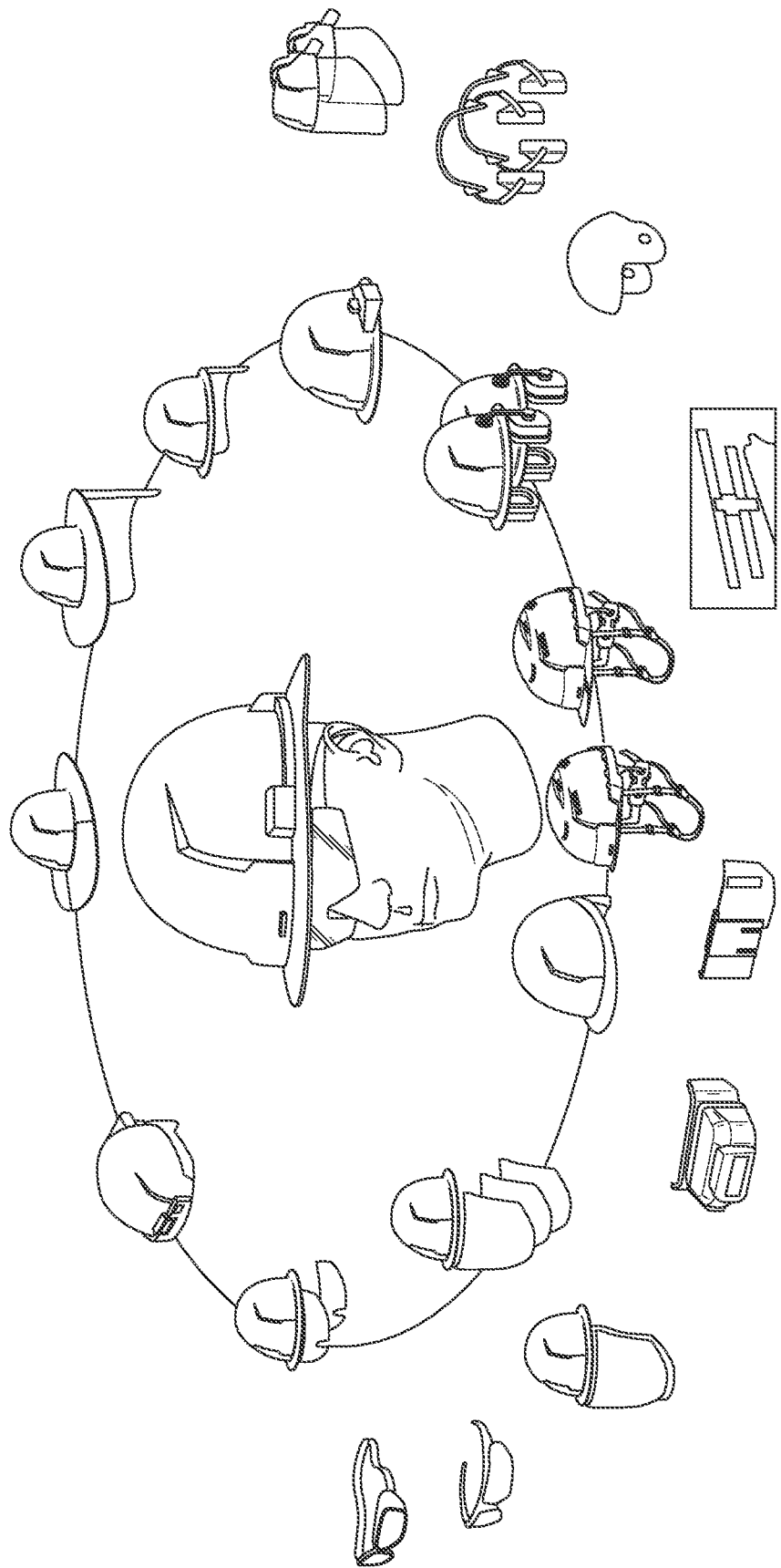

FIG. 179 is an exploded perspective view of various devices coupleable to the safety headwear of FIG. 1, according to an exemplary embodiment.

DETAILED DESCRIPTION

Referring generally to the figures, various embodiments of a hard hat lighting system are shown. Hard hats are used in a variety of construction jobs or other construction, residential, or commercial situations. Hard hats are often used in dim or poorly lit environments. In conventional lamp attachment systems, an operator couples a lamp to a hard hat via a strap wrapped around the hardhat. However, the strapped lamp often experiences jarring, which may cause the lamp to become unsecured and/or fall off. To avoid this, some operators mount the lamp onto a mounting clip that is secured to the hardhat through destructive means, such as drilling a hole in the hard hat and bolting on the mounting clip. The lamp is then attached to the mounted clip.

In contrast, the hard hat system discussed herein utilizes an attachment system that couples to one or more elements of the hard hat without damaging the hard hat. In this manner, the lamp is more secure than the typical wrapped strap arrangement and avoids the potential problems associated with mounting systems that involve permanent alteration of the hard hat structure to attach the lamp.

Referring to FIGS. 1-8, various aspects of hard hat system 8 are shown according to an exemplary embodiment. In various embodiments hard hat system 8 includes safety headwear 210, bracket 14, headlamp 12, mounting bracket 306 for battery pack 18, and/or an extender (e.g., extender 36) that couples the headlamp 12 to the bracket 14. Lighting assembly 10 couples to safety headwear 210. A front coupling component, shown as brim guard 16, couples to a front of safety headwear 210. Bracket 14 couples to safety headwear 210, such as via being directly coupled to a portion of brim guard 16 that is coupled to safety headwear 210.

Alternatively, bracket 14 is coupled between brim guard 16 and safety headwear 210. A lighting unit, shown as headlamp 12, is coupled to bracket 14. Headlamp 12 receives power from a power supply, shown as battery pack 18, via wire 20. In a specific embodiment, battery pack 18 includes a lithium USB battery. In various embodiments, safety headwear 210 comprises a hard hat. In various embodiments, headlamp 12 is coupled to a front 206 of safety headwear 210.

In a specific embodiment, battery pack 18 includes a removable and rechargeable RLUSB battery used in lighting. In a specific embodiment, battery pack 18 includes a RLUSB battery that is rechargeable in the light or in a separate charger. In a specific embodiment, battery pack 18 includes an internal rechargeable (not removable) battery. In a specific embodiment, battery pack 18 includes a rechargeable and/or removable lithium, NiCad, NiMH battery or primary cells such as alkaline batteries. In a specific embodiment, battery pack 18 includes a power source mounted on the sides or as a part of the headlamp in front (e.g., alkaline cells or internal rechargeable). In a specific embodiment, battery pack 18 includes a power source connected to a light head by a cord, and one or more cord management concept(s) described below. In various embodiments, brim guard 16 includes a mounting element 170 coupled to safety headwear 210 and visor 172. In various embodiments visor 172 extends forward from safety headwear 210 and/or the head of the person wearing safety headwear 210, and mounting element 170 extends vertically upward from visor 172. In various embodiments, safety headwear 210 includes shell 174 formed from a rigid material, the shell 174 defining an external surface 176 and an opposing internal surface 178 that defines a cavity sized to receive the head of a wearer. In various embodiments, battery pack 18 is configured to supply electrical power to an accessory coupled to the hard hat (e.g., headlamp 12).

Figure 7:
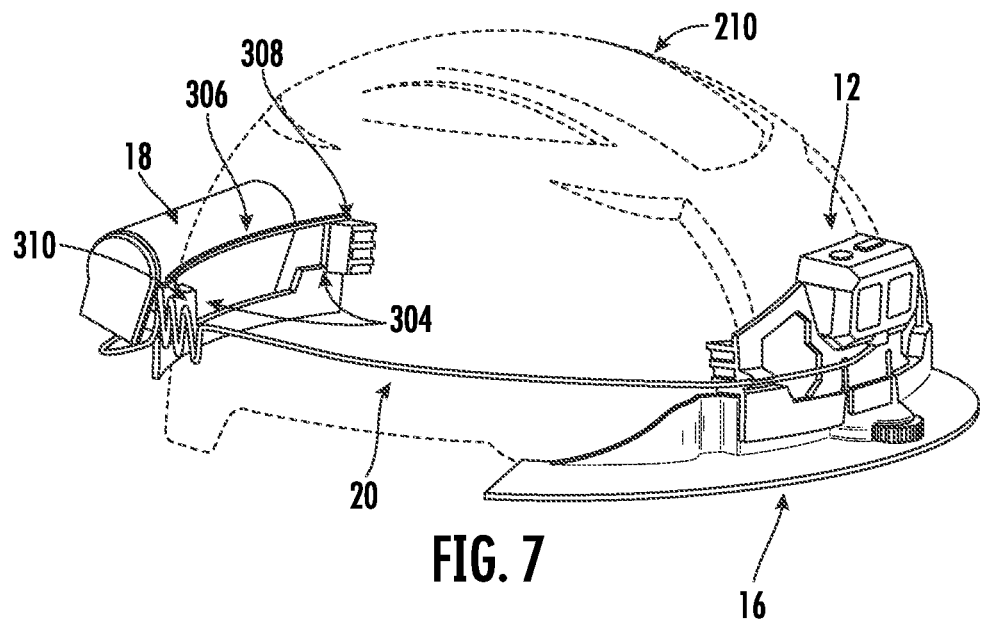
FIG. 7 is a top view of the lighting assembly of FIG. 1 coupled to a silhouette image of a safety headwear, according to an exemplary embodiment.

In various embodiments, safety headwear 210 includes a rear mounting element 302 extending from a rear 208 of the safety headwear 210. The rear mounting element 302 includes opposing ridges 304 that extend circumferentially around the shell and away from each other. A mounting bracket 306 for battery pack 18 is coupled to safety headwear 210 and battery pack 18 is coupled to mounting bracket 306, thereby securing battery pack 18 to safety headwear 210. Referring to FIG. 7, mounting bracket 306 includes opposing arms 308, 310 that engage between the shell and the opposing ridges 304 of the safety headwear 210.

Figure 8:
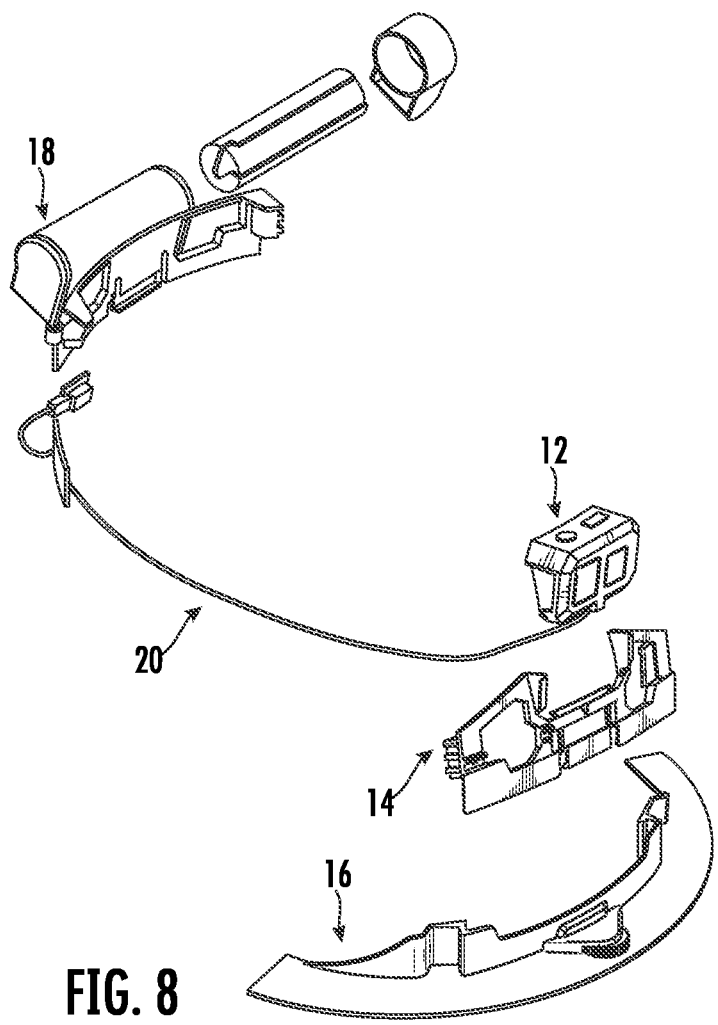
FIG. 8 is an exploded perspective view of the lighting assembly of FIG. 1, according to an exemplary embodiment.

Referring to FIGS. 9-12, in various embodiments a forward-extending unit, shown as extender 36, couples to bracket 14. When coupled to extender 36, headlamp 12 is positioned further forward with respect to safety headwear 210 (FIG. 10) compared to when headlamp 12 is coupled directly to bracket 14 (FIG. 8). In a specific embodiment, extender 36 positions headlamp 12 a distance of 20 mm further forward compared to when headlamp 12 is coupled directly to bracket 14.

In various embodiments, bracket 14 includes a first arm 180 and a second arm 182, each of which extend forward from the safety headwear 210. First arm 180 includes a first protrusion 190 that extends towards the second arm 182, and the second arm 182 includes a second protrusion 192 that extends towards the first arm 180. As will be shown, first protrusion 190 and second protrusion detachably couple with headlamp 12.

Figure 9:
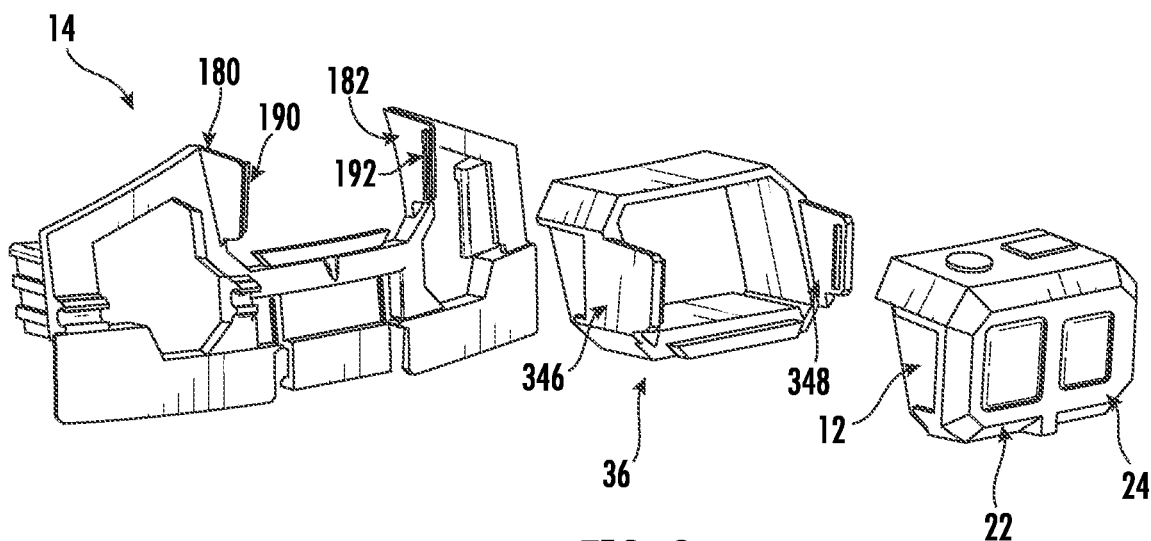
FIG. 9 is an exploded perspective view of a portion of the lighting assembly of FIG. 1, according to an exemplary embodiment.
Figure 10:
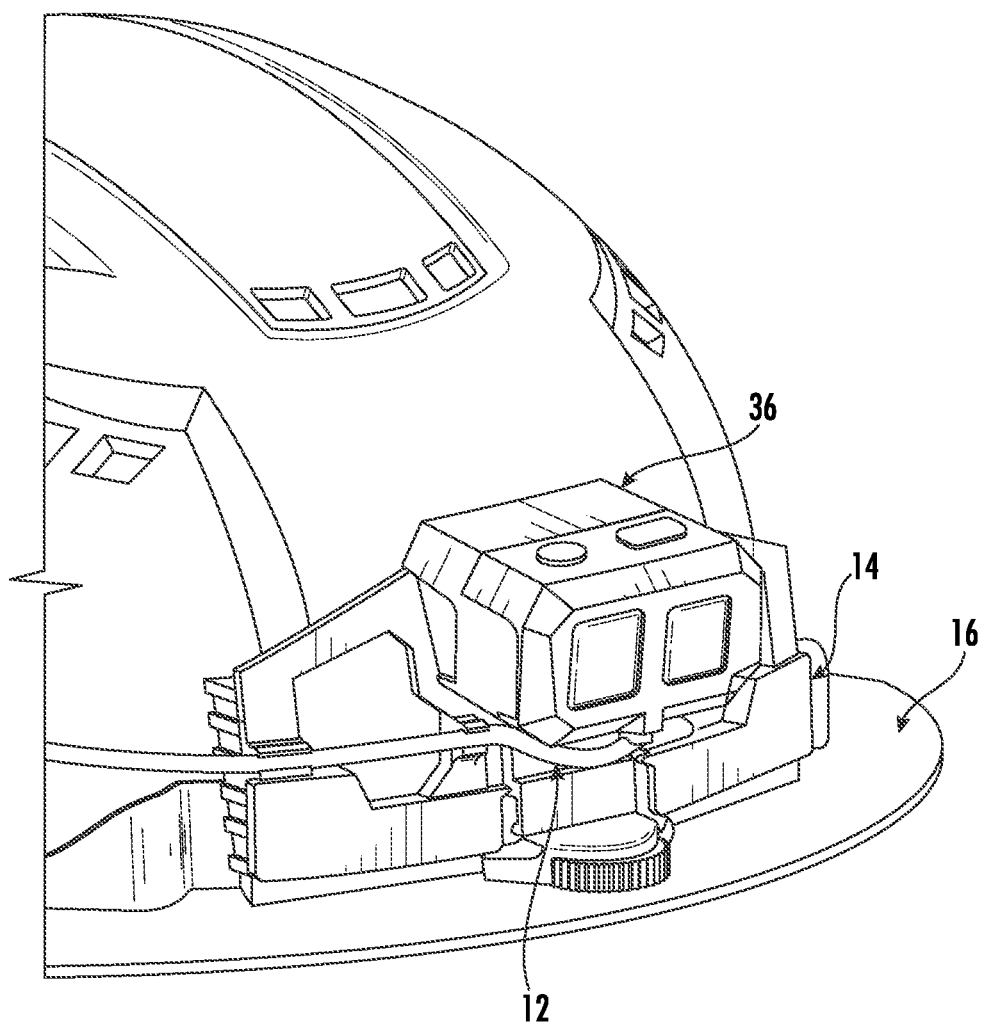
FIG. 10 is a detailed perspective view of the lighting assembly of FIG. 1 coupled to safety headwear, according to an exemplary embodiment.
Figure 11:
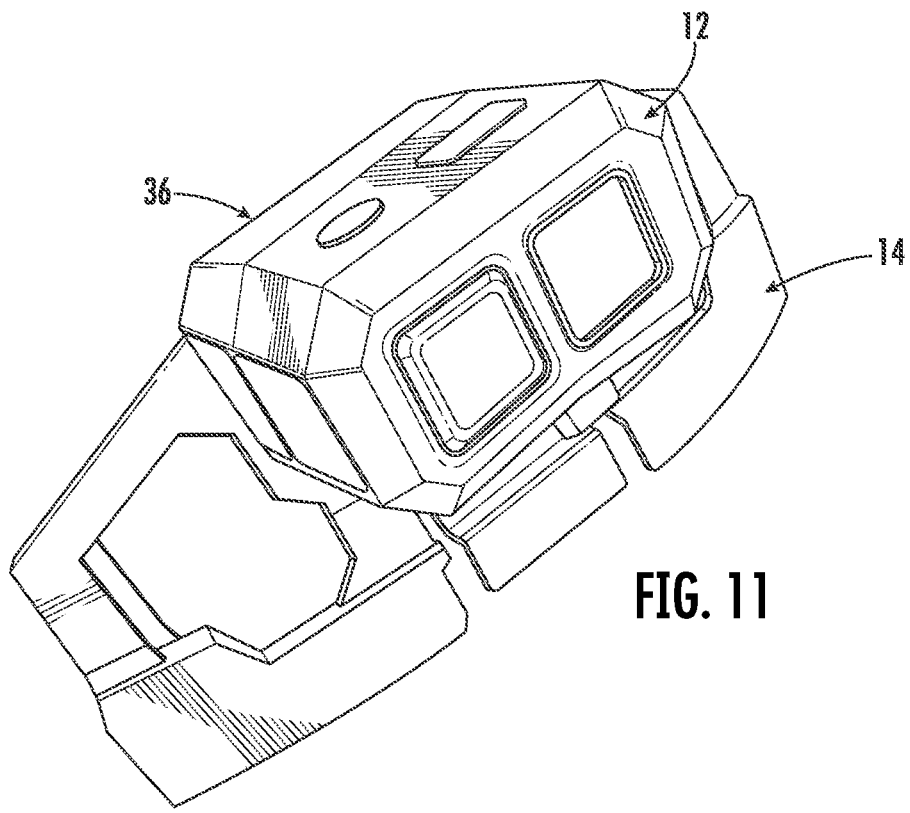
FIG. 11 is a detailed perspective view of a portion of the lighting assembly of FIG. 1, according to an exemplary embodiment.
Figure 12:
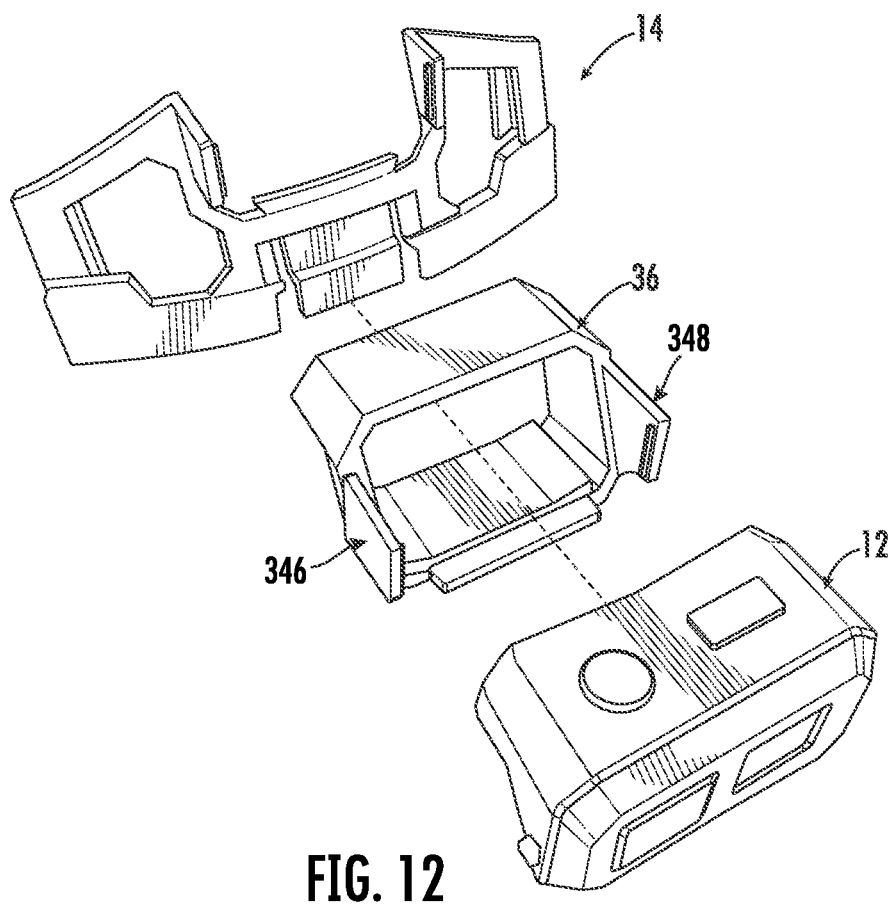
FIG. 12 is an exploded perspective view of a portion of the lighting assembly of FIG. 1, according to an exemplary embodiment.

Referring to FIG. 9, in various embodiments extender 36 includes first arm 346 and second arm 348 that extend forward from the safety headwear. As will be shown, extender 36 can be used to position headlamp 12 further forward in front of the hard hat, thereby reducing the amount of light that is intercepted by an upper surface of the brim of the hard hat and/or the brim of a brim guard. Extender 36 includes a first arm 346 and a second arm 348 that each extend forward from bracket 14.

Figures 13, 14:
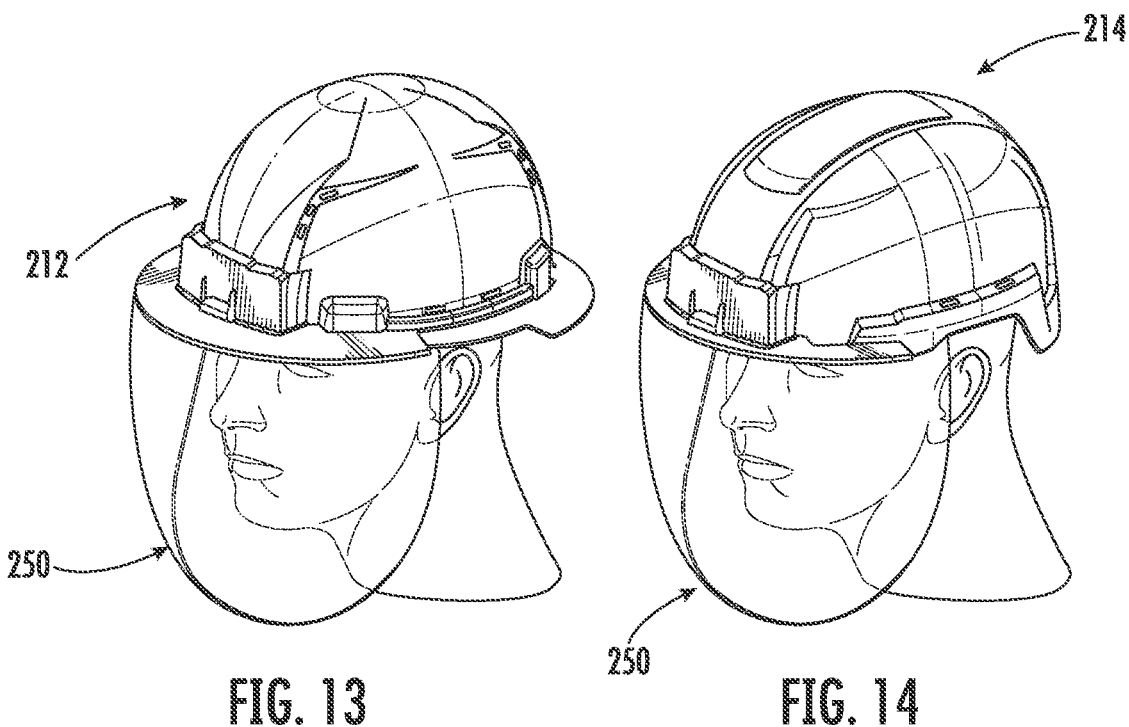
FIG. 13 is a perspective view of safety headwear with a facemask, according to an exemplary embodiment.
FIG. 14 is a perspective view of safety headwear with a facemask, according to an exemplary embodiment.
Figure 15:
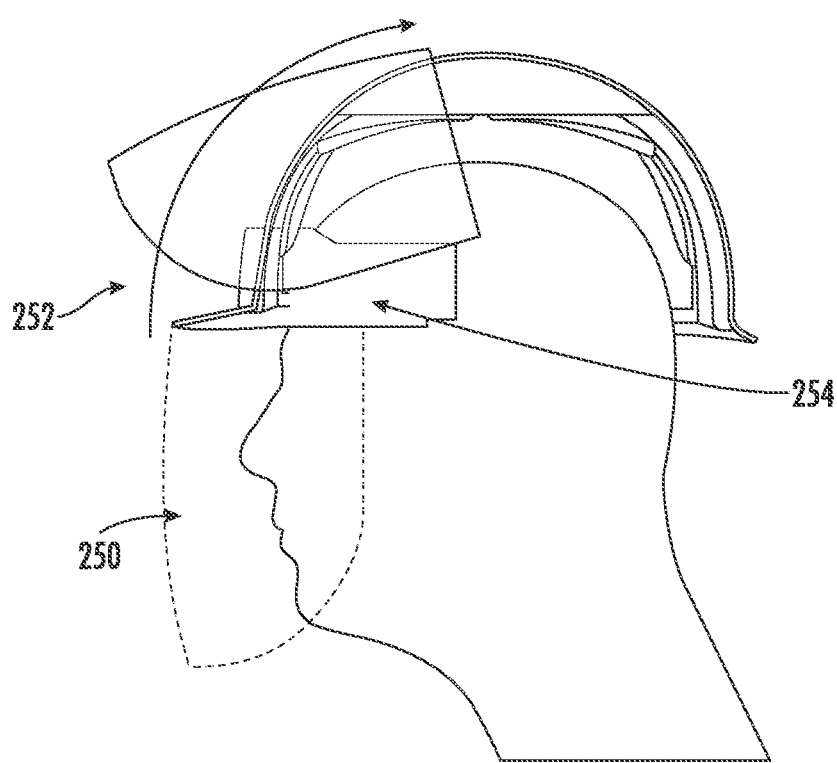
FIG. 15 is a side view of safety headwear with a facemask, according to an exemplary embodiment.
Figure 16:
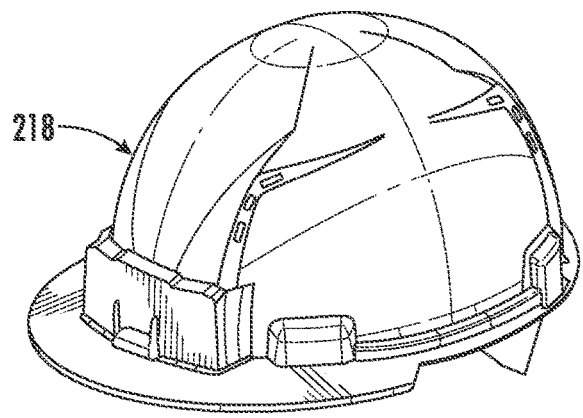
FIG. 16 is a perspective view of safety headwear, according to an exemplary embodiment.

Referring to FIGS. 13-15, various aspects are shown of face shield 250 pivoting upwards on safety headwear with safety headwear 212 with a long brim and safety headwear 214 with a short brim. Face shield 250 pivots upwards along path 252 of face shield 250. In a specific embodiment, face shield 250 is coupled to the safety headwear via a coupling mechanism, shown as a four-bar coupling mechanism 254.

Figure 17:
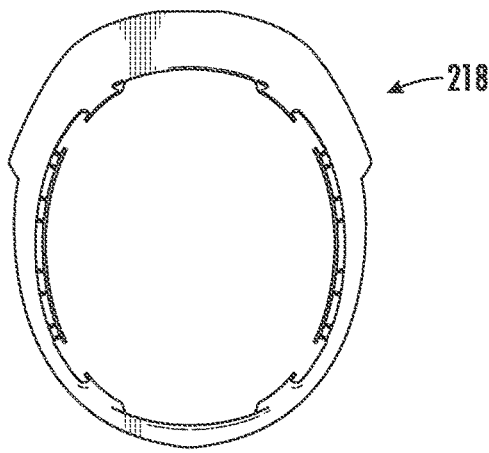
FIG. 17 is a cross-section view from above of the safety headwear of FIG. 16, according to an exemplary embodiment.
Figure 18:
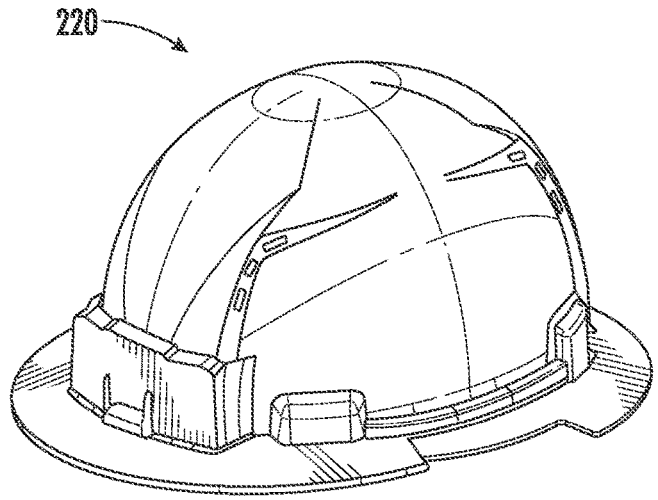
FIG. 18 is a perspective view of safety headwear, according to an exemplary embodiment.
Figure 19:
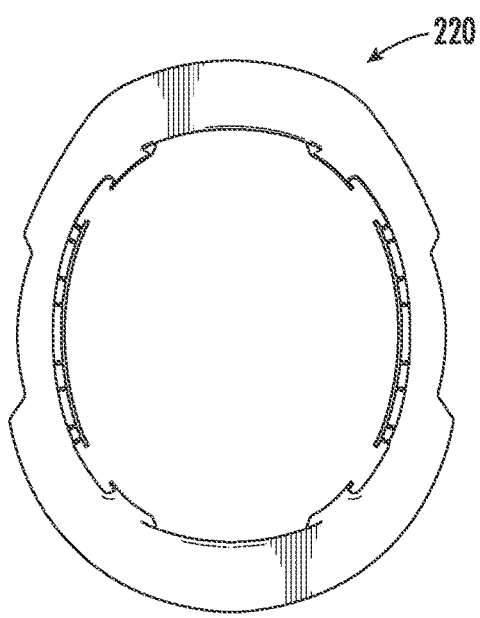
FIG. 19 is a cross-section view from above of the safety headwear of FIG. 18, according to an exemplary embodiment.
Figure 20:
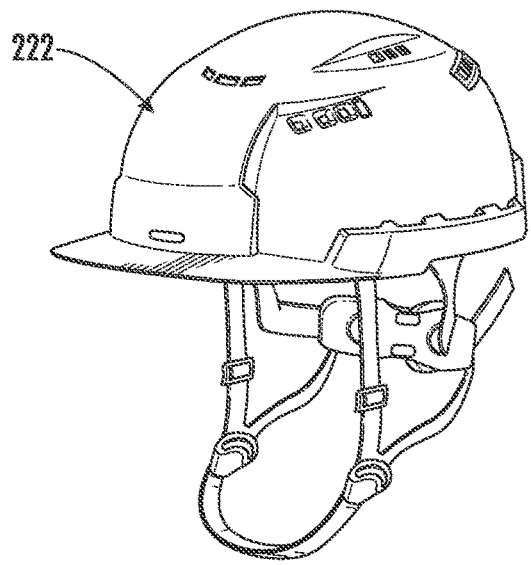
FIG. 20 is a perspective view of safety headwear, according to an exemplary embodiment.
Figure 21:
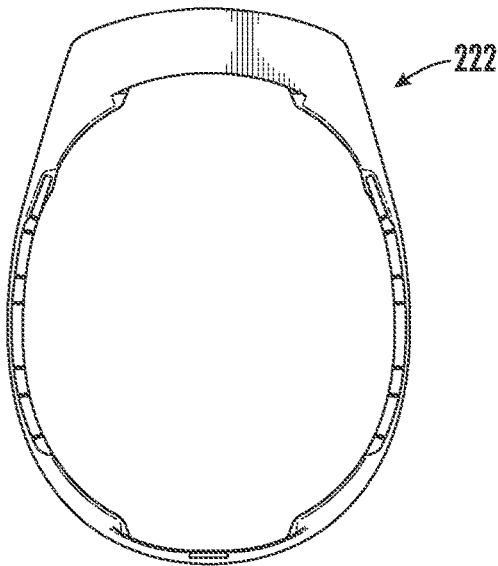
FIG. 21 is a cross-section view from above of the safety headwear of FIG. 20, according to an exemplary embodiment.
Figure 22:
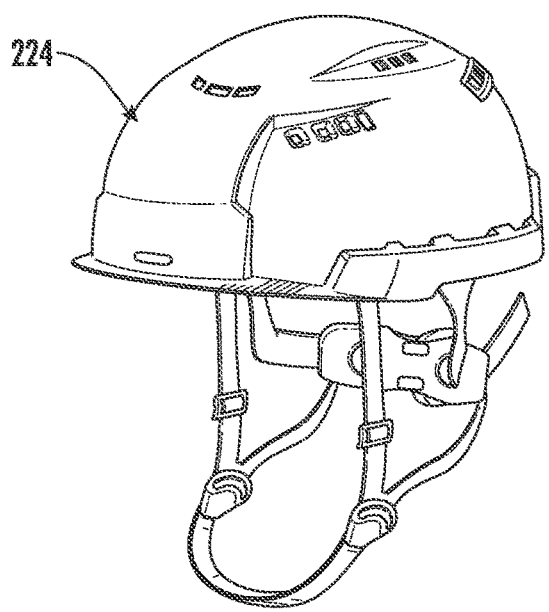
FIG. 22 is a perspective view of safety headwear, according to an exemplary embodiment.
Figure 23:
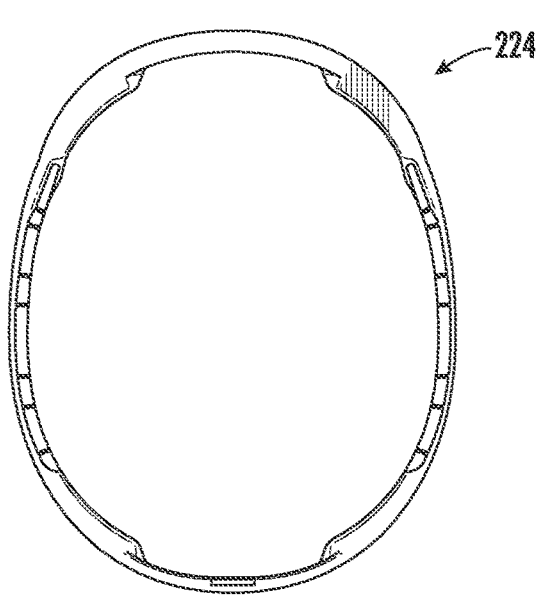
FIG. 23 is a cross-section view from above of the safety headwear of FIG. 22, according to an exemplary embodiment.
Figure 24:
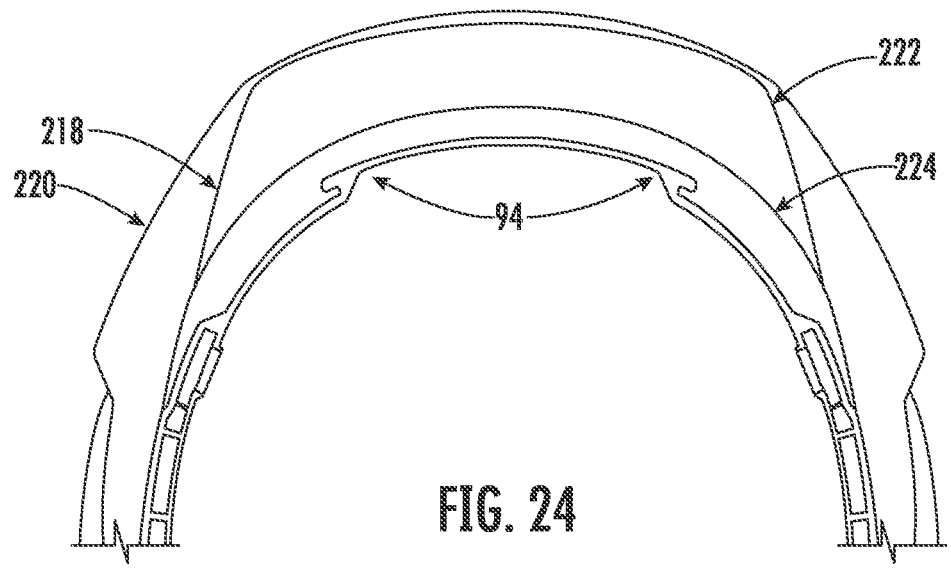
FIG. 24 is a detailed cross-section view from above of a portion of the safety headwear of FIGS. 16, 18, 20 and 22, according to an exemplary embodiment.
Figure 25:
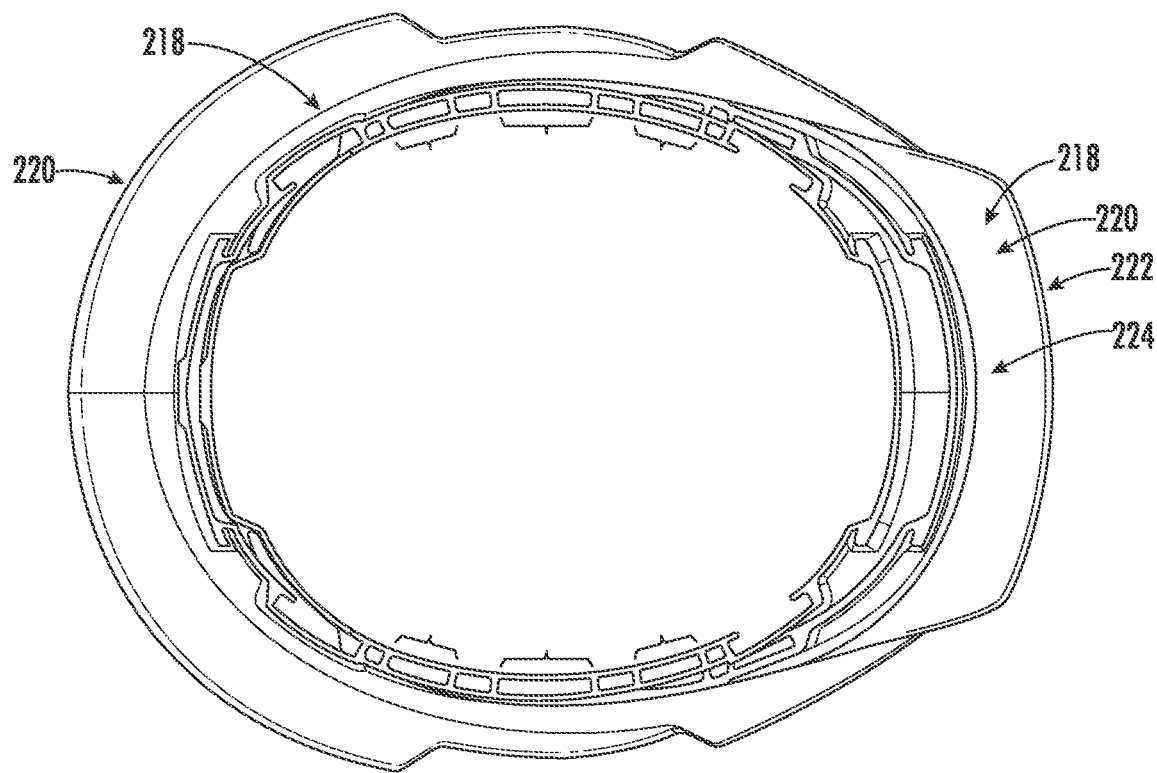
FIG. 25 is a detailed cross-section view from above of a portion of the safety headwear of FIGS. 16, 18, 20 and 22, according to an exemplary embodiment.
Figure 26:
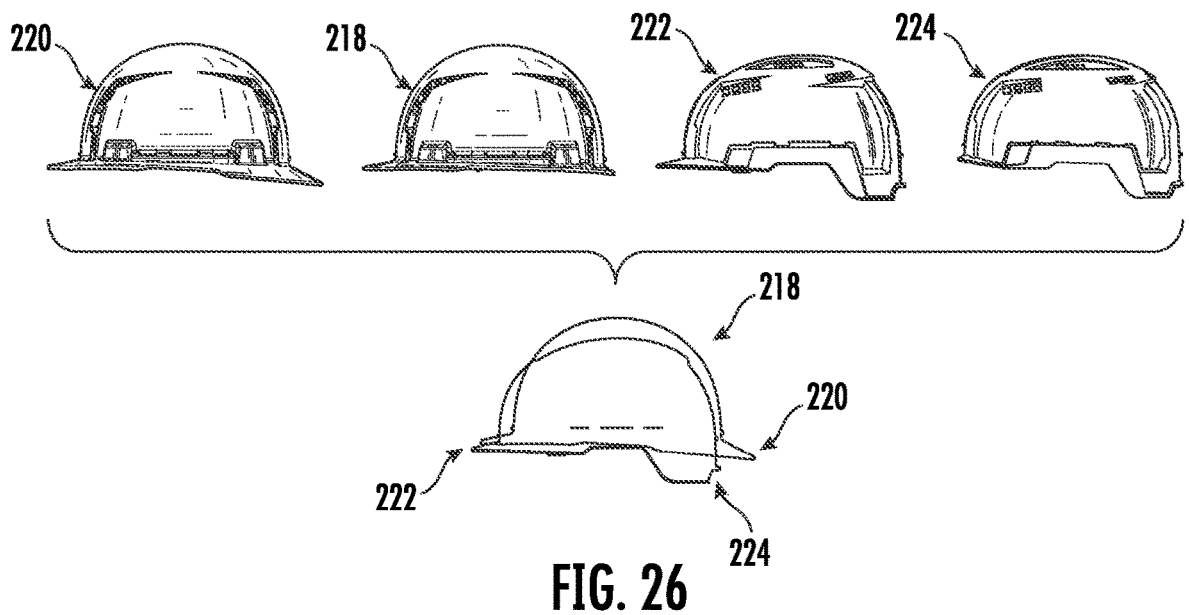
FIG. 26 is a composite of outline views of the safety headwear of FIGS. 16, 18, 20 and 22, according to an exemplary embodiment.

Referring to FIGS. 16-26, various embodiments of different safety headwear are shown. A front brim hard hat 218 is shown in FIGS. 17-18, a full brim hard hat 220 is shown in FIGS. 19-20, a front brim helmet 222 is shown in FIGS. 21-22, and a no brim helmet 224 is shown in FIGS. 23-24. Referring to FIGS. 25-26, the comparative sizes and configurations of front brim hard hat 218, full brim hard hat 220, a front brim helmet 222, and no brim helmet 224 are shown overlaid on each other.

Figure 27:
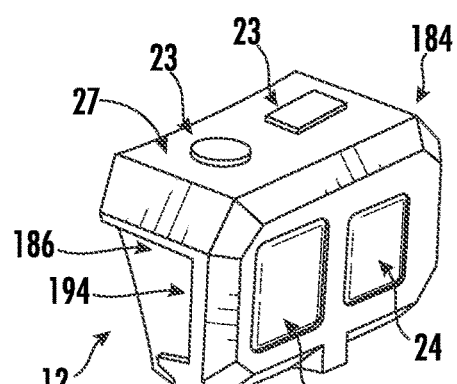
FIG. 27 is a detailed perspective view of a headlamp of the lighting assembly of FIG. 1, according to an exemplary embodiment.
Figure 28:
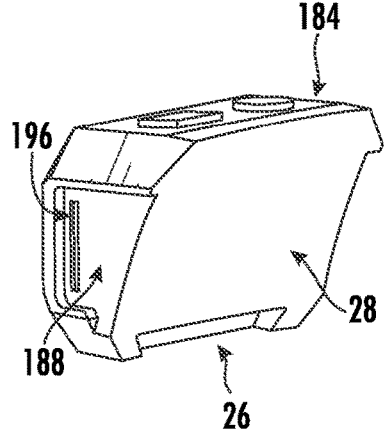
FIG. 28 is a detailed perspective view of the headlamp of FIG. 27, according to an exemplary embodiment.
Figure 29:
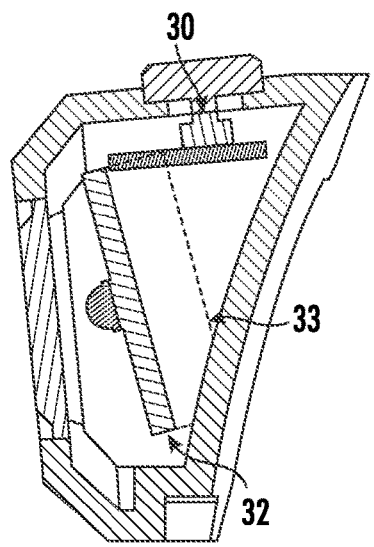
FIG. 29 is a cross-section perspective view of the headlamp of FIG. 27, according to an exemplary embodiment.

Referring to FIGS. 27-29, in various embodiments headlamp 12 includes a wide-angle light, shown as flood light 24, and a tighter-range light, shown as spot light 22. The various lighting elements (e.g., flood light 24 and/or spot light 22) of headlamp 12 are controlled by one or more interfaces, shown as interface button 23, which are configured to control the one or more light emitting elements in headlamp 12. In a specific embodiment, one interface button 23 is a power button, and one interface button 23 is a mode button that controls which of the lighting elements is activated. In various embodiments, interface button 23 extends from an upper surface 27 of headlamp 12.

In a specific embodiment, headlamp 12 includes one or more LEDs, where each LED can be a spot or flood LED, for example one of each. In a specific embodiment, if multiple LED types are used, the light can switch between spot, flood, and/or spot/flood modes. In a specific embodiment, one or more of the LEDs can have a lens to protect the LED and/or converge or diverge the light. In a specific embodiment, the headlamp 12 may be angled to direct light or a reflector/lens may be used to direct light.

Headlamp 12 includes one or more coupling elements, shown as dovetail 26, that couples headlamp 12 to extender 36 or bracket 14. In a specific embodiment, rear surface 28 of headlamp 12 faces towards the safety headwear and is curved (e.g., has an arcuate shape) to accommodate and interfaces with the curved front outer surface of the safety headwear that headlamp 12 is coupled to, such as being concave with respect to the safety headwear (e.g., safety headwear 210).

In various embodiments, headlamp 12 includes housing 184 and one or more lighting element within the housing 184, shown as spot light 22 and flood light 24, are configured to emit light outside housing 184 of headlamp 12. Housing 184 includes a first lateral wall 186 and an opposing second lateral wall 188. First lateral wall 186 detachably engages with the first arm 180 of bracket 14, and the second lateral wall 188 detachably engages with the second arm 182 of bracket 14. In various embodiments, the first lateral wall 186 includes a first recess 194 configured to receive the first protrusion 190 of the first arm 180 of bracket 14 (FIG. 9), and the second lateral wall 188 includes a second recess 196 configured to receive the second protrusion 192 of the second arm 182 of bracket 14 (FIG. 9). Alternately, first lateral wall 186 of headlamp 12 detachably engages with the first arm 346 of extender 36 (FIG. 9) and the second lateral wall 188 of headlamp 12 detachably engages with the second arm 348 of extender 36 (FIG. 9).

In various embodiments, first arm 346 is functionally similar to first arm 180 and second arm 348 is similar second arm 182, respectively, except as otherwise described. In particular, first arm 346 and second arm 348 also includes protrusions that couple with recess(es) in lateral walls of headlamp 12.

Figure 30:
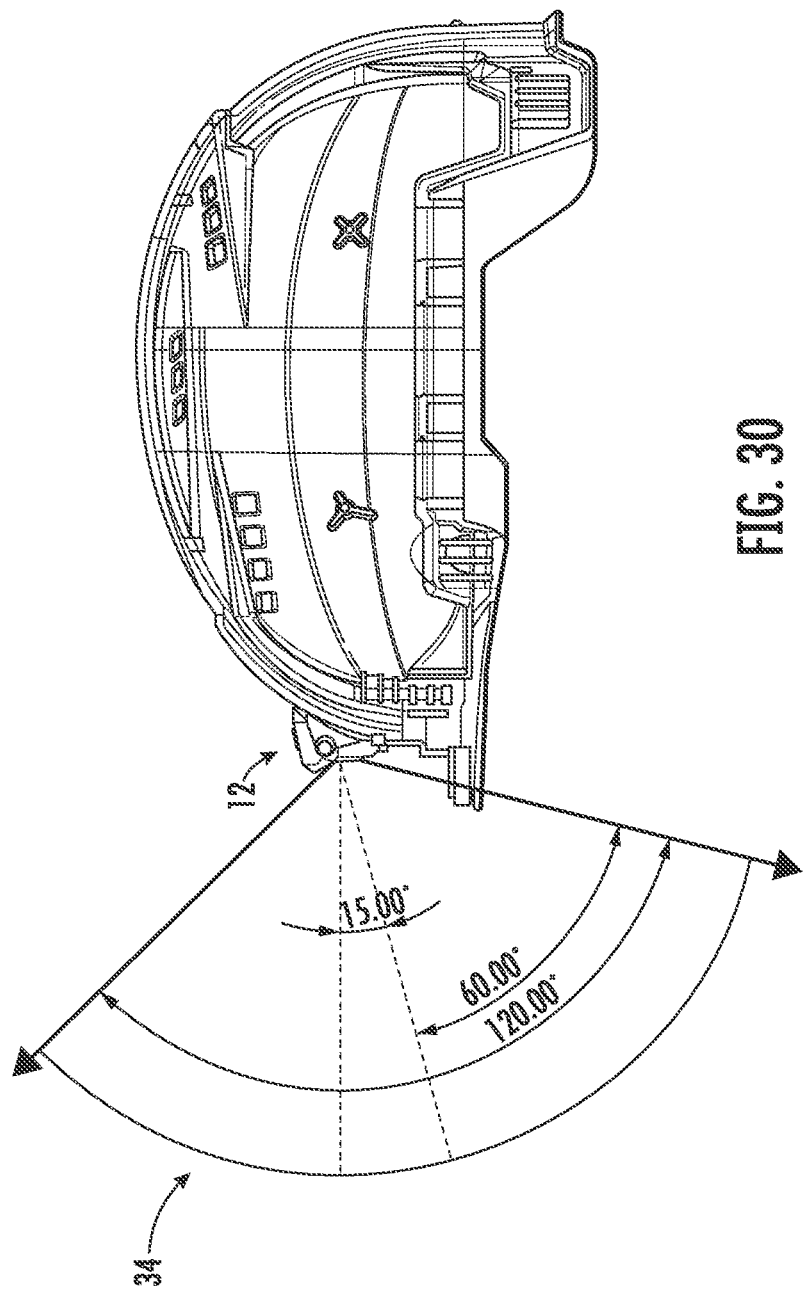
FIG. 30 is a schematic side view of the lighting assembly of FIG. 1 coupled to safety headwear, according to an exemplary embodiment.
Figure 31:
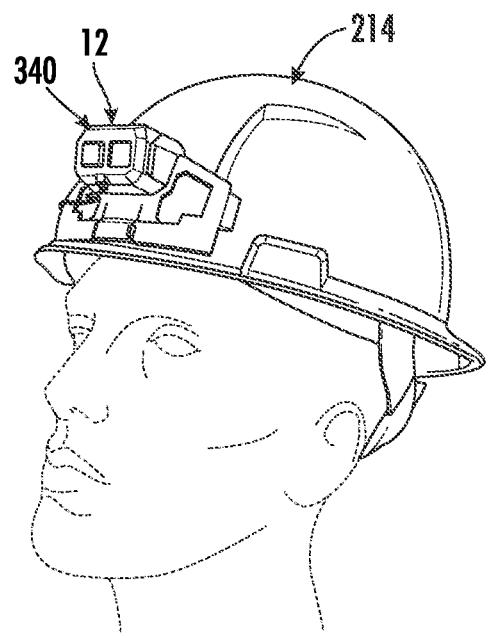
FIG. 31 is a perspective view of the lighting assembly of FIG. 1 coupled to safety headwear, according to an exemplary embodiment.
Figure 32:
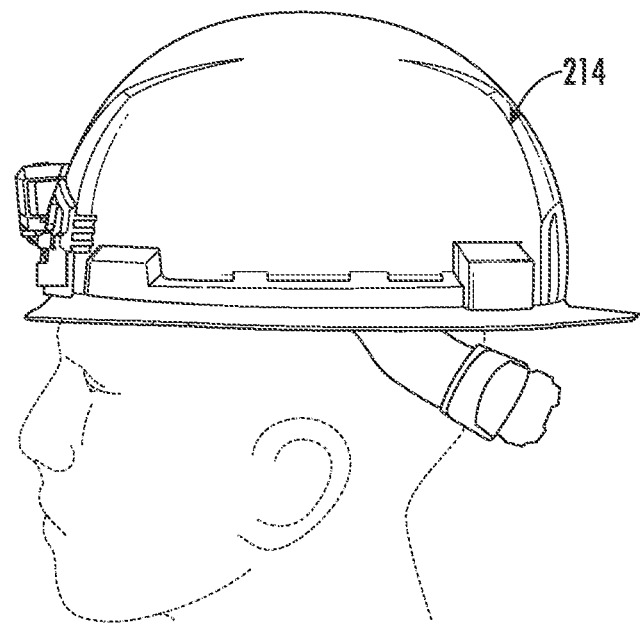
FIG. 32 is a side view of the lighting assembly of FIG. 31 coupled to the safety headwear of FIG. 31, according to an exemplary embodiment.

In a specific embodiment, headlamp 12 includes electronic interface 30, which receives input from one or more of interface buttons 23, heat sink 33, and electronics, shown as printed circuit board with an LED 32. In a specific embodiment, printed circuit board with an LED 32 is positioned at a 15 degree downward angle with respect to the safety headwear headlamp 12 (FIG. 30). In a specific embodiment, field of light 34 output by headlamp 12 covers 120 degrees measured along a vertical axis in front of the user (FIG. 30).

Figure 33:
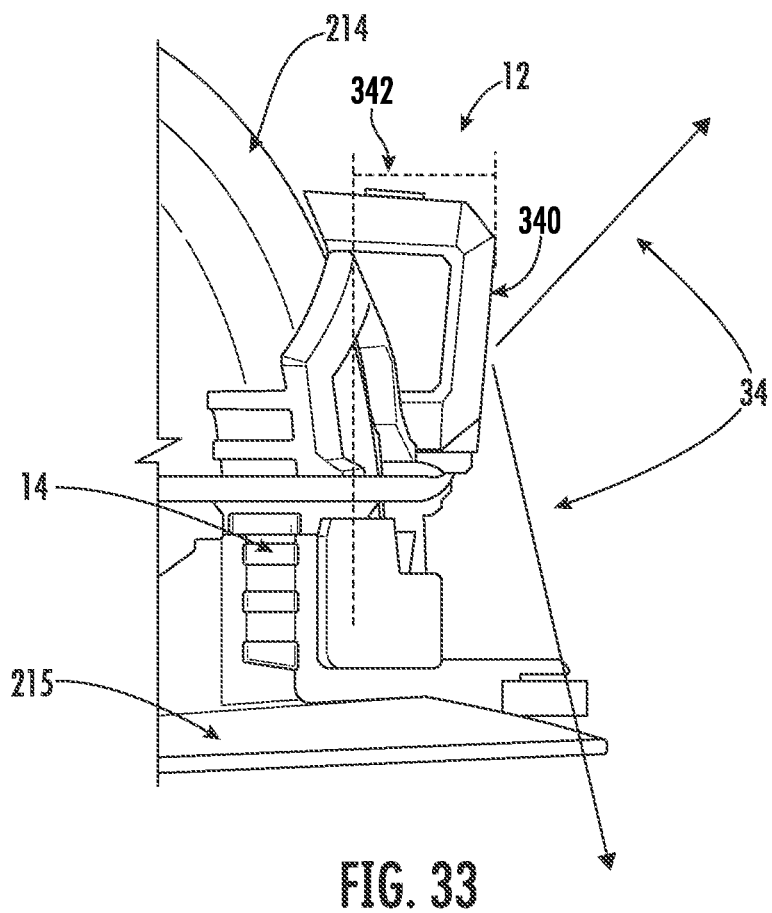
FIG. 33 is a detailed side view of the lighting assembly of FIG. 31 coupled to the safety headwear of FIG. 31, according to an exemplary embodiment.
Figure 37:
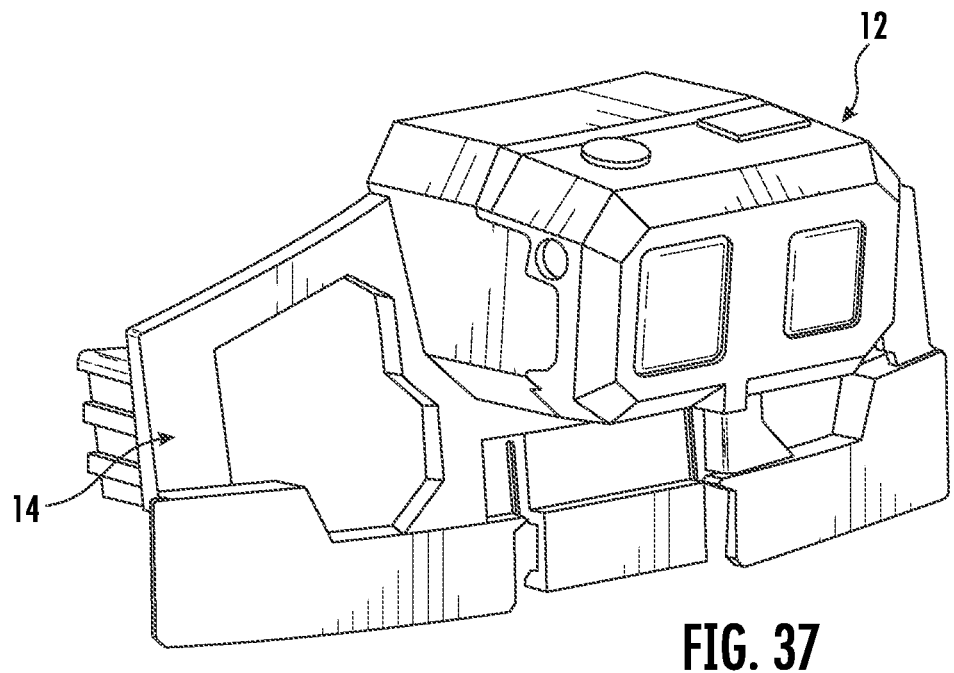
FIG. 37 is a perspective view of the headlamp of FIG. 1, according to an exemplary embodiment.
Figure 38:
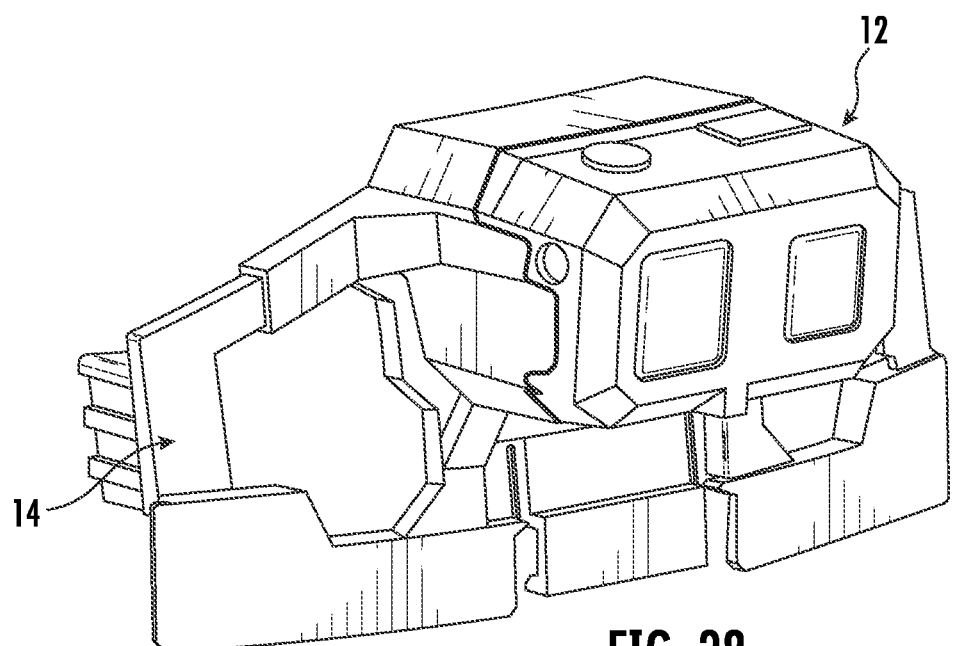
FIG. 38 is a perspective view of the headlamp of FIG. 1, according to an exemplary embodiment.
Figure 39:
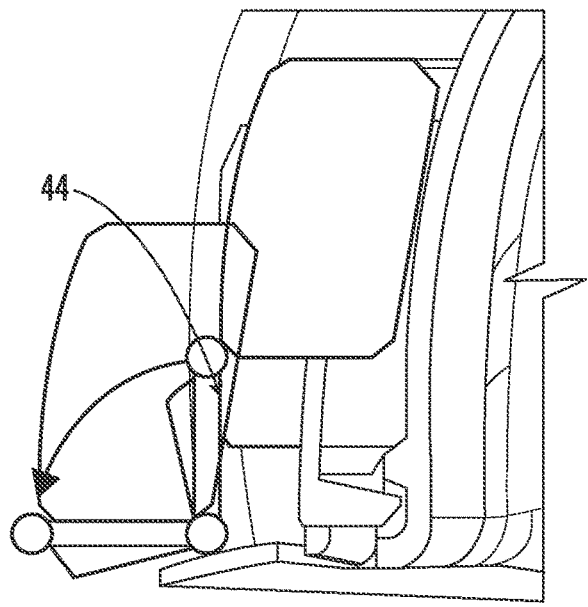
FIG. 39 is a side view of a coupling mechanism, according to an exemplary embodiment.
Figure 40:
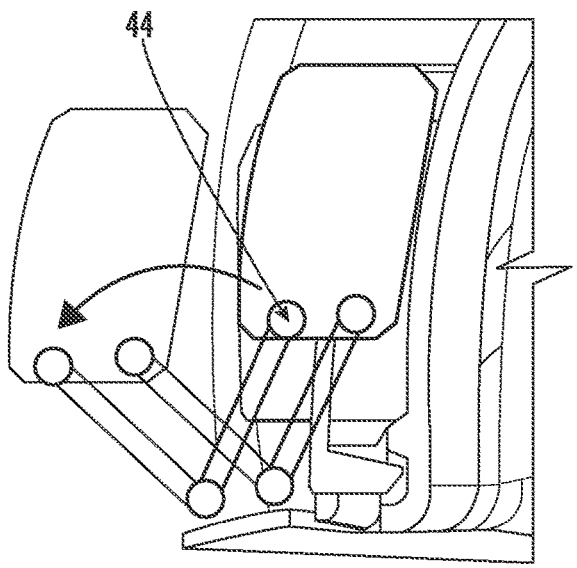
FIG. 40 is a side view of the coupling mechanism of FIG. 39, according to an exemplary embodiment.
Figure 41:
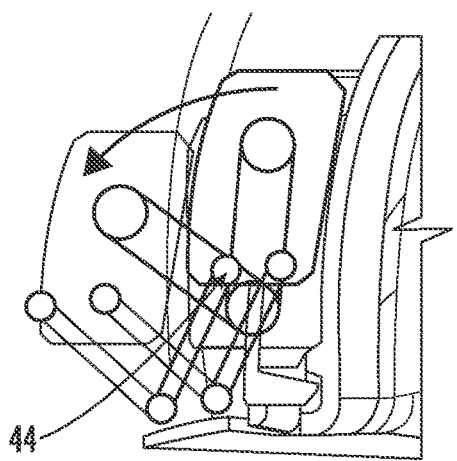
FIG. 41 is a side view of the coupling mechanism of FIG. 39, according to an exemplary embodiment.
Figure 42:
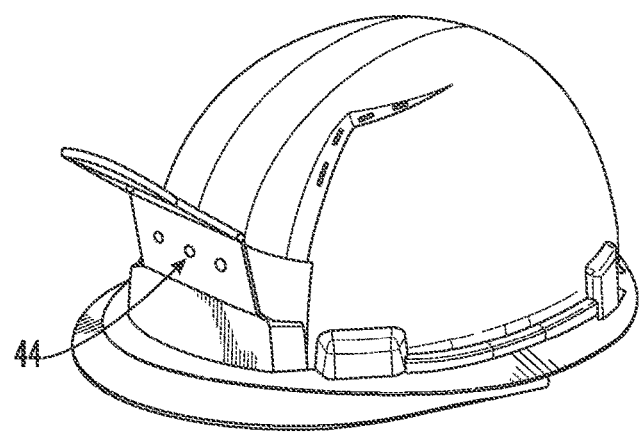
FIG. 42 is a perspective view of the coupling mechanism of FIG. 39, according to an exemplary embodiment.
Figure 45:
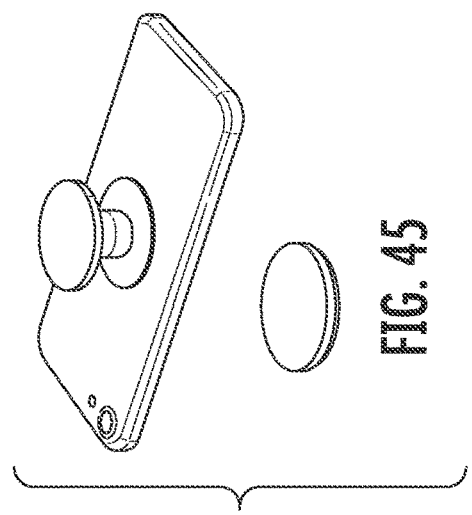
FIG. 45 is a side view of an aspect of a coupling mechanism, according to an exemplary embodiment.
Figure 44:
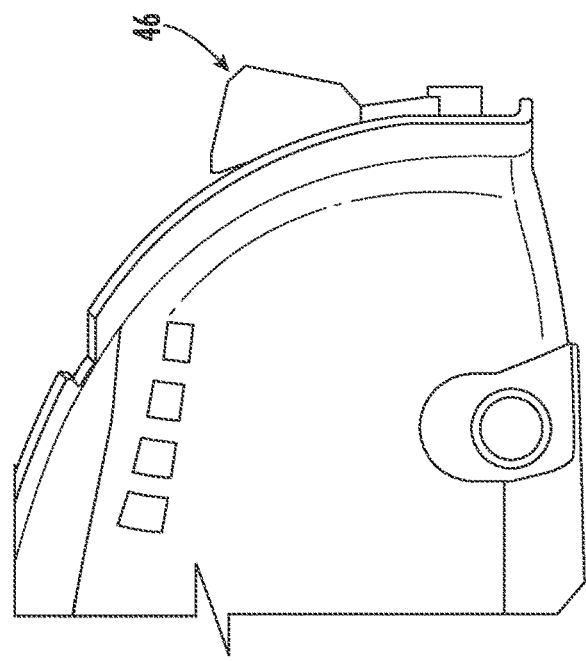
FIG. 44 is a side view of the coupling mechanism of FIG. 43, according to an exemplary embodiment.
Figure 43:
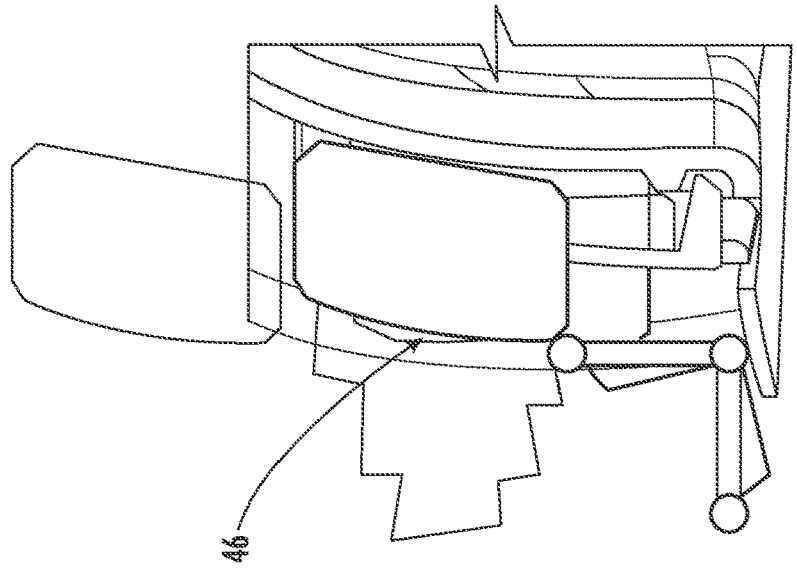
FIG. 43 is a side view of a coupling mechanism, according to an exemplary embodiment.
Figure 48:
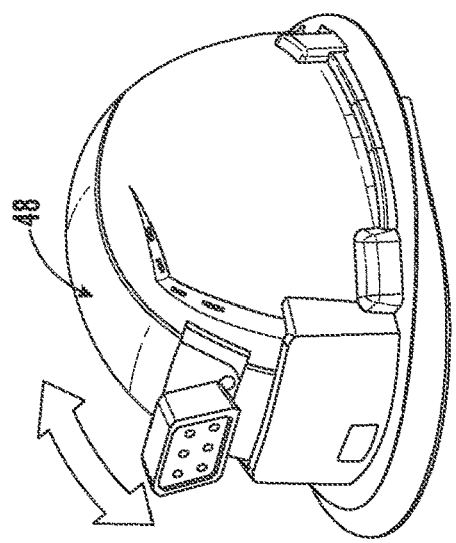
FIG. 48 is a perspective view of the coupling mechanism of FIG. 46, according to an exemplary embodiment.
Figure 47:
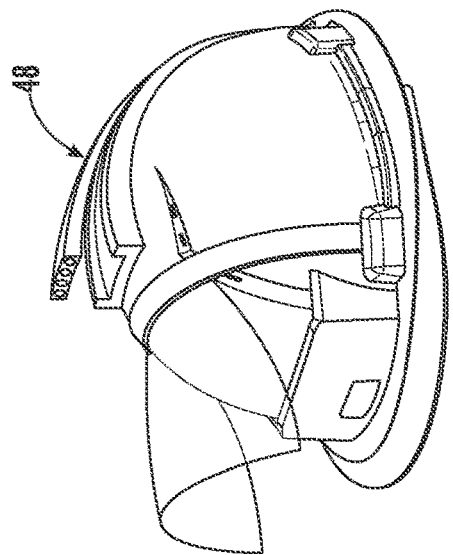
FIG. 47 is a perspective view of the coupling mechanism of FIG. 46, according to an exemplary embodiment.
Figure 46:
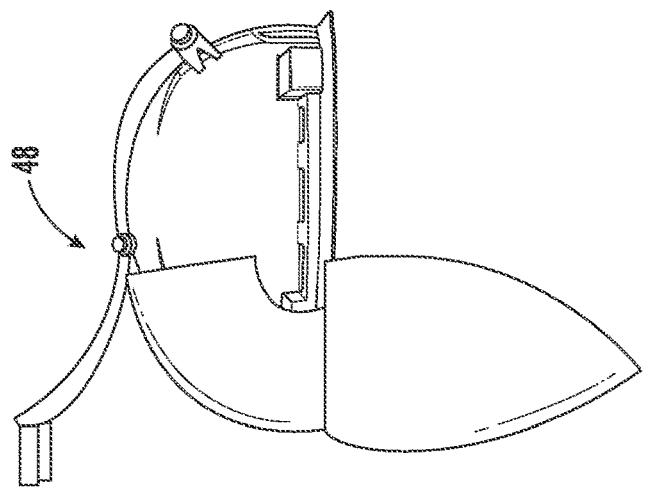
FIG. 46 is a side view of a coupling mechanism, according to an exemplary embodiment.
Figures 49, 50:
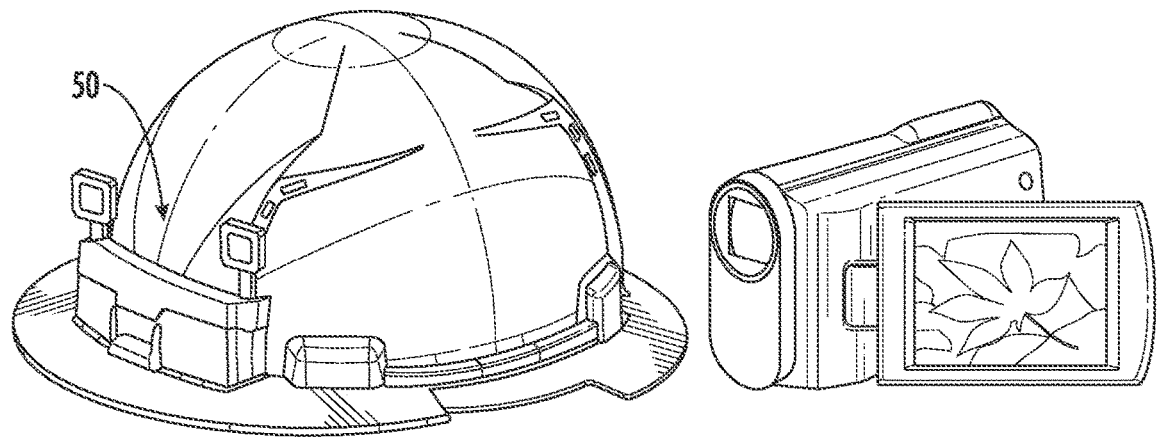
FIG. 49 is a side view of a coupling mechanism coupled to safety headwear, according to an exemplary embodiment.
FIG. 50 is a perspective view of an audio-visual device, according to an exemplary embodiment.
Figures 51, 52:
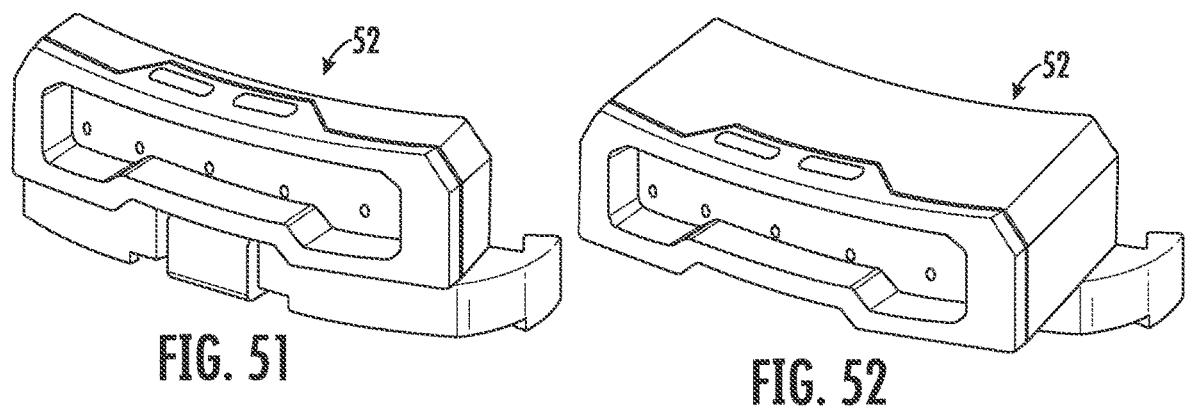
FIG. 51 is a perspective view of aspects of a coupling mechanism, according to an exemplary embodiment.
FIG. 52 is a perspective view of the coupling mechanism of FIG. 51, according to an exemplary embodiment.
Figures 53, 54:
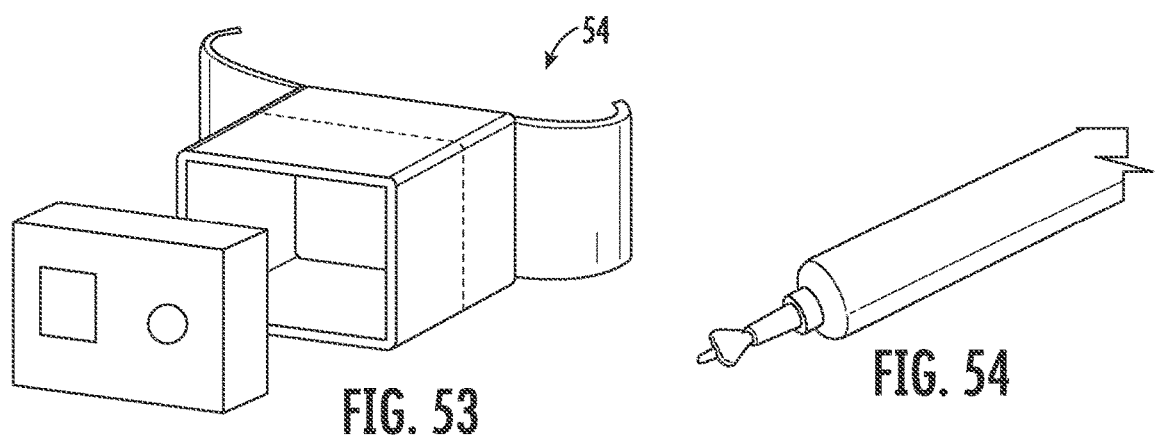
FIG. 53 is a perspective schematic view of a coupling mechanism, according to an exemplary embodiment.
FIG. 54 is a perspective view of a portion of the coupling mechanism of FIG. 53, according to an exemplary embodiment.
Figure 60:
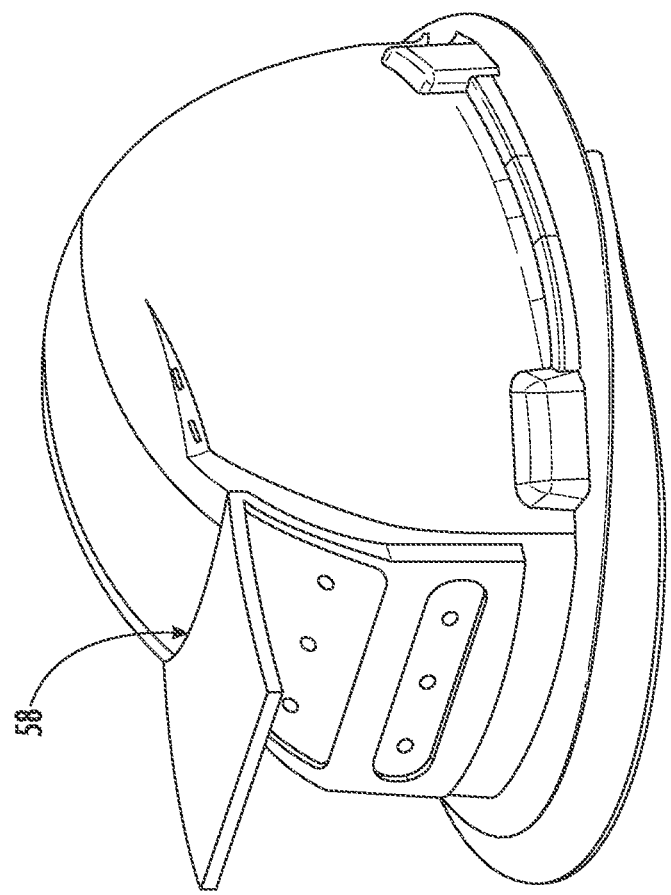
FIG. 60 is a perspective schematic view of the coupling mechanism of FIG. 59, according to an exemplary embodiment.
Figure 59:
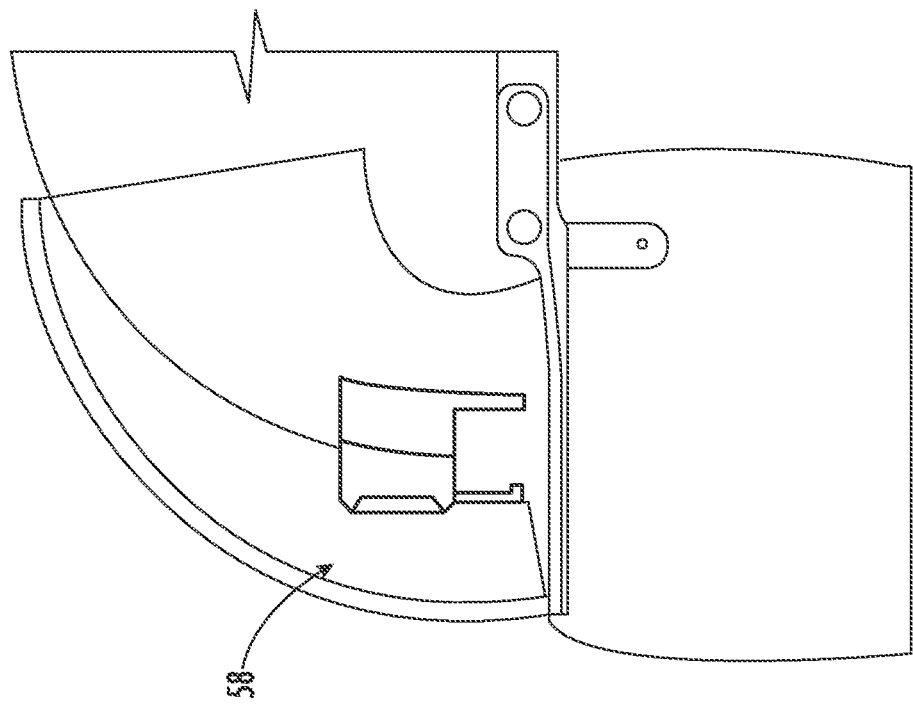
FIG. 59 is a side view of a coupling mechanism, according to an exemplary embodiment.
Figure 61:
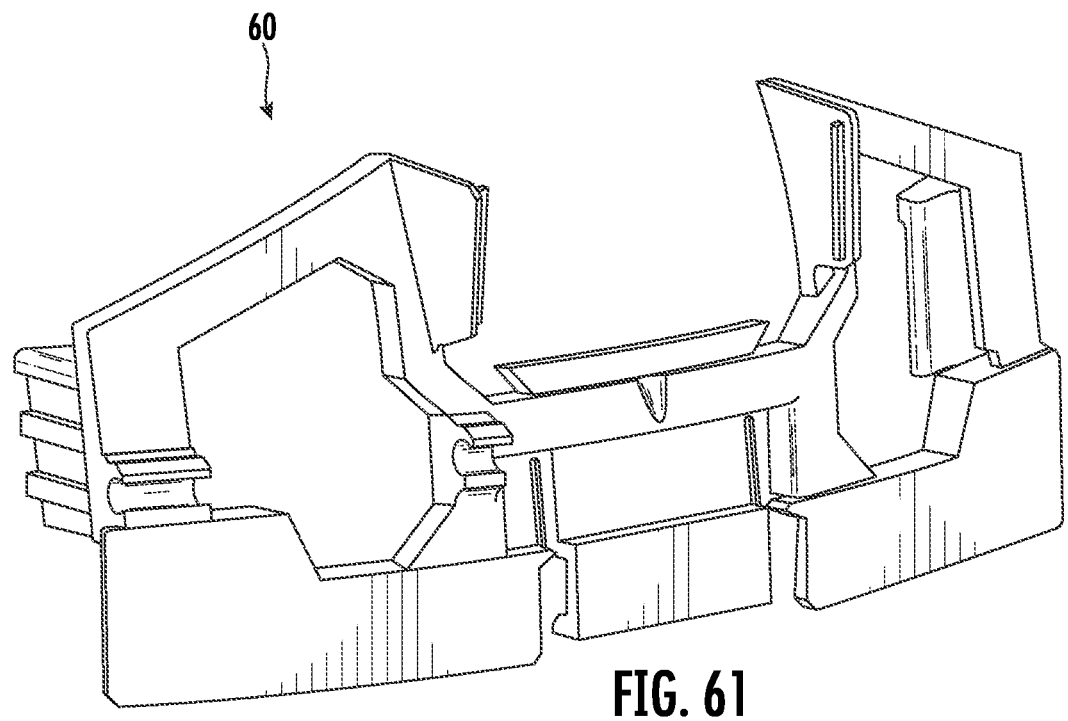
FIG. 61 is a perspective view of a coupling mechanism, according to an exemplary embodiment.
Figure 62:
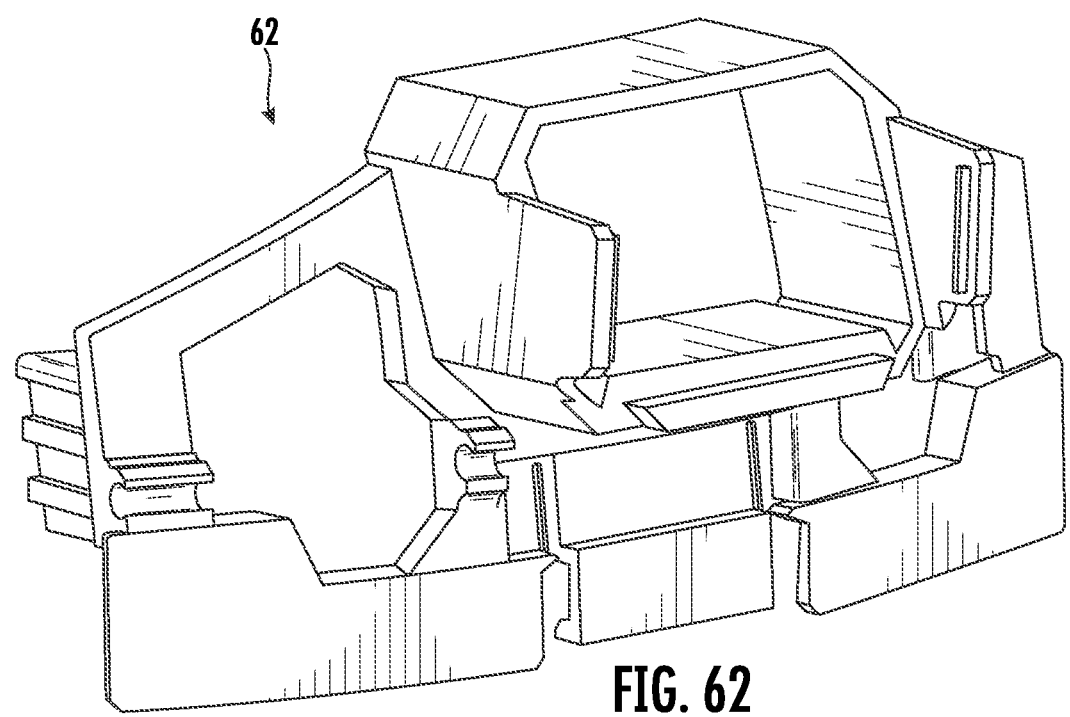
FIG. 62 is a perspective view of a coupling mechanism, according to an exemplary embodiment.
Figure 63:
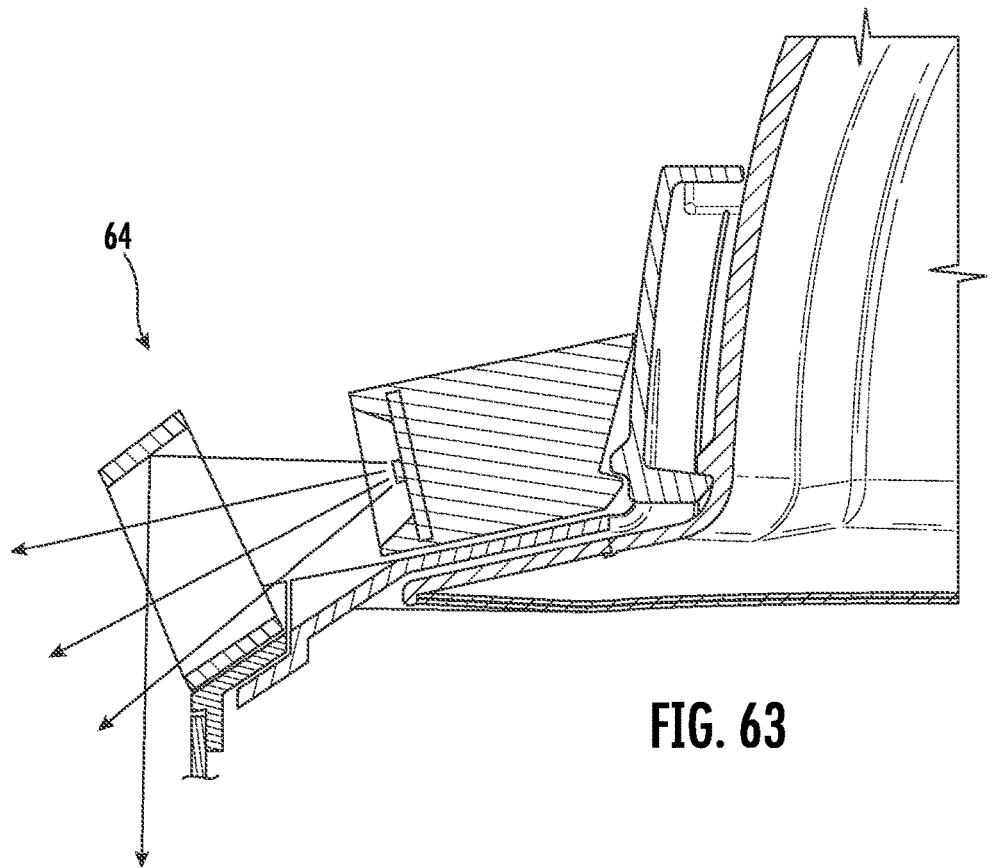
FIG. 63 is a side view of a coupling mechanism, according to an exemplary embodiment.
Figure 64:
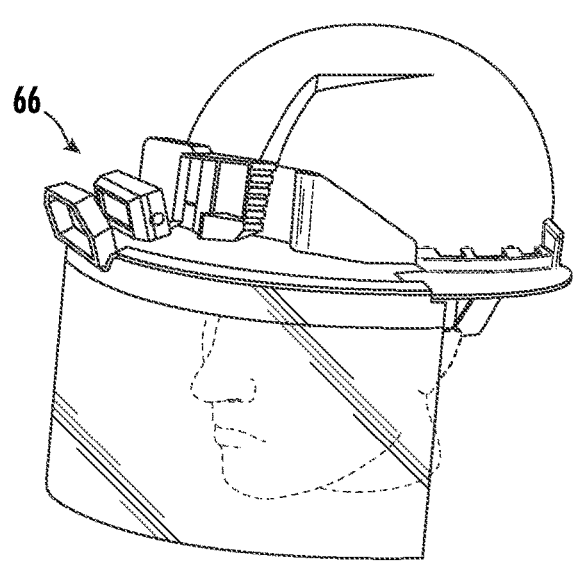
FIG. 64 is a perspective view of a coupling mechanism, according to an exemplary embodiment.
Figure 65:
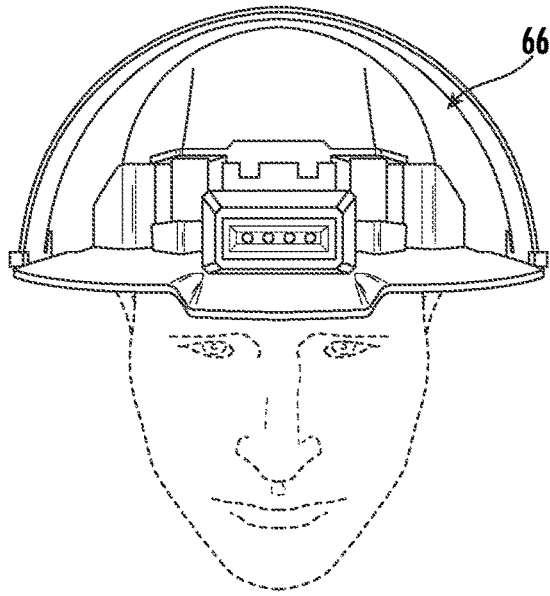
FIG. 65 is a front view of the coupling mechanism of FIG. 64, according to an exemplary embodiment.

Referring to FIGS. 31-38, various aspects of adjusting the field of light 34 emitted by headlamp 12 are shown. When coupled to safety headwear with a small and/or non-existent front brim (FIGS. 31-32), the bottom of field of light 34 emitted by headlamp 12 is emitted at or near the front of brim 215 of safety headwear 214 (FIG. 33). When coupled to safety headwear with a relatively longer front brim (FIGS. 34-35), headlamp 12 is coupled to extender 36, which positions headlamp 12 further forward. Therefore, the bottom of field of light 34 emitted by headlamp 12 is emitted at or near the front of brim 17 of safety headwear 212 (FIG. 36). For example, a portion of the light is projected onto the brim 17. In this way, extender 36 positions headlamp 12 further forward to reduce and/or eliminate light intercepted by the brim of the safety headwear. Referring to FIGS. 37-38, the extender could be reconfigured to overlap more of the base bracket to provide a stronger coupling.

Referring to FIGS. 33 and 36, headlamp 12 is configured to be directly coupled to the bracket 14 in a first position (FIG. 33) with respect to a hard hat (e.g., safety headwear 214) such that a front-most surface 340 of the headlamp 12 defines a first distance 342 in front of the hard hat, and headlamp 12 is coupled to the extender 36 in a second position (FIG. 36) with respect to a hard hat (e.g., safety headwear 212) such that the front-most surface 340 of the headlamp 12 defines a second distance 344 in front of the hard hat and the second distance 344 is greater than the first distance 342.

When headlamp 12 is in the first position, the arms 180, 182 of bracket 14 detachably couple the headlamp 12 to the bracket 14. When headlamp 12 is in the second position, arms 346, 348 of extender 36 detachably couple headlamp 12 to the extender 36, thereby indirectly coupling headlamp 12 to the safety headwear via the extender 36 and bracket 14.

In various embodiments, arm 346 of extender 36 extends distance 350 in front of the safety headwear 212 and arm 180 of bracket 14 extend distance 352 in front of the safety headwear 212, and distance 350 is greater than distance 352. Safety headwear 212 includes a brim 17 that extends forward from the rigid shell away from the head of the wearer, and arm 346 of extender 36 extends to distance 354 behind a front 19 of the brim 17, and arm 180 of bracket 14 extends to distance 356 behind the front 19 of the brim 17 that is greater than the distance 354.

In an alternative embodiment, arm 180 of bracket 14 does not extend in front of the brim and arm 346 of extender 36 extends in front of the brim. When headlamp 12 is coupled to an arm that extends in front of the brim, such as described in this alternative embodiment, the brim will no longer intercept light that is projected forward from the headlamp, thereby increasing the amount of light emitted in front of the wearer of the safety headwear.

Referring to FIGS. 39-65, various alternative methods of coupling a lighting element to safety headwear are shown. Clip/extender 44, 46, 48, 50, 52, 54, 56, 58, 60, 62, 64, and 66 have the same or similar functionality as bracket 14 and extender 36 except as described and/or shown. Clip/extender 44 includes swing arms. Clip/extender 46 includes a pop socket configuration. Clip/extender 48 includes an over-the-top pivoting functionality. Clip/extender 50 includes a video/audio device, such as a camcorder screen. Clip/extender 52 includes a plurality of brackets, such as two brackets. Clip/extender 54 includes a break away portion, shown in dotted line. Clip/extender 56 includes an adjustable mechanism, shown as a screw. Clip/extender 58 includes a lens, such as a Fresnel lens, to bounce and/or reflect light downward. Clip/extender 60 includes a short-brim bracket structure. Clip/extender 62 includes long-brim bracket structure. Clip/extender 64 includes a light reflector to redirect light downward. Clip/extender 66 includes a dip and/or recess in the brim to allow light to be directed more downwards in front of the user compared to structures without a dip/recess.

Figure 66:
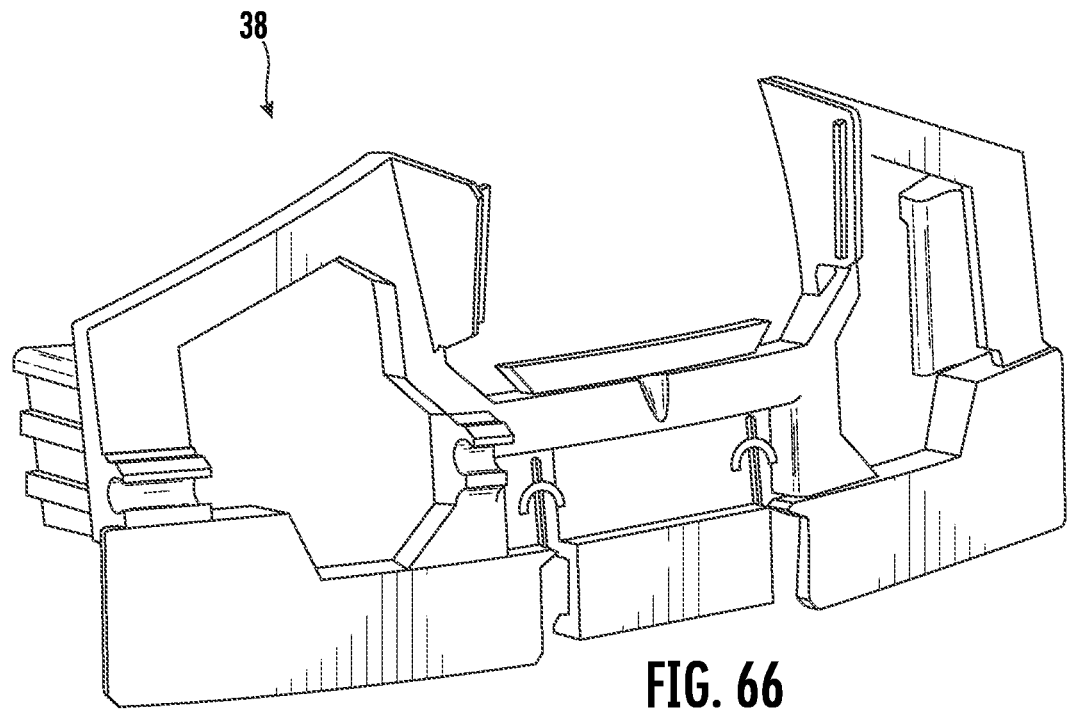
FIG. 66 is a perspective view of a coupling mechanism, according to an exemplary embodiment.
Figure 67:
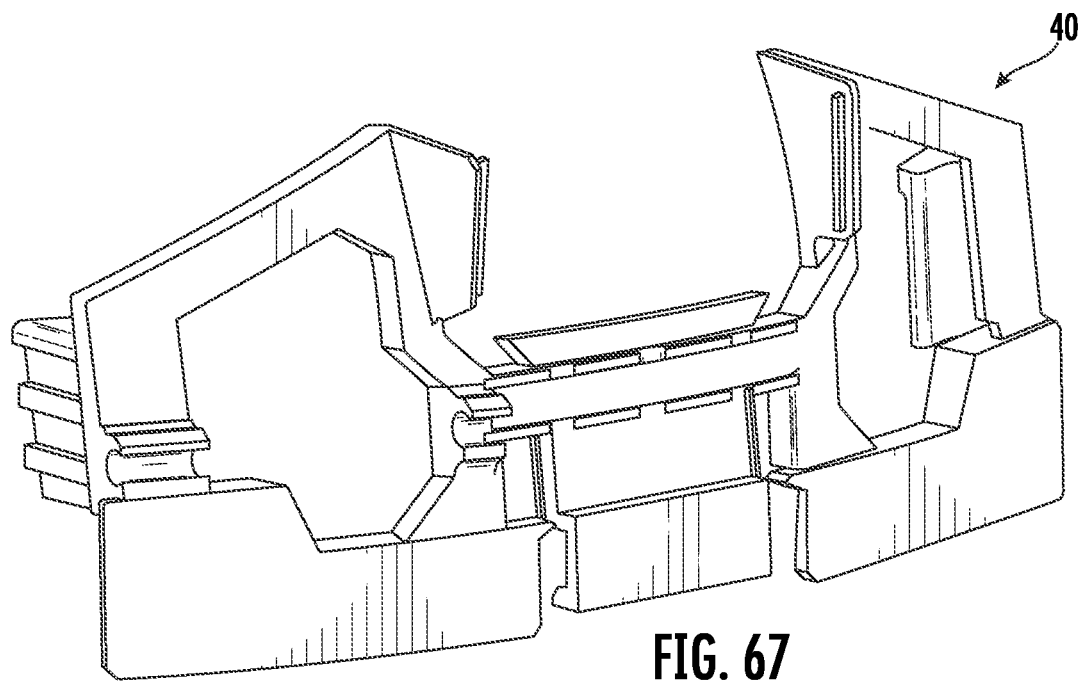
FIG. 67 is a perspective view of a coupling mechanism, according to an exemplary embodiment.
Figure 68:
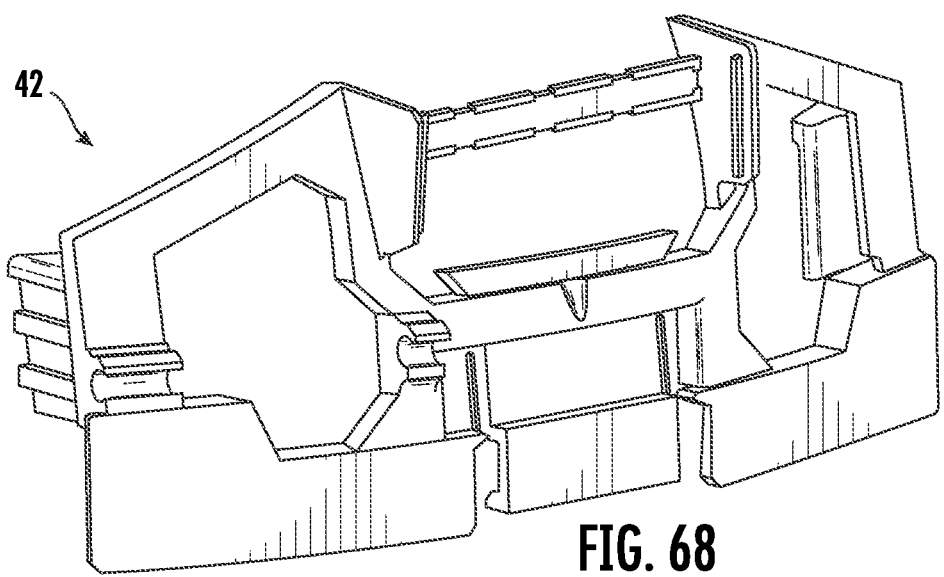
FIG. 68 is a perspective view of a coupling mechanism, according to an exemplary embodiment.
Figure 69:
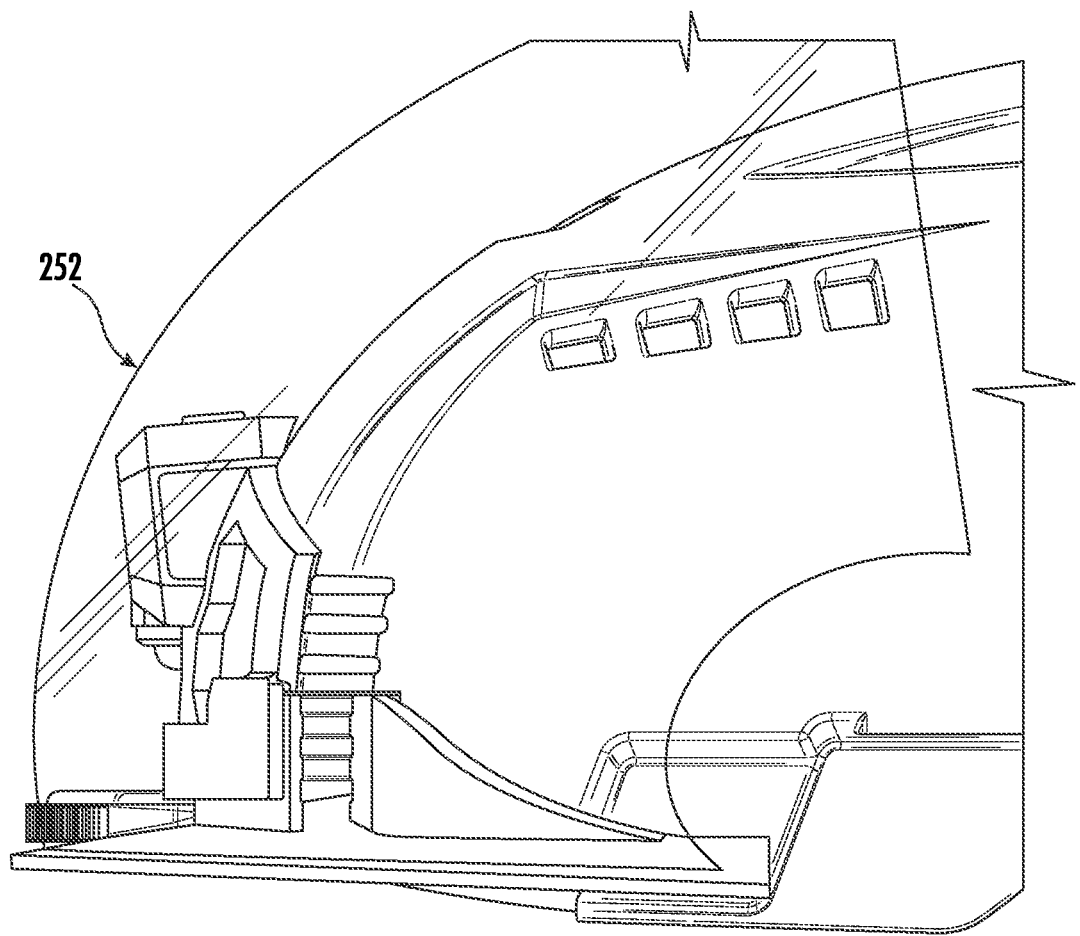
FIG. 69 is a side view of a coupling mechanism coupled to safety headwear, according to an exemplary embodiment.
Figure 70:
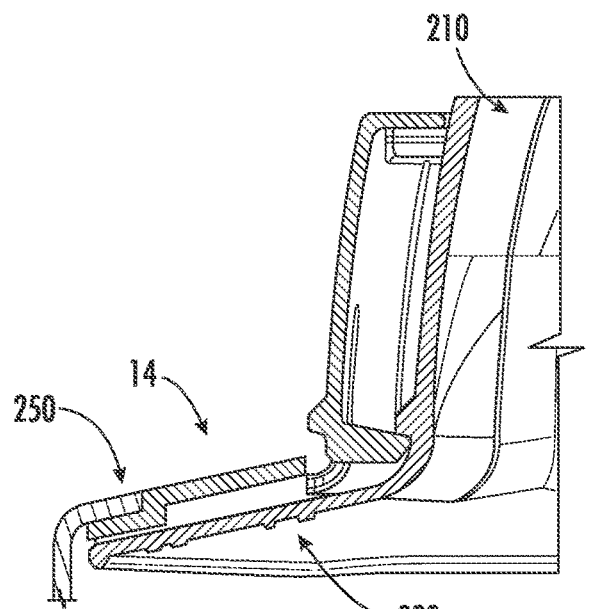
FIG. 70 is a cross-section view of the coupling mechanism of FIG. 1 coupled to safety headwear, according to an exemplary embodiment.

Referring to FIGS. 66-68, various alternative brackets 38, 40, and 42 are shown. Brackets 38, 40, and 42 provide the same or similar functionality and/or structure as bracket 14 except as described herein. Bracket 38 includes a decreased relief slot height, identified by the two curved arcs in front of bracket 38. Bracket 40 includes an increased thickness at the dotted line portions identified in FIG. 67. Bracket 42 includes a top support strut, shown at the top of FIG. 68.

Figure 71:
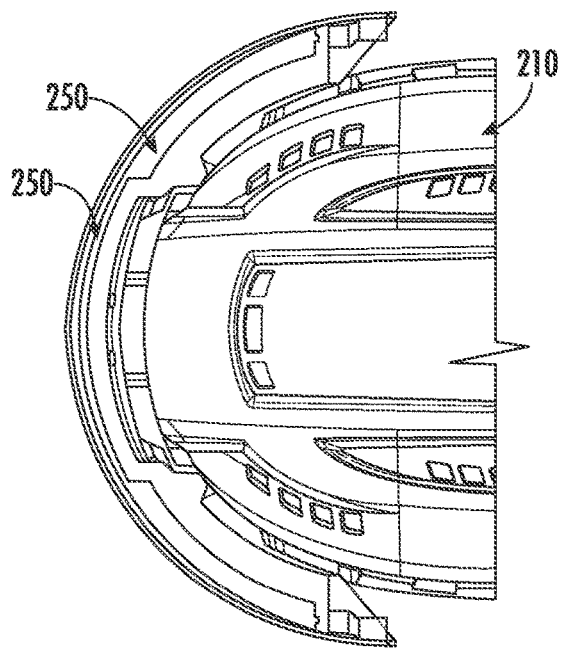
FIG. 71 is a top view of the coupling mechanism of FIG. 1 coupled to safety headwear, according to an exemplary embodiment.
Figure 72:
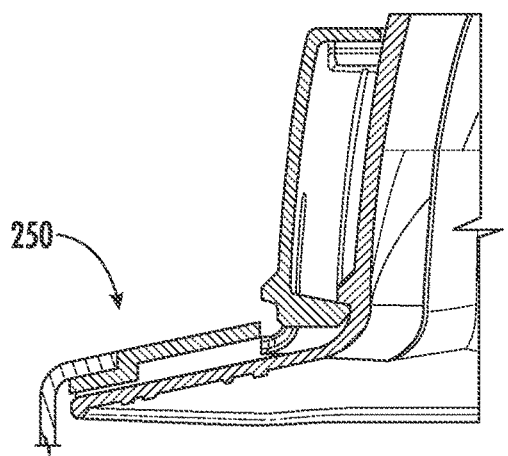
FIG. 72 is a cross-section view of the coupling mechanism of FIG. 1 coupled to safety headwear, according to an exemplary embodiment.
Figure 73:
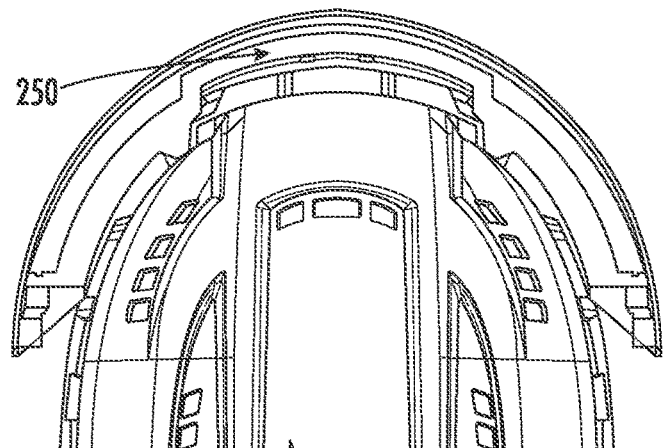
FIG. 73 is a top view of the coupling mechanism of FIG. 1 coupled to safety headwear, according to an exemplary embodiment.
Figure 74:
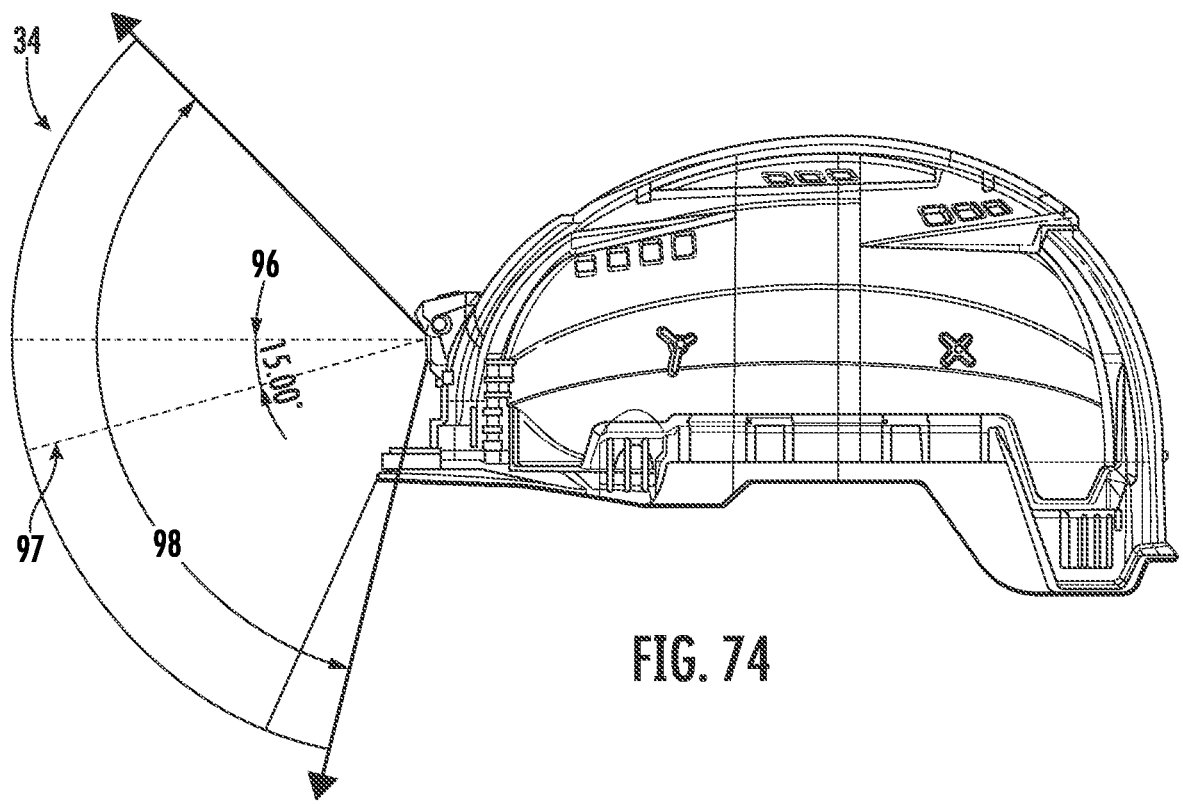
FIG. 74 is a side view of the lighting assembly of FIG. 1 coupled to safety headwear, according to an exemplary embodiment.
Figure 75:
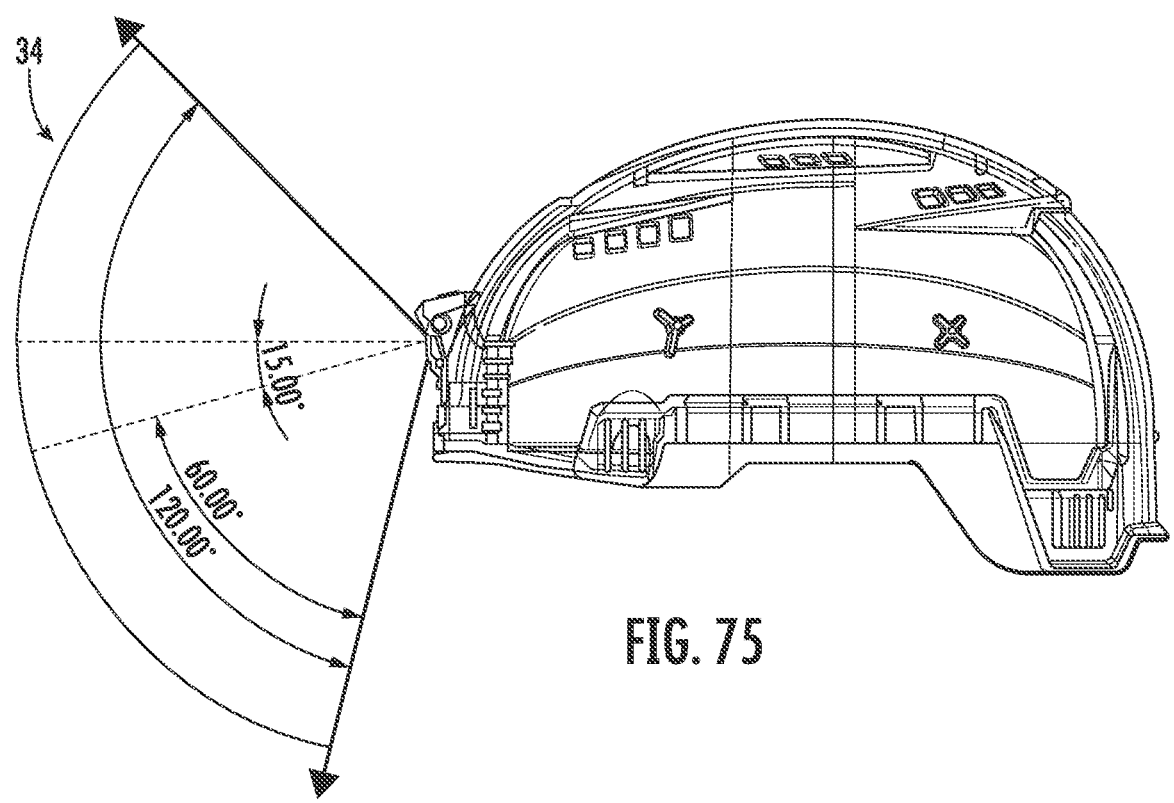
FIG. 75 is a side view of the lighting assembly of FIG. 1 coupled to safety headwear, according to an exemplary embodiment.
Figure 76:
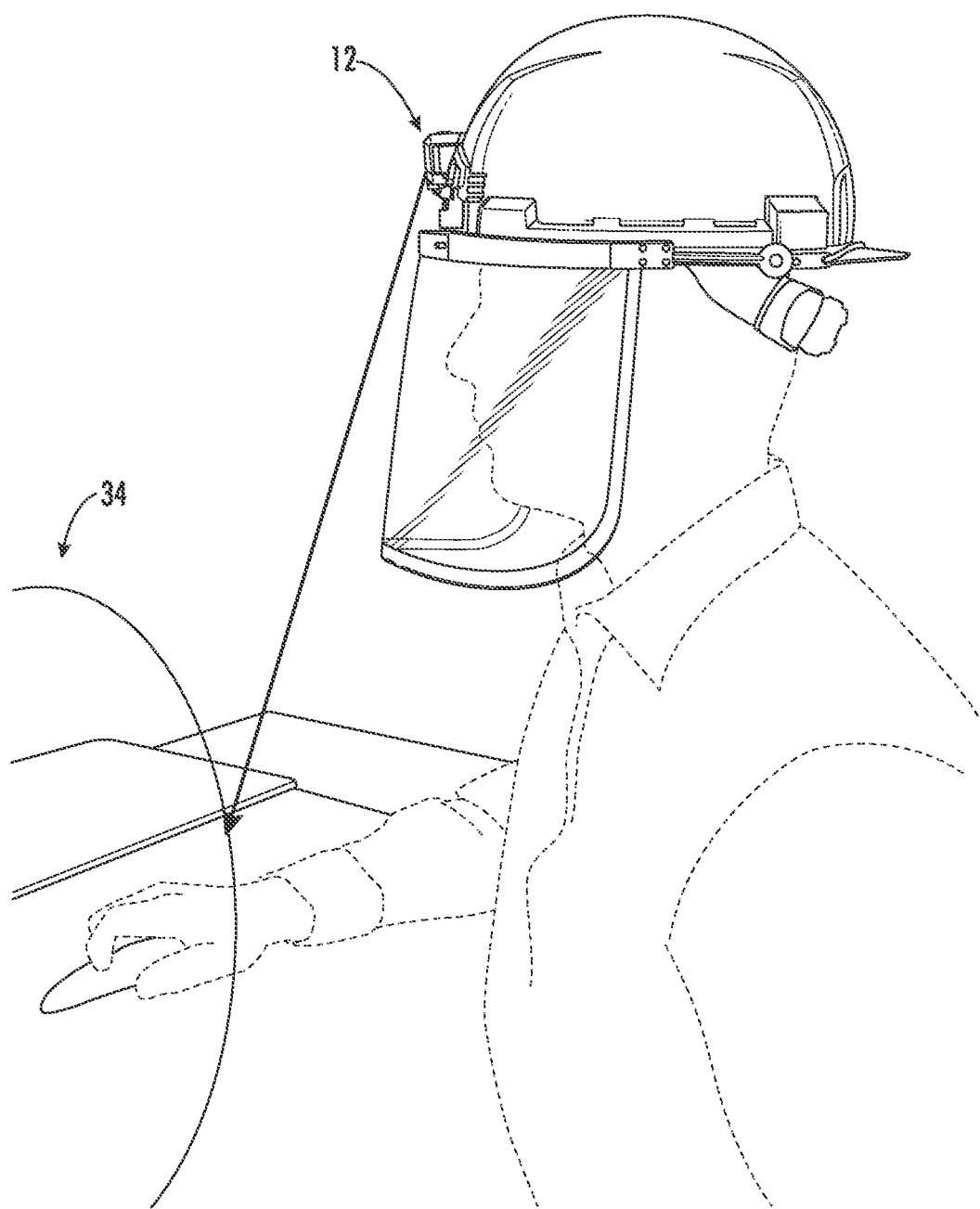
FIG. 76 is a side view of the lighting assembly of FIG. 1 coupled to safety headwear, according to an exemplary embodiment.
Figure 77:
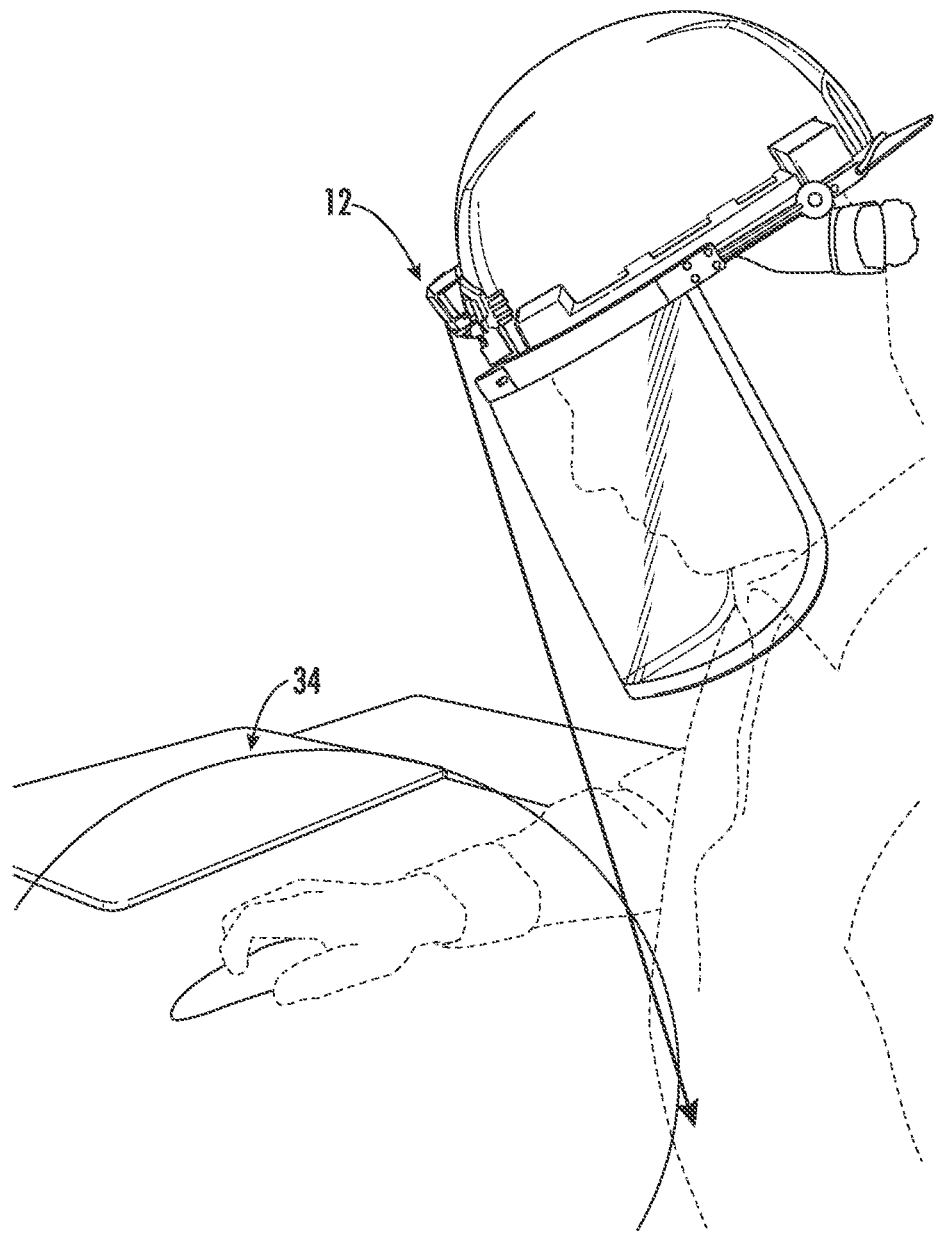
FIG. 77 is a side view of the lighting assembly of FIG. 1 coupled to safety headwear, according to an exemplary embodiment.
Figure 78:
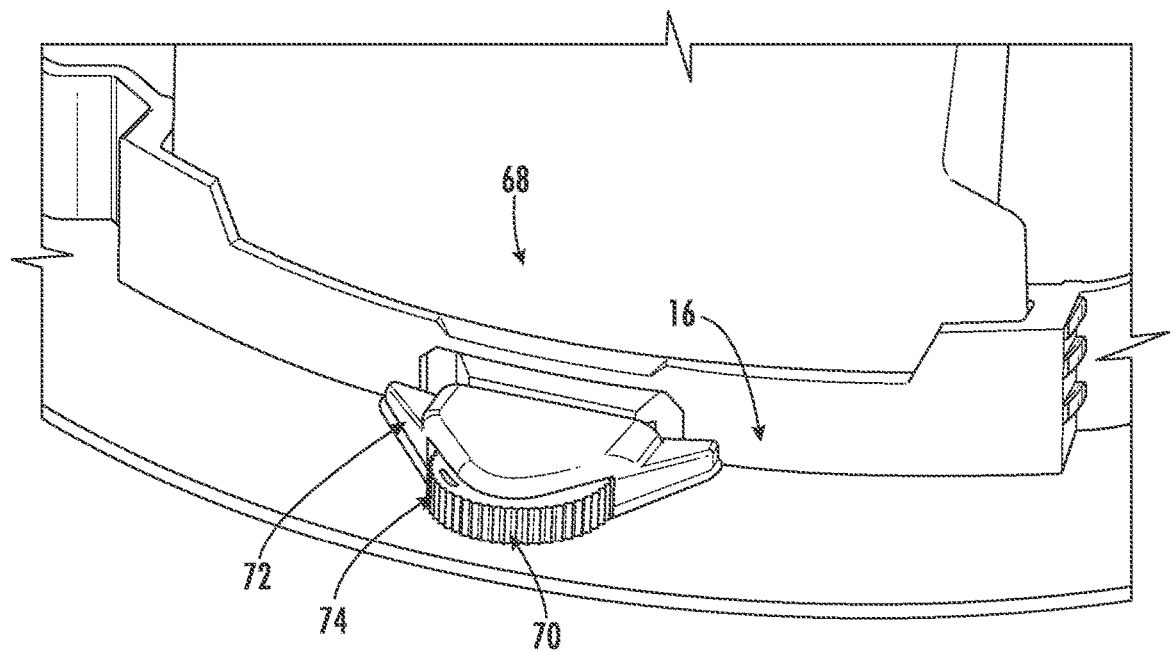
FIG. 78 is a detailed perspective view of a portion of the brim guard of FIG. 1 coupled to safety headwear, according to an exemplary embodiment.

Referring to FIGS. 69-73, various aspects of the pivot path 252 of face shield 250 are shown. In a specific embodiment, the front upper corner of the headlamp is chamfered to reduce interference with face shield 250 pivoting upwards. In various embodiments, the overlap of face shield 250 on brim 230 can be configured to adjust whether face shield 250 interferes with headlamp as face shield is pivoted up (FIGS. 70-73). For example, face shield 250 may overlap more of brim 230 directly in front of the face of the user compared to the side of the user's face (FIG. 71). Additionally, the overlap of face shield 250 can reduce and/or eliminate the chances of debris hitting the user's face when face shield 250 is pivoted open.

Referring to FIGS. 74-77, various aspects of field of light 34 being tilted downward are shown. In a specific embodiment, field of light 34 is tilted downward 15 degrees. To avoid and/or reduce how much light is intercepted by the brim of safety headwear (FIG. 74), an extender 36 may be used to position headlamp 12 further forward.

In various embodiments, the headlamp emits light over range 98, which when viewed from the side (e.g., FIG. 74) has a center 97 that is angle 96 with respect to a horizontal plane. In particular, in various embodiments, center 97 is between 5 degrees and 25 degrees below the horizontal plane, and more specifically is between 12 and 18 degrees, and even more specifically is 15 degrees below the horizontal plane.

Referring to FIGS. 78-86, in various embodiments, a locking mechanism 68 is utilized to lock brim guard 16 with respect to the safety headwear. Locking mechanism 68 includes an adjustable interface, shown as circular interface 70, which includes a locking indicator 74. Locking mechanism 68 includes a wall and/or housing, shown as wall 72, to protect dirt and/or debris from entering locking mechanism 68. Locking mechanism 68 allows the face shield to be removed easily with one hand, which allows the user to hold the hard hat with the other hand.

Figures 79, 80:
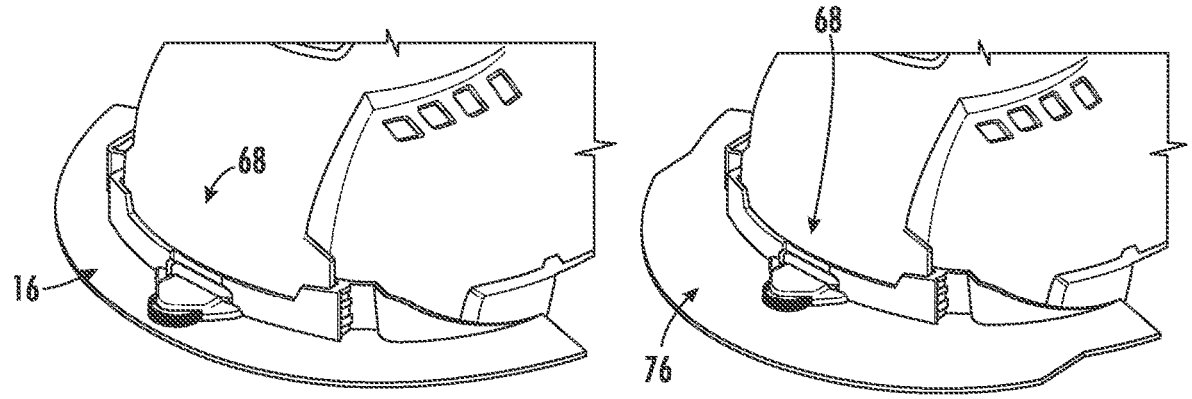
FIG. 79 is a perspective view of the brim guard of FIG. 78, according to an exemplary embodiment.
FIG. 80 is a perspective view of a brim guard, according to an exemplary embodiment.
Figure 87:
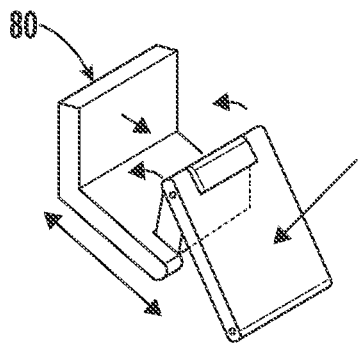
FIG. 87 is a schematic perspective view of a locking mechanism, according to an exemplary embodiment.
Figure 88:
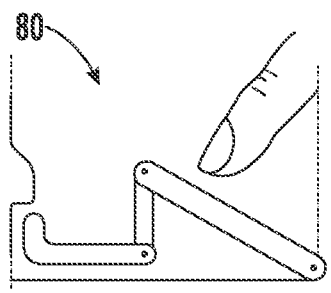
FIG. 88 is a side view of the locking mechanism of FIG. 87, according to an exemplary embodiment.
Figure 89:
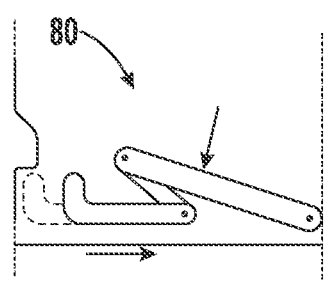
FIG. 89 is a side view of the locking mechanism of FIG. 87, according to an exemplary embodiment.
Figure 90:
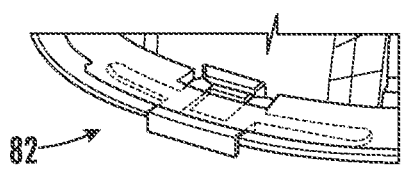
FIG. 90 is a detailed perspective view of a locking mechanism, according to an exemplary embodiment.
Figure 91:
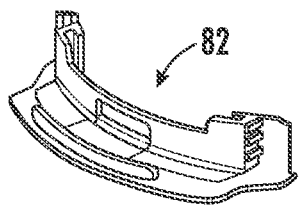
FIG. 91 is a perspective view of the locking mechanism of FIG. 90, according to an exemplary embodiment.
Figure 92:
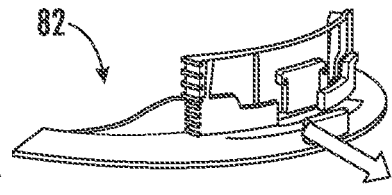
FIG. 92 is a perspective view of the locking mechanism of FIG. 90, according to an exemplary embodiment.
Figure 93:
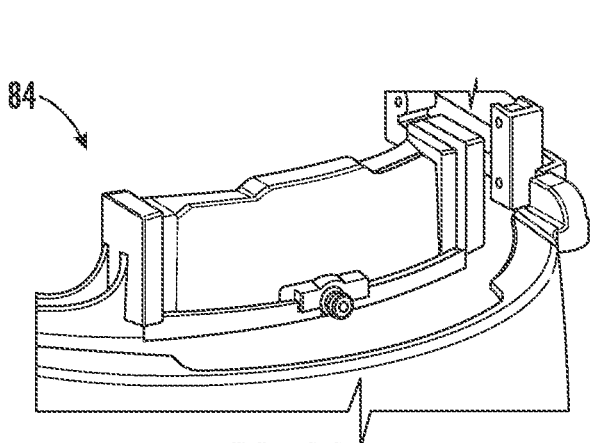
FIG. 93 is a detailed perspective view of a locking mechanism, according to an exemplary embodiment.
Figure 94:
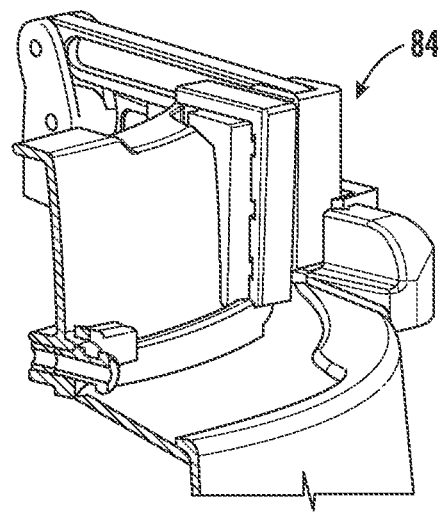
FIG. 94 is a perspective view of the locking mechanism of FIG. 93, according to an exemplary embodiment.
Figure 97:
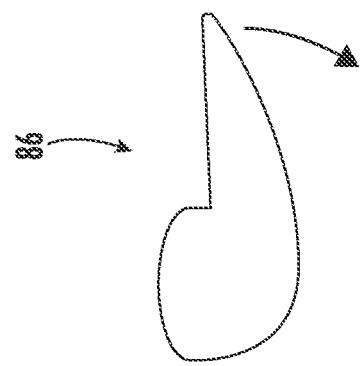
FIG. 97 is a schematic side view of the locking mechanism of FIG. 95, according to an exemplary embodiment.
Figure 96:
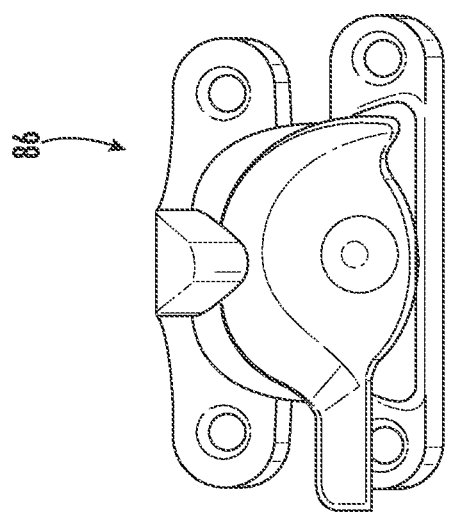
FIG. 96 is a top view of the locking mechanism of FIG. 95, according to an exemplary embodiment.
Figure 95:
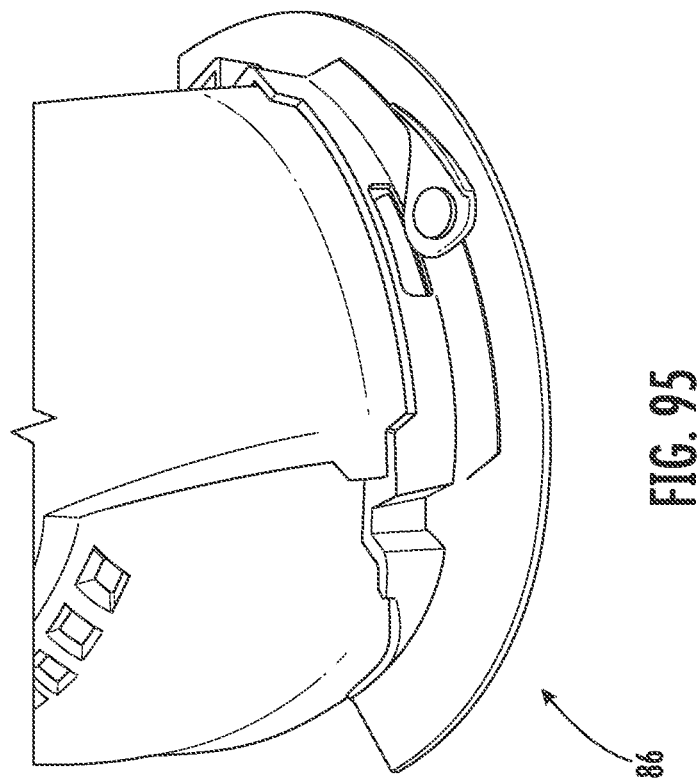
FIG. 95 is a perspective view of a locking mechanism, according to an exemplary embodiment.
Figure 98:
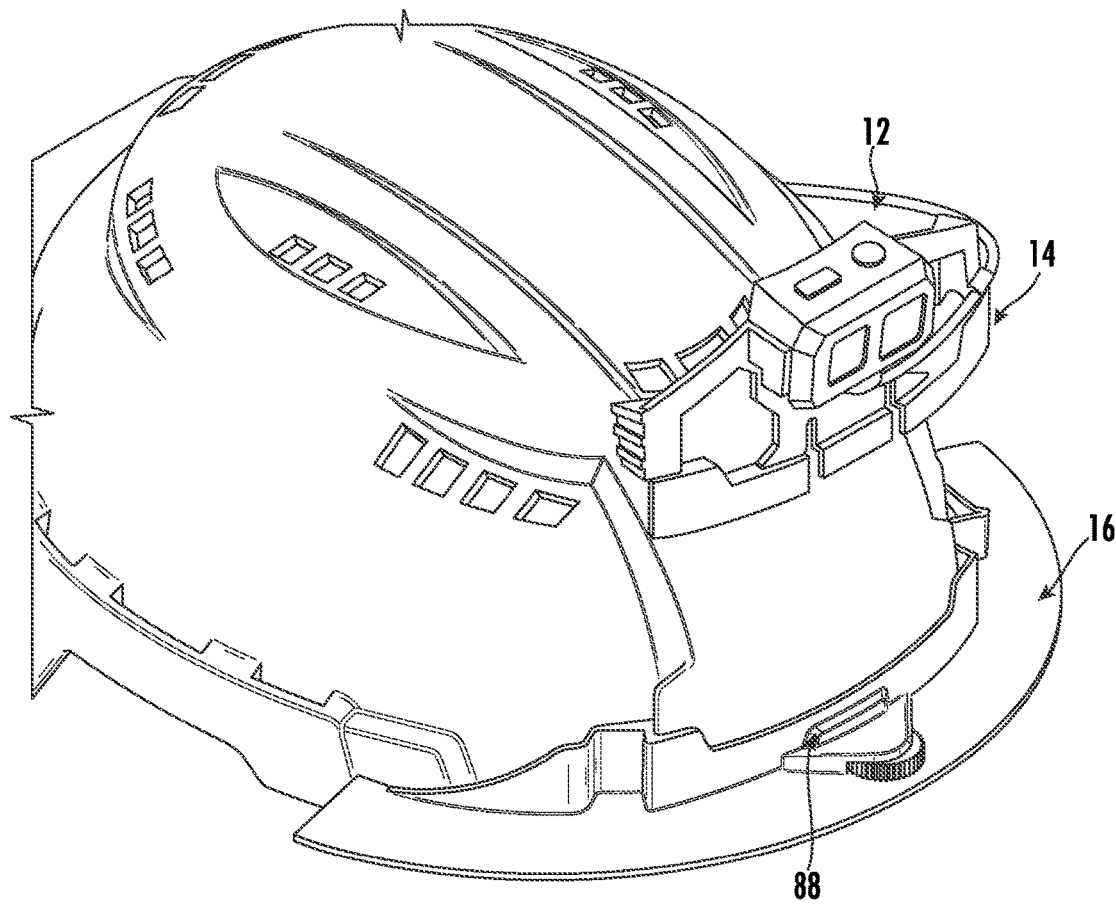
FIG. 98 is a perspective view of the lighting assembly of FIG. 1, according to an exemplary embodiment.
Figure 99:
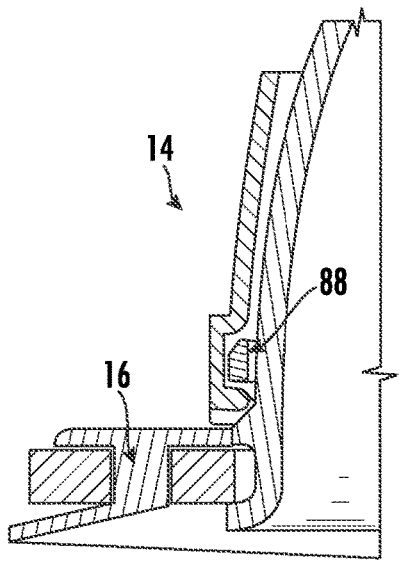
FIG. 99 is a cross-section view of the lighting assembly of FIG. 1, according to an exemplary embodiment.
Figure 100:
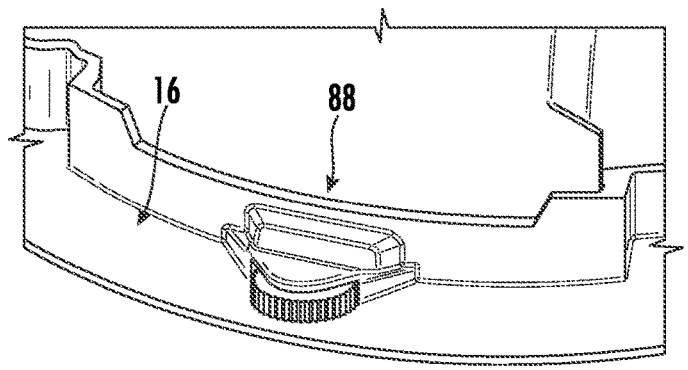
FIG. 100 is a detailed perspective view of the lighting assembly of FIG. 1, according to an exemplary embodiment.
Figure 101:
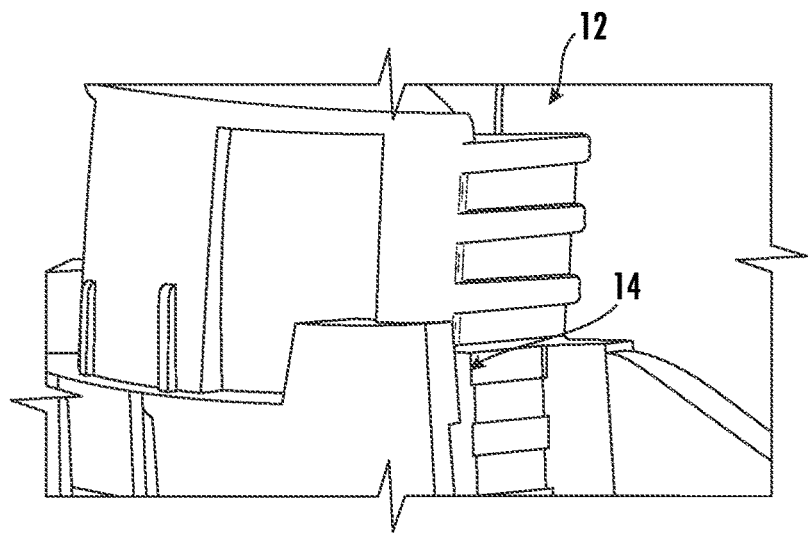
FIG. 101 is a detailed perspective view of a portion of the lighting assembly of FIG. 1, according to an exemplary embodiment.

Referring to FIG. 80, various aspects of brim guard 76 with locking mechanism 68 are shown. Brim guard 76 is the same as brim guard 16 except as shown, namely having a longer brim.

Referring to FIGS. 87-97, various alternative methods of locking a brim guard to safety headwear are shown. Locking mechanisms 80, 82, 84, 86 have the same or similar functionality as locking mechanism 68 except as described and/or shown. Locking mechanism 80 includes a push bar interface. Locking mechanism 82 includes a flexing pull tab. Locking mechanism 84 includes a pull knob, such as a spring-loaded pull knob. Locking mechanism 86 includes a cam lever with a handle.

Figure 102:
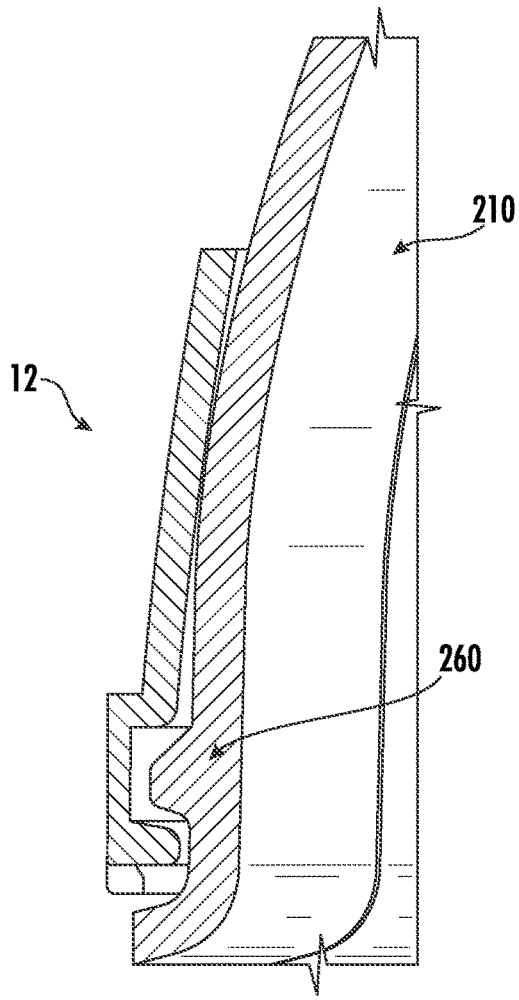
FIG. 102 is a cross-section view of a portion of the lighting assembly of FIG. 1, according to an exemplary embodiment.

Referring to FIGS. 98-115, various aspects of stacking and/or daisy chaining accessories to safety headwear are shown. In a specific embodiment, brim guard 16 includes an upper coupler 88 that couples to bracket 14 or headlamp 12. In this manner, one or more additional accessories, such as bracket 14 or headlamp 12, can be coupled to brim guard 16, thus daisy chaining one or more additional accessories to the safety headwear via brim guard 16. When brim guard 16 is not coupled to safety headwear (FIG. 102), bracket 14 or headlamp 12 can be directly coupled to the safety headwear 210 via protrusion 260.

Figure 103:
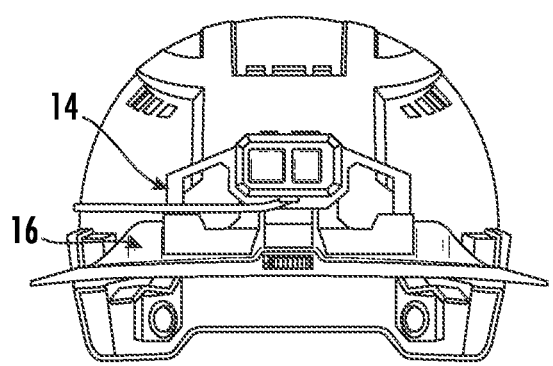
FIG. 103 is a front view of a portion of the lighting assembly of FIG. 1, according to an exemplary embodiment.
Figure 104:
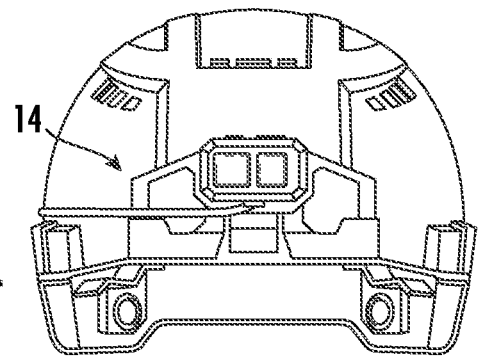
FIG. 104 is a front view of a portion of the lighting assembly of FIG. 1, according to an exemplary embodiment.
Figure 105:
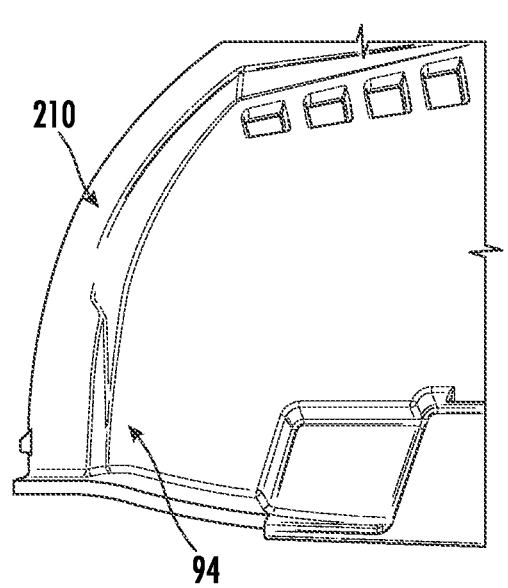
FIG. 105 is a perspective view of a safety headwear, according to an exemplary embodiment.
Figure 106:
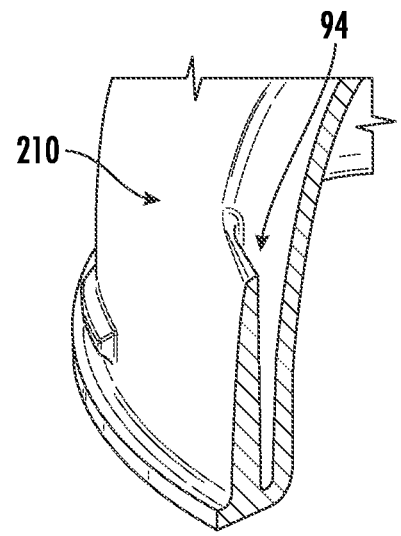
FIG. 106 is a cross-section view from the side of the safety headwear of FIG. 105, according to an exemplary embodiment.
Figure 107:
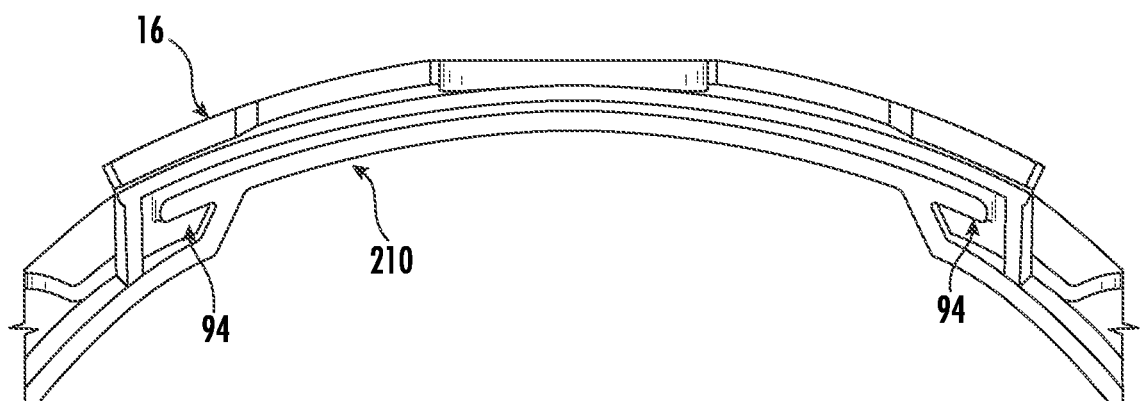
FIG. 107 is a cross-section view from above of the safety headwear of FIG. 105, according to an exemplary embodiment.

Referring to FIGS. 103-104, bracket 14 can be coupled to safety headwear via a brim guard 16 (FIG. 103), or bracket 14 can be coupled to the safety headwear directly (FIG. 104). Referring to FIGS. 105-107, brim guard 16 couples to safety headwear 210 via a coupling component, shown as dovetail 94, of safety headwear 210.

Figure 108:
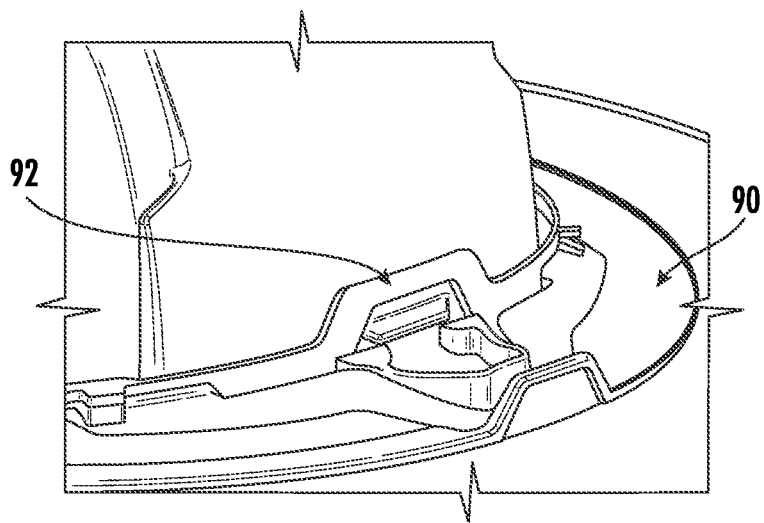
FIG. 108 is a detailed perspective view of a brim guard, according to an exemplary embodiment.
Figure 109:
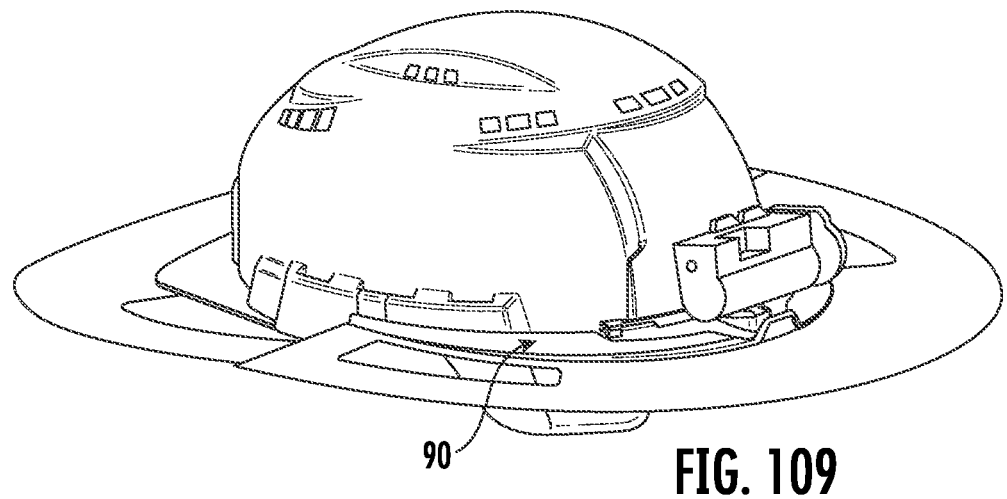
FIG. 109 is a perspective view of the brim guard of FIG. 108, according to an exemplary embodiment.

Referring to FIGS. 108-109, various aspects of an alternate brim guard 90 are shown. Brim guard 90 is the same or similar to brim guard 16 except as described herein. Brim guard 90 includes an upper coupler 92 to couple to other accessories, such as a headlamp (FIG. 108). Upper coupler 92 permits one or more additional accessories, such as headlamp, to couple to a top of brim guard 90. In this way, multiple accessories can be coupled to safety headwear, such as via daisy-chaining. In a specific embodiment, a sun visor is coupled to the safety headwear.

Figure 110:
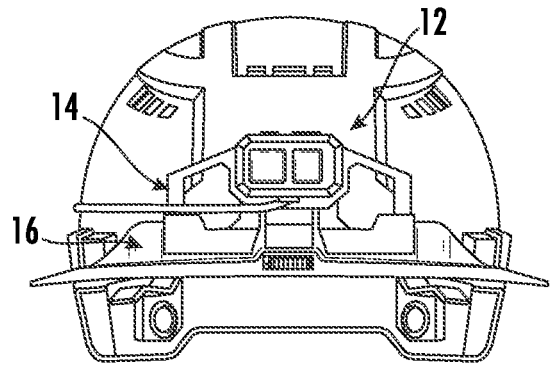
FIG. 110 is a front view of the lighting assembly of FIG. 1, according to an exemplary embodiment.
Figure 111:
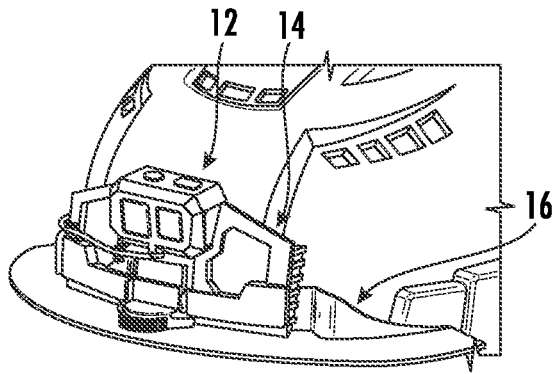
FIG. 111 is a perspective view of the lighting assembly of FIG. 110, according to an exemplary embodiment.
Figure 112:
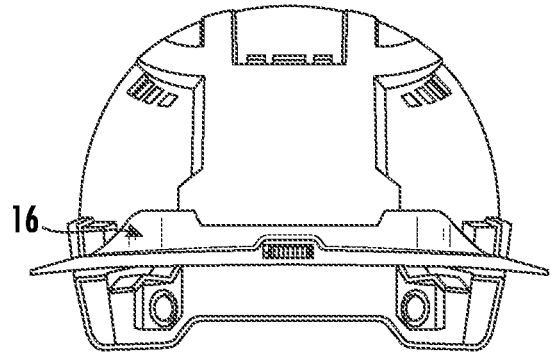
FIG. 112 is a front view of a portion of the lighting assembly of FIG. 1, according to an exemplary embodiment.
Figure 113:
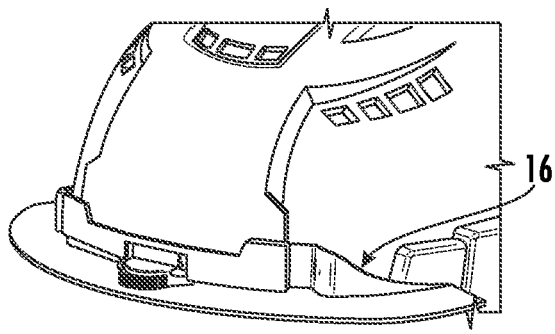
FIG. 113 is a perspective view of the portion of the lighting assembly of FIG. 112, according to an exemplary embodiment.
Figure 114:
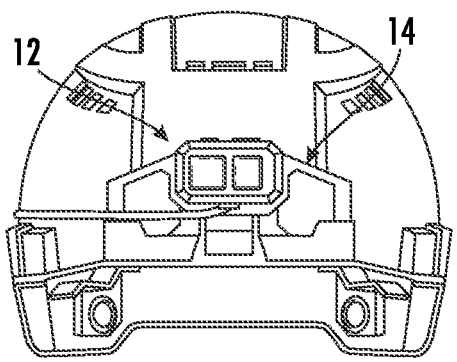
FIG. 114 is a front view of a portion of the lighting assembly of FIG. 1, according to an exemplary embodiment.
Figure 115:
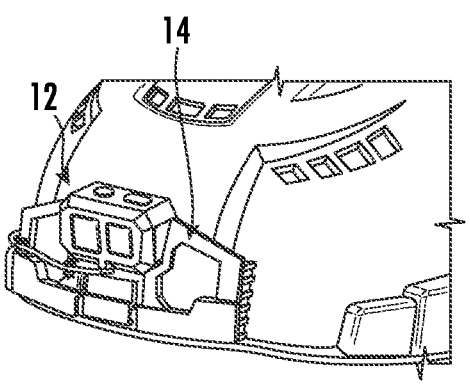
FIG. 115 is a perspective view of the portion of the lighting assembly of FIG. 114, according to an exemplary embodiment.
Figure 116:
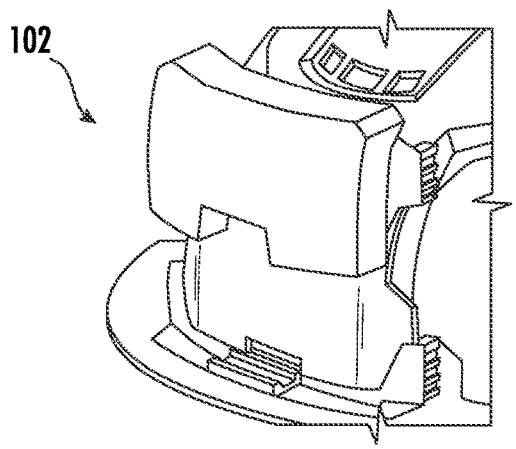
FIG. 116 is a perspective view of a coupling assembly, according to an exemplary embodiment.
Figure 117:
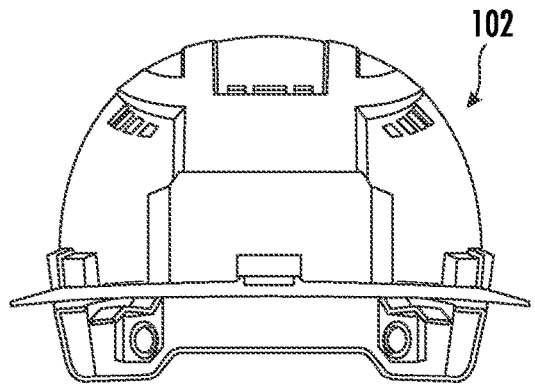
FIG. 117 is a perspective view of a portion of the coupling assembly of FIG. 116, according to an exemplary embodiment.
Figure 118:
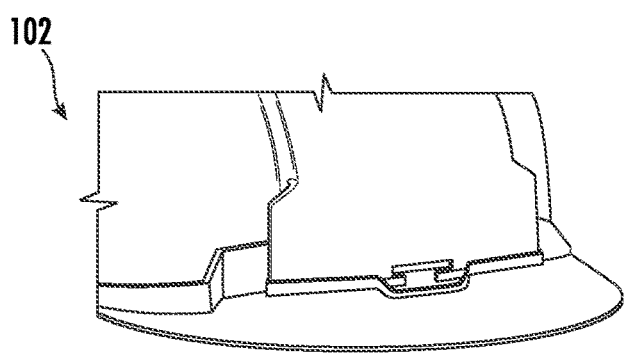
FIG. 118 is a perspective view of a portion of the coupling assembly of FIG. 116, according to an exemplary embodiment.
Figure 119:
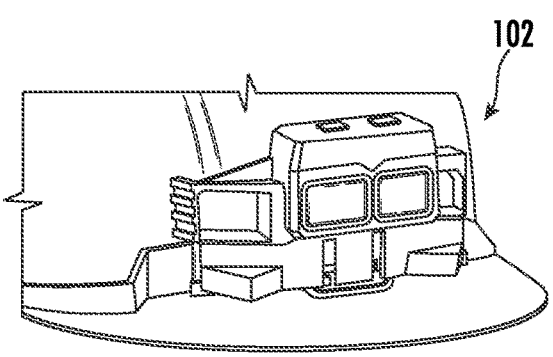
Figure 120:
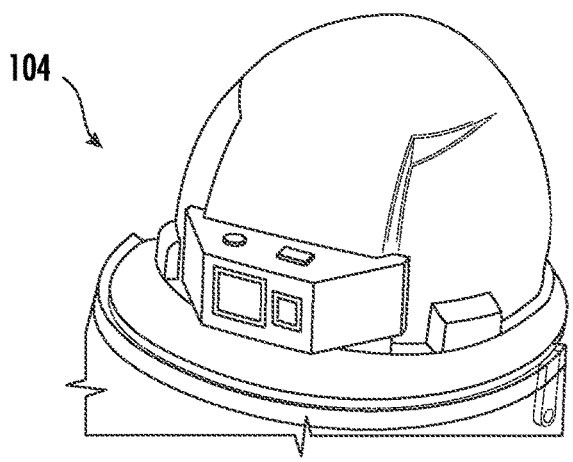
Figure 121:
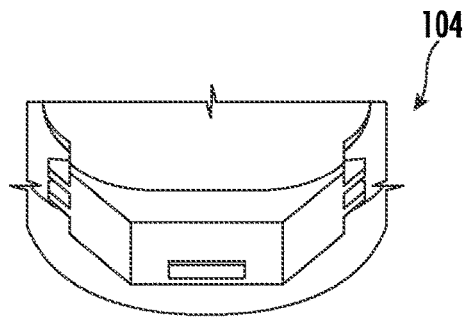

Referring to FIGS. 110-115, a lighting element coupled to various types of safety headwear are shown. Referring to FIGS. 110-111, headlamp 12 is coupled to bracket 14 that is coupled to brim guard 16 that is coupled to safety headwear. Referring to FIGS. 112-113, brim guard 16 is coupled to safety headwear without headlamp or bracket. Referring to FIGS. 114-115, bracket 14 is coupled directly to safety headwear.

Figure 122:
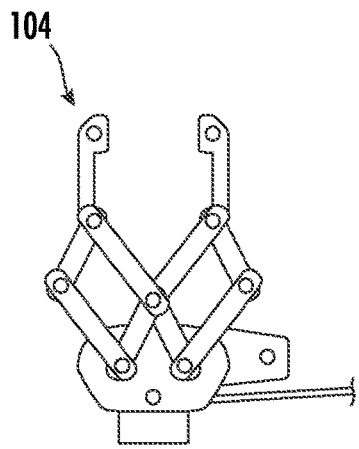
Figure 123:
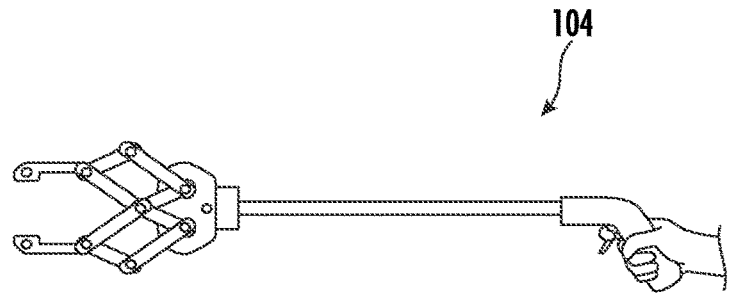
Figure 124:
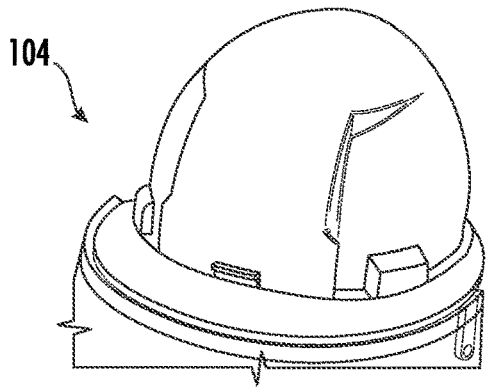
Figure 125:
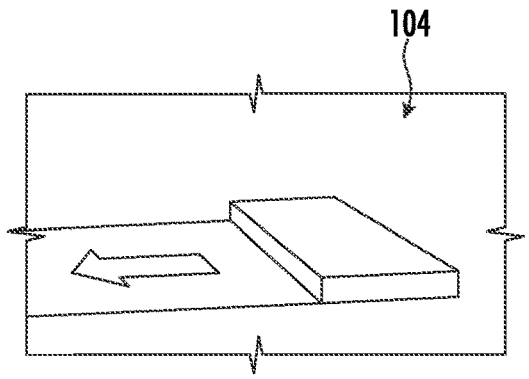
Figure 126:
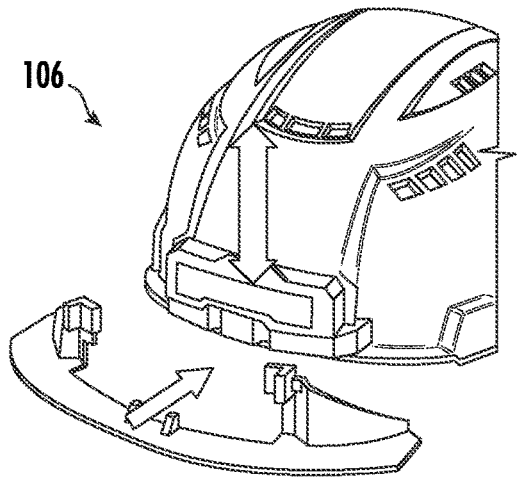
Figure 127:
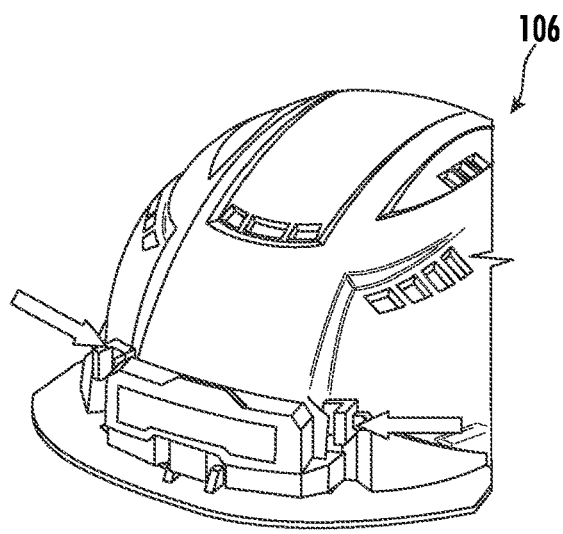
Figure 128:
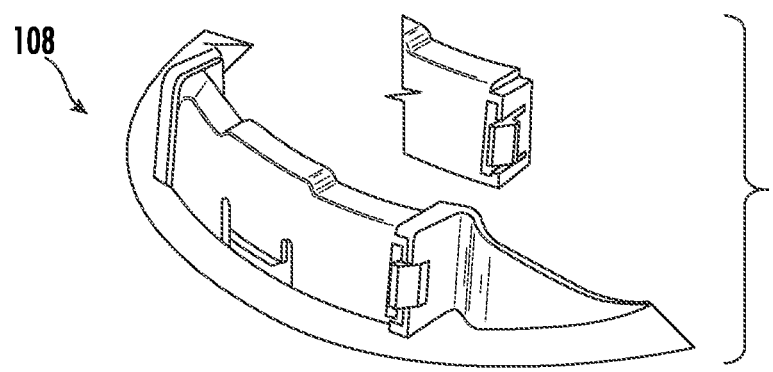
Figure 129:
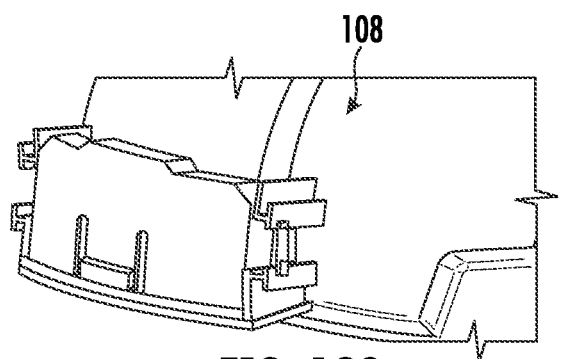
Figure 130:
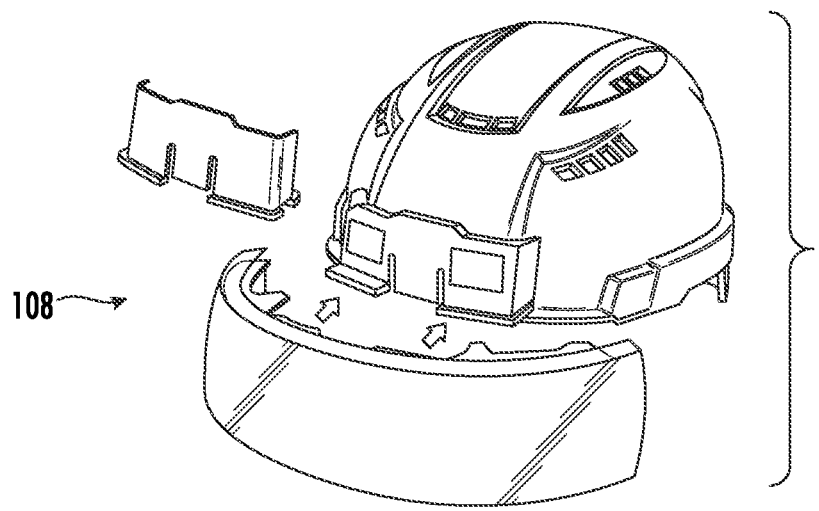

Referring to FIGS. 116-130, various alternative methods of piggybacking and/or daisy-chaining accessories are shown. Attachment mechanisms 102, 104, 106, and 108 have the same or similar functionality as brim guard 16 except as described and/or shown. Attachment mechanism 102 includes two accessories attached to the same retention clip. Attachment mechanism 104 permits an attached brim guard while an accessory is in place. Rotating hooks (FIGS. 122-123) and/or sliding clips (FIG. 125) facilitate adding a brim guard around an accessory. Attachment mechanism 106 includes functionality to attach a brim guard while an accessory is already in place and coupled to the safety headwear. Attachment mechanism 108 includes an accessory attaching to the safety headwear first, and then the face shield is attached.

Referring to FIGS. 131-153, various aspects of wire 20 are shown. In a specific embodiment, wire 20 is coupled to safety headwear via one or more clips 120. In a specific embodiment, wire 20 includes extra section of wire, shown as accordion section 122, where wire 20 couples to headlamp 12. The accordion section 122 permits wire 20 to couple easily to headlamp 12 without an extender (FIG. 133) and when headlamp 12 is coupled to an extender 36 (FIG. 134). For example, accordion section 122 is configured to permit wire 20 to increase a length over which the wire 20 extends. The accordion section actuates between a retracted configuration and an extended configuration and is biased to the retracted configuration. The accordion section 122 further keeps the wire taut when the extra length is not needed to couple the headlamp 12 to battery pack 18. Wire 20 couples to outlet 126 of battery pack 18. In a specific embodiment, wire 20 includes an end with a 90 degree angle 130 that couples to a bottom surface 132 of battery pack 18. A coupling mechanism, shown as bracket retention tab 128, couples battery pack 18 to the safety headwear. With this structure, wire 20 stays snug against safety headwear to avoid snags and catches. In a specific embodiment, bracket 14 includes two clips that couple to wire 20.

In various embodiments, wire 20 extends from battery pack 18, and the wire 20 electrically couples to the battery pack 18 and the accessory (e.g., headlamp 12). In various embodiments, wire 20 extends circumferentially around the external surface of the shell of the safety headwear.

Referring to FIG. 141, in various embodiments wire 20 includes an elongate portion 312 and a plug 314. Plug 314 is configured to detachably couple the wire 20 to the battery pack 18, and the plug 314 defines angle 130 with respect to the elongate portion 312. In various embodiments, angle 130 is approximately or exactly 90 degrees. Applicant has observed that this angle 130 for wire 20 reduces that likelihood of wire 20 being accidentally decoupled from battery 18. In various embodiments, plug 314 is detachably coupled to a bottom surface 132 of the battery pack 18.

Figure 153:
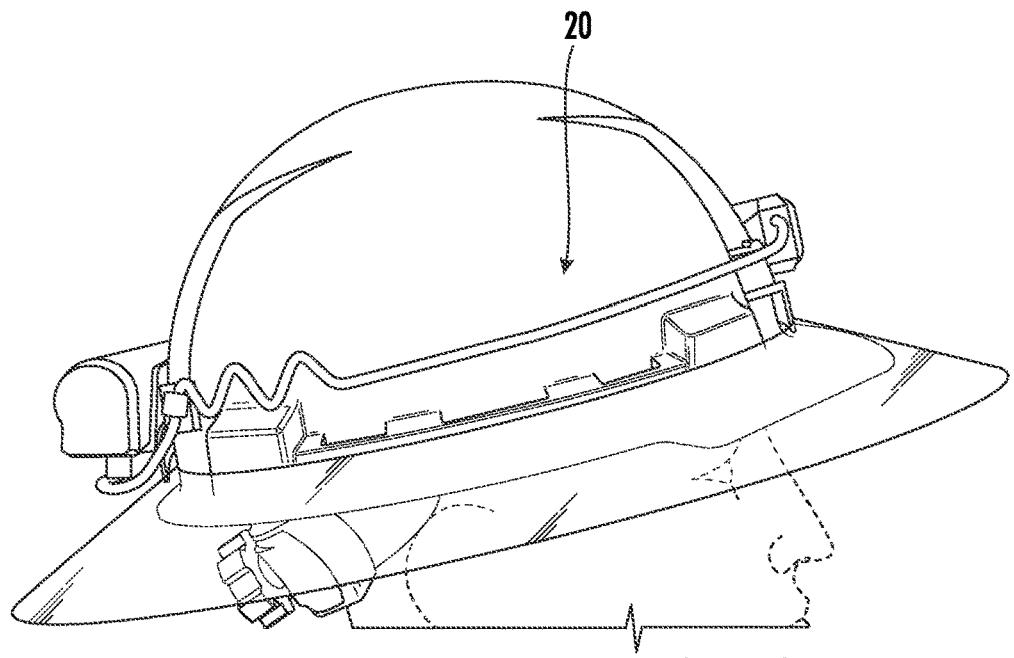

Referring to FIG. 144, an alternate wire, shown as flat ribbon wire 142, is shown. Flat ribbon wire 142 provides the same or similar functionality as wire 20 except as described and shown. Referring to FIGS. 145-153, various aspects of wire 20 transiting various accessories and configurations are shown. Referring to FIG. 153, a sun visor is coupled to the safety headwear.

Referring to FIGS. 154-165, an alternate power providing structure, shown as wires 134, 136, 138, 140, and 150 are shown. Wires 134, 136, 138, 140, and 150 provide the same or similar functionality as wire 20 except as described and shown. Wire 134 includes an enclosed wire in a stretchable channel, such as a sock-type configuration. Wire 136 transits a channel that is built into all accessories coupled to the safety headwear. Wire 138 includes a strap with a clip. Wire 140 includes wire transiting over the top of the safety headwear. Wire 150 includes a channel, such as in brim guard, that wire transits.

Referring to FIGS. 166-175, various aspects of a power-providing structure, shown as wire 144, are shown. Wires 144 provides the same or similar functionality as wire 20 except as described and shown. Wire 144 curves up to create an arced frog-leg shape. The semi-rigid wire 144 holds its shape and controls the path of wire 144 to not interfere with other accessories. In a specific embodiment, wire 144 is overmolded with a shell, such as a rigid plastic shell. This increases the durability of wire 144. In a specific embodiment, wire 144, includes a two-piece design of shells that are slidable with respect to the underlying power cord (FIGS. 168-171).

Referring to FIGS. 176-177, wire 20 includes a thinner profile to reduce the asymmetrical appearance of the wire on the safety headwear with a headlamp.

Referring to FIG. 178, an electrical device, shown as electronics 160, may be utilized.

Referring to FIG. 179, the safety headwear described herein may be coupled to one or more of the devices and/or accessories depicted in FIG. 179. As shown in FIG. 179, the depicted concept(s) allow for one or more additional accessories to attach to the hard hat front/rear mount when a face shield and/or sun visor is occupying the BOLT mount.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A hard hat system comprising:
    a hard hat comprising a shell formed from a rigid material, the shell defining an external surface and an opposing internal surface that defines a cavity sized to receive the head of a wearer, the hard hat further comprising a mounting element extending from the external surface of the hard hat, the mounting element comprising opposing ridges that extend outward from opposing sides of the mounting element and extend circumferentially around the shell and away from each other;
    a bracket coupled to the hard hat, the bracket comprises a first arm and a second arm, each of which extend forward from the hard hat; and
    a headlamp comprising:
        a housing comprising a first lateral wall comprising a first recess and an opposing second lateral wall comprising a second recess, the first lateral wall detachably engaged with the first arm and the second lateral wall detachably engaged with the second arm; and
        a lighting element within the housing, the lighting element configured to emit light outside the housing.

2. The hard hat system of claim 1, the housing of the headlamp defining a rear surface that faces towards the hard hat, the rear surface interfacing with the hard hat.

3. The hard hat system of claim 2, the rear surface of the housing defining an arcuate shape that is concave with respect to the hard hat.

4. The hard hat system of claim 1, the first arm comprising a first protrusion that extends towards the second arm, and the second arm comprising a second protrusion that extends towards the first arm, wherein the first recess is configured to receive the first protrusion and wherein the second recess is configured to receive the second protrusion.

5. The hard hat system of claim 1, the headlamp comprising a second lighting element within the housing, the second lighting element configured to emit light outside the housing.

6. The hard hat system of claim 1, wherein when viewed from a side, a center of the light emitted forward from the lighting element defines a first angle below a horizontal plane, wherein the first angle is between 5 degrees and 25 degrees.

7. The hard hat system of claim 1, the hard hat comprising a brim that extends forward from the shell away from the head of the wearer, wherein a portion of the light is projected onto the brim.

8. A hard hat system comprising:
a hard hat comprising a shell formed from a rigid material, the shell defining an external surface and an opposing internal surface that defines a cavity sized to receive the head of a wearer, the hard hat comprising a rear mounting element extending from a rear of the hard hat, the rear mounting element comprising opposing ridges that extend outward from opposing sides of the rear mounting element and extend circumferentially around the shell and away from each other;
a mounting bracket coupled to the rear mounting element, the mounting bracket including opposing arms that engage between the shell and the opposing ridges; and
a power source coupled to the mounting bracket, the power source configured to supply electrical power to an accessory coupled to the hard hat.

9. The hard hat system of claim 8, comprising a wire extending from the power source, the wire electrically coupled to the power source and the accessory, the wire extending circumferentially around the external surface of the shell.

10. The hard hat system of claim 9, the wire comprising an accordion section configured to permit the wire to increase a length over which the wire extends, the accordion section actuating between a retracted configuration and an extended configuration, wherein the accordion section is biased towards the retracted configuration.

11. The hard hat system of claim 8, comprising a wire comprising an elongate portion and a plug configured to detachably couple the wire to the power source, wherein the plug defines a 90 degree angle with respect to the elongate portion.

12. The hard hat system of claim 11, the plug is detachably coupled to a bottom surface of the power source.

13. The hard hat system of claim 8, wherein the accessory comprises a headlamp coupled to a front of the hard hat.

14. A hard hat system comprising:
a hard hat comprising a shell formed from a rigid material, the shell defining an external surface and an opposing internal surface that defines a cavity sized to receive the head of a wearer;
a bracket coupled to the hard hat;
an extender coupled to the bracket; and
a headlamp, the headlamp configured to be directly coupled to the bracket in a first position with respect to the hard hat such that a front-most surface of the headlamp defines a first distance in front of the hard hat, the headlamp configured to be coupled to the extender in a second position with respect to the hard hat such that the front-most surface of the headlamp defines a second distance in front of the hard hat, wherein the second distance is greater than the first distance.

15. The hard hat system of claim 14, the extender comprising a first arm and a second arm that each extend forward from the bracket, the headlamp comprising a housing comprising a first lateral wall and an opposing second lateral wall, the first lateral wall detachably engaged with the first arm and the second lateral wall detachably engaged with the second arm.

16. The hard hat system of claim 15, the bracket comprising a first bracket arm and a second bracket arm that each extend forward from the hard hat, the first bracket arm and the second bracket arm configured to detachably couple the headlamp to the bracket when the headlamp is in the first position, and the first bracket arm and second bracket arm detachably coupled to the extender when the headlamp is in the second position.

17. The hard hat system of claim 16, the first arm extending a third distance in front of the hard hat and the first bracket arm extending a fourth distance in front of the hard hat, wherein the third distance is greater than the fourth distance.

18. The hard hat system of claim 16, the hard hat comprising a brim that extends forward from the shell away from the head of the wearer, wherein the first arm extends to a fifth distance behind a front of the brim, and the first bracket arm extends to a sixth distance behind the front of the brim that is greater than the fifth distance.

19. The hard hat system of claim 14, comprising a brim guard coupled to a front of the hard hat, wherein the bracket is coupled between the brim guard and the hard hat.

20. The hard hat system of claim 14, the headlamp comprising a lighting element configured to emit light and an interface button configured to control the lighting element, wherein the interface button extends from an upper surface of the headlamp.

* * * * *